US009965175B2

(12) United States Patent
Rucine et al.

(10) Patent No.: US 9,965,175 B2
(45) Date of Patent: May 8, 2018

(54) SYSTEM AND METHOD OF DIGITAL NOTE TAKING

(71) Applicant: MyScript, Nantes (FR)

(72) Inventors: Nicolas Rucine, Nantes (FR); Nathalie Delbecque, Nantes (FR); Robin Mélinand, Nantes (FR); Arnoud Boekhoorn, Nantes (FR); Cédric Coulon, Nantes (FR); François Bourlieux, Nantes (FR); Thomas Penin, Nantes (FR); Aristote Laval, Nantes (FR)

(73) Assignee: MyScript, Nantes (FR)

( * ) Notice: Subject to any disclaimer, the term of this patent is extended or adjusted under 35 U.S.C. 154(b) by 22 days.

(21) Appl. No.: 14/886,195

(22) Filed: Oct. 19, 2015

(65) Prior Publication Data

US 2017/0060819 A1    Mar. 2, 2017

(30) Foreign Application Priority Data

Aug. 25, 2015   (EP) .................................... 15290219

(51) Int. Cl.
*G06F 17/00* (2006.01)
*G06F 3/0488* (2013.01)
(Continued)

(52) U.S. Cl.
CPC ........ *G06F 3/04883* (2013.01); *G06F 3/0482* (2013.01); *G06F 3/0485* (2013.01);
(Continued)

(58) Field of Classification Search
CPC .... G06F 17/241; G06F 17/24; G06F 3/03545; G06F 3/04883; G06F 3/0481; G06K 9/00865; G06K 9/222
(Continued)

(56) References Cited

U.S. PATENT DOCUMENTS 5,590,257 A   12/1996 Forcier
5,596,350 A    1/1997 Capps et al.
(Continued)

FOREIGN PATENT DOCUMENTS

EP    0720084    7/1996

OTHER PUBLICATIONS

International Search Report for Related Application No. PCT/EP216/001446, dated Nov. 29, 2016, EPO—International, WPI Data.
(Continued)

*Primary Examiner* — Quoc A Tran
(74) *Attorney, Agent, or Firm* — McDermott Will & Emery LLP

(57) ABSTRACT

A system, method and computer program product for use in digital note taking with handwriting input to a computing device are provided. The computing device is connected to an input device in the form of an input surface. A user is able to provide input by applying pressure to or gesturing above the input surface using either his or her finger or an instrument such as a stylus or pen. The present system and method monitors the input strokes. The computing device further has a processor and at least one application for recognizing the handwriting input under control of the processor. The at least one system application is configured to cause display of, on a display interface of a computing device, digital ink in a block layout in accordance with a layout of blocks of the handwriting input and a configuration of the computing device display interface.

18 Claims, 43 Drawing Sheets

(51) Int. Cl.
*G06K 9/00* (2006.01)
*G06F 3/0482* (2013.01)
*G06F 3/0484* (2013.01)
*G06F 3/0485* (2013.01)
*G06F 17/21* (2006.01)
*G06F 17/24* (2006.01)
*G06K 9/22* (2006.01)
*G06F 3/0481* (2013.01)
*G06F 3/0354* (2013.01)

(52) U.S. Cl.
CPC ........ *G06F 3/04845* (2013.01); *G06F 17/211* (2013.01); *G06F 17/242* (2013.01); *G06K 9/00402* (2013.01); *G06F 3/03545* (2013.01); *G06F 3/0481* (2013.01); *G06F 17/24* (2013.01); *G06F 17/241* (2013.01); *G06K 9/00865* (2013.01); *G06K 9/222* (2013.01)

(58) Field of Classification Search
USPC .................... 715/268, 762, 763, 784–786
See application file for complete search history.

(56) References Cited

U.S. PATENT DOCUMENTS

| | | |
|---|---|---|
| 5,613,019 A | 3/1997 | Altman et al. |
| 7,266,769 B2 | 9/2007 | Thacker |
| 7,616,333 B2 | 11/2009 | Wakeam et al. |
| 7,751,623 B1 | 7/2010 | Simmons et al. |
| 2014/0363074 A1* | 12/2014 | Dolfing .............. G06K 9/00979 382/156 |
| 2017/0213069 A1* | 7/2017 | Giron Espon ....... B42D 25/318 |

OTHER PUBLICATIONS

"MyScript—The Power of Handwriting", Dec. 11, 2014, pp. 1-3. URL: https://www.youtube.com/watch?v=yojFiBhPMUo.
aha!™ InkWriter™ Handbook, aha! Software Corporation, 1993.

\* cited by examiner

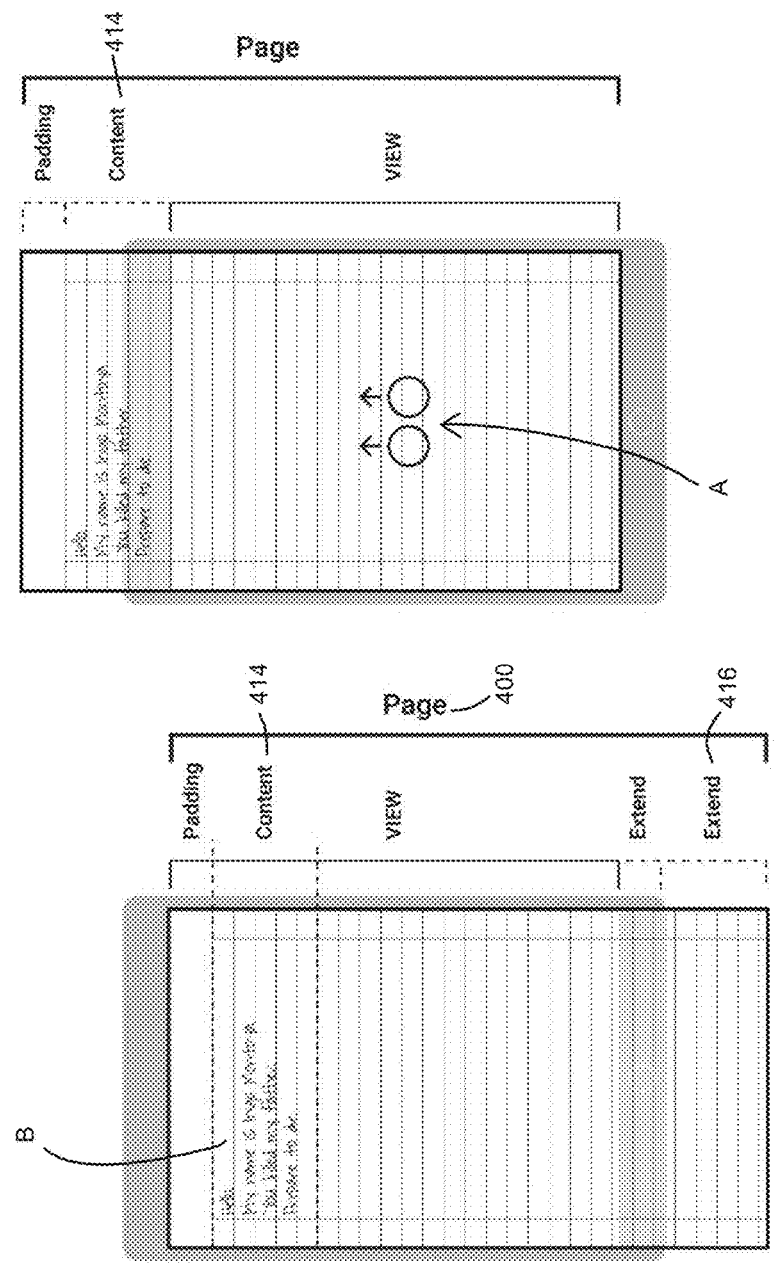

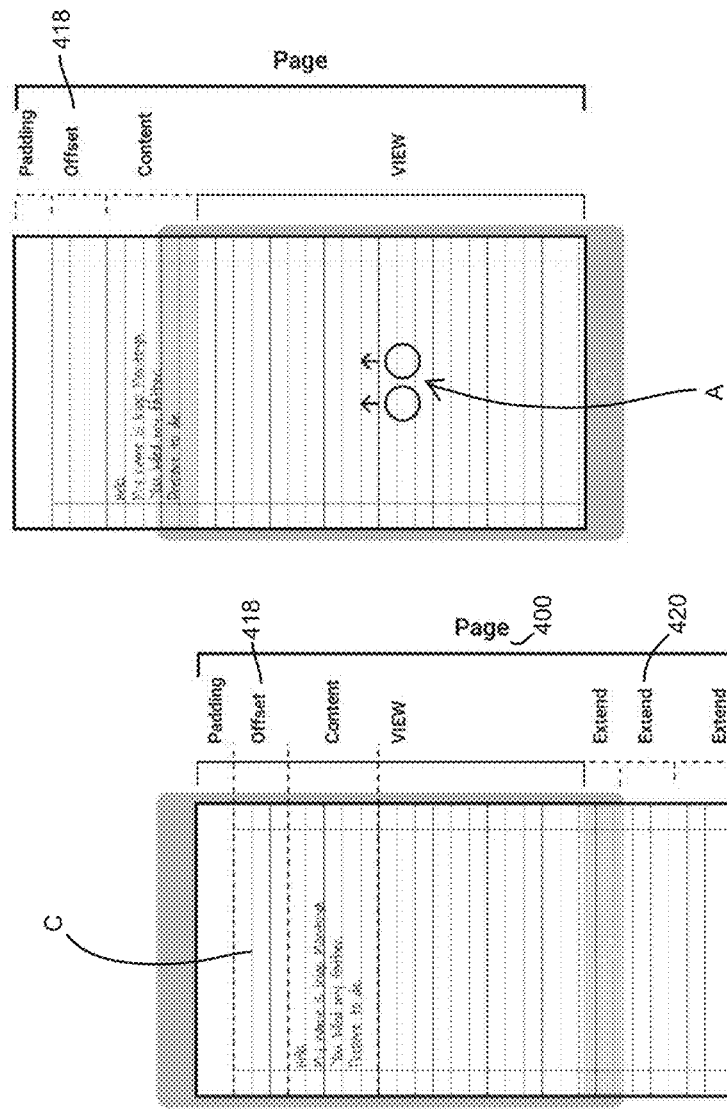

FIG. 12A

| Total | Column Count | | | | | | | | | | | | | | | |
|---|---|---|---|---|---|---|---|---|---|---|---|---|---|---|---|---|
| | 1/x | 2/x | 3/x | 4/x | 5/x | 6/x | 7/x | 8/x | 9/x | 10/x | 11/x | 12/x | 13/x | 14/x | 15/x | 16/x |
| x/1 | 1/1 | | | | | | | | | | | | | | | |
| x/2 | 1/2 | | | | | | | | 2/2 | | | | | | | |
| x/4 | 1/4 | | | 2/4 | | | | 3/4 | | | | 4/4 | | | | |
| x/6 | 1/6 | | 2/6 | | 3/6 | | 4/6 | | 5/6 | | 6/6 | | | | | |
| x/8 | 1/8 | | 2/8 | | 3/8 | | 4/8 | | 5/8 | | 6/8 | | 7/8 | | 8/8 | |
| x/12 | 1/12 | 2/12 | 3/12 | 4/12 | 5/12 | 6/12 | 7/12 | 8/12 | 9/12 | 10/12 | 11/12 | 12/12 | | | | |
| x/16 | 1/16 | 2/16 | 3/16 | 4/16 | 5/16 | 6/16 | 7/16 | 8/16 | 9/16 | 10/16 | 11/16 | 12/16 | 13/16 | 14/16 | 15/16 | 16/16 |

FIG. 12B

| Total | Column Count | | | | | | | | | | | | | | | |
|---|---|---|---|---|---|---|---|---|---|---|---|---|---|---|---|---|
| | 1/x | 2/x | 3/x | 4/x | 5/x | 6/x | 7/x | 8/x | 9/x | 10/x | 11/x | 12/x | 13/x | 14/x | 15/x | 16/x |
| x/1 | 1/1 | | | | | | | | | | | | | | | |
| x/2 | 1/2 | | | | | | | | 2/2 | | | | | | | |
| x/4 | 1/4 | | | 2/4 | | | | 3/4 | | | | 4/4 | | | | |
| x/8 | 1/8 | | 2/8 | | 3/8 | | 4/8 | | 5/8 | | 6/8 | | 7/8 | | 8/8 | |
| x/16 | 1/16 | 2/16 | 3/16 | 4/16 | 5/16 | 6/16 | 7/16 | 8/16 | 9/16 | 10/16 | 11/16 | 12/16 | 13/16 | 14/16 | 15/16 | 16/16 |

2500

I wish the ring had never come to me,
I wish none of this had ever happened.
So do all who live to see such times,
but that is not for them to decide.
All we have to decide is what to do
with the time that's been given to us.

— 410

I wish the ring had never come to me, I wish none of this had ever happened.
So do all who live to see such times, but that is not for them to decide.
All we have to decide is what to do with the time that's been given to us.

SYSTEM AND METHOD OF DIGITAL NOTE TAKING

CROSS-REFERENCE TO RELATED APPLICATIONS

This application claims priority to European Application No. 15290219.3 filed on Aug. 25, 2015, the entire contents of which is incorporated by reference herein.

TECHNICAL FIELD

The present description relates generally to the field of digital note taking systems and methods using computing device interfaces. The present description relates more specifically to digital note taking systems and methods capable of recognizing user input handwriting of various characters, symbols and objects.

BACKGROUND

Computing devices continue to become more ubiquitous to daily life. They take the form of computer desktops, laptop computers, tablet computers, e-book readers, mobile phones, smartphones, wearable computers, global positioning system (GPS) units, enterprise digital assistants (EDAs), personal digital assistants (PDAs), game consoles, and the like. Further, computing devices are being incorporated into vehicles and equipment, such as cars, trucks, farm equipment, manufacturing equipment, building environment control (e.g., lighting, HVAC), and home and commercial appliances.

Computing devices generally consist of at least one processing element, such as a central processing unit (CPU), some form of memory, and input and output devices. The variety of computing devices and their subsequent uses necessitate a variety of interfaces and input devices. One such input device is a touch sensitive surface such as a touch screen or touch pad wherein user input is received through contact between the user's finger or an instrument such as a pen or stylus and the touch sensitive surface. Another input device is an input surface that senses gestures made by a user above the input surface. Either of these methods of input can be used generally for drawing or inputting text. When user input is text the user's handwriting is interpreted using a handwriting recognition system or method.

One application of handwriting recognition in portable computing devices, such as smartphones, phablets and tablets, is in note taking. This particularly occurs in education and business settings where the user of the computing device captures notes, for example, during a lecture or meeting. This is usually done by the user launching a handwritten note taking application on the computing device which accepts and interprets, either locally in the device or remotely via a communications link of the device, handwritten notes input on the touch sensitive surface. Conventionally such handwritten note taking applications are limited in their capabilities to provide a full document creation experience to users from the notes taken, since the focus of these applications has primarily been recognition accuracy rather than document creation. That is, available applications provide recognition of handwriting and conversion of the recognized handwriting into typeset text, with various feedback mechanisms to the user, but that is generally the extent of the interaction with the input.

If the user desires any further interaction with the output text, such as editing the content, manipulating the layout of the notes, or converting or adding the notes into a document, the text generally needs to be imported into a separate document processing application. This in itself is no great problem, however as the original layout of the handwritten notes and the actual input handwriting itself, so-called digital ink, is typically discarded in the import process, the user must refer back to the original notes in order to ascertain the intent in the notes taken. For example, the user may have emphasized certain words or passages in the notes either by annotation or decoration, or through the layout of the notes content itself.

Further, once the import is performed into the separate application the ability to add or edit content through further note taking is generally lost, and the user must in effect begin a new note which must itself be imported into the document. Such a cumbersome method clearly limits the ability of continuing or updating notes for inclusion in documents over different sessions, e.g., over multiple lectures or multiple business meetings, or through collaboration and sharing. Of course, users could delay importation to a document processing application until the note taking is finished over such multiple sessions, with or without multiple users. However, since many people nowadays have multiple portable computing devices which are interconnected it may be desired to perform these multiple sessions on these different computing devices, or at least access the notes on these different devices.

For example, a user may begin a note on their laptop during a lecture or meeting, then wish to add to that note using their tablet during a conversation with a colleague or friend, and then later share the updated note using their smartphone. The available input and display space on the screens of these devices can vary significantly. Further, some devices allow display at different orientations, i.e., portrait and landscape. As such, the user's layout of the notes using one device at one orientation may be significantly changed when the notes are displayed and interacted with on a different device or at a different orientation. Accordingly, continued note taking on specific note layout over these different display scenarios is presently difficult.

Other issues with the note taking layout occur without even considering the complexities of multiple devices and orientations. Available handwritten note taking applications generally provide users with the ability to typeset the handwritten input either manually or automatically (e.g., on-the-fly). However, as typeset text is generally smaller and more uniform than handwritten text (described in detail later), the user's layout of the handwritten input, such as in sentences in paragraphs, may not translate well to typeset text, e.g., the sentences become too short such that the paragraphs lose visual meaning and look more like lists than paragraphed text. This can be overcome by reflowing the typeset text so that the layout appears to be preserved, e.g., paragraphs are retained. However, the user's original handwritten layout may have actually been a list not a paragraph, for example, and without an explicit indication of such layouts it is difficult for the handwriting recognition process to detect these instances.

Conventional processes require users to input certain symbols or characters, e.g., bullet points, or use particular gestures to indicate such layouts. However, the user should be able to input handwritten notes in their desired layout without needing to consider the manner in which the handwritten note taking application will handle that input. This is because, the Applicant has found that when using handwriting note taking applications users generally are unable or do not desire to learn specific input methods or gestures that are not natural or intuitive, or to make settings through menus and the like.

Further, note taking generally takes many forms, and user's don't only take notes using text characters. For example, notes may include many types of content, such as text, drawings, diagrams, mathematical or chemical equations and music notation. Further, the user may want to insert other media into the note, such as images and audio or video recordings. Accordingly, such multi-content and multi-media input should be supported whilst respecting the user's layout of these inputs.

SUMMARY

The examples of the present invention that are described herein below provide systems, methods and a computer program product for use in digital note taking with handwriting input to a computing device. The computer program product has a computer usable medium with a computer readable program code embodied therein adapted to be executed to implement the method.

The computing device is connected to an input device in the form of an input surface. A user is able to provide input by applying pressure to or gesturing above the input surface using either his or her finger or an instrument such as a stylus or pen. The present system and method monitors the input strokes.

The computing device has a processor and at least one application for recognizing the handwriting input under control of the processor. The at least one system application is configured to cause display of, on a display interface of a computing device, digital ink in a block layout in accordance with a layout of blocks of the handwriting input and a configuration of the computing device display interface.

Another aspect of the disclosed system and method provides each block of digital ink configured to be interactive with the at least one system application configured to cause change in the layout display in response to receiving interaction with the blocks.

Another aspect of the disclosed system and method provides the at least one system application configured to cause change in the layout display in response to aspect view changes of the display interface, where the configuration of the computing device display interface includes a first aspect view at a first orientation computing device and a second aspect view at a second orientation of the computing device. The first aspect view is portrait and the second aspect view is landscape.

Another aspect of the disclosed system and method provides the at least one system application configured to cause change in the layout display in response to display on computing devices having display interfaces of different horizontal and/or vertical dimensions, where the configuration of each computing device display interface is defined by horizontal and vertical dimensions of that display interface.

BRIEF DESCRIPTION OF THE DRAWINGS

The present system and method will be more fully understood from the following detailed description of the examples thereof, taken together with the drawings. In the drawings like reference numerals depict like elements. In the drawings:

FIGS. 6A and 6B show schematic views of the scroll page with and without input content in different scrolled positions;

FIGS. 7A and 7B show schematic views of the scroll page with and without input content in different scrolled positions;

FIGS. 12A and 12B shows tables of rules for adaption of the columns with respect to the input surface size;

FIG. 25 shows an example digital ink paragraph and its typeset equivalent;

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Reference to and discussion of directional features such as up, down, above, below, lowest, highest, horizontal, vertical, etc., are made with respect to the Cartesian coordinate system as applied to the input surface on which the input to be recognized is made. Further, the use of the term 'text' in the present description is understood as encompassing all alphanumeric characters, and strings thereof, in any written language and common place non-alphanumeric characters, e.g., symbols, used in written text. Furthermore, the term 'non-text' in the present description is understood as encompassing freeform handwritten content and rendered text and image data, as well as non-alphanumeric characters, and strings thereof, and alphanumeric characters, and strings thereof, which are used in non-text contexts.

The various technologies described herein generally relate to capture, processing and management of handwritten content on portable and non-portable computing devices in a manner which allows conversion of that content into publishable documents. The systems and methods described herein may utilize recognition of users' natural writing or drawing styles input to a computing device via an input surface, such as a touch sensitive screen, connected to, or of, the computing device or via an input device, such as a digital pen or mouse, connected to the computing device. Whilst the various examples are described with respect to recognition of handwriting input using so-called online recognition techniques, it is understood that application is possible to other forms of input for recognition, such as offline recognition in which images rather than digital ink are recognized.

Figure 1:
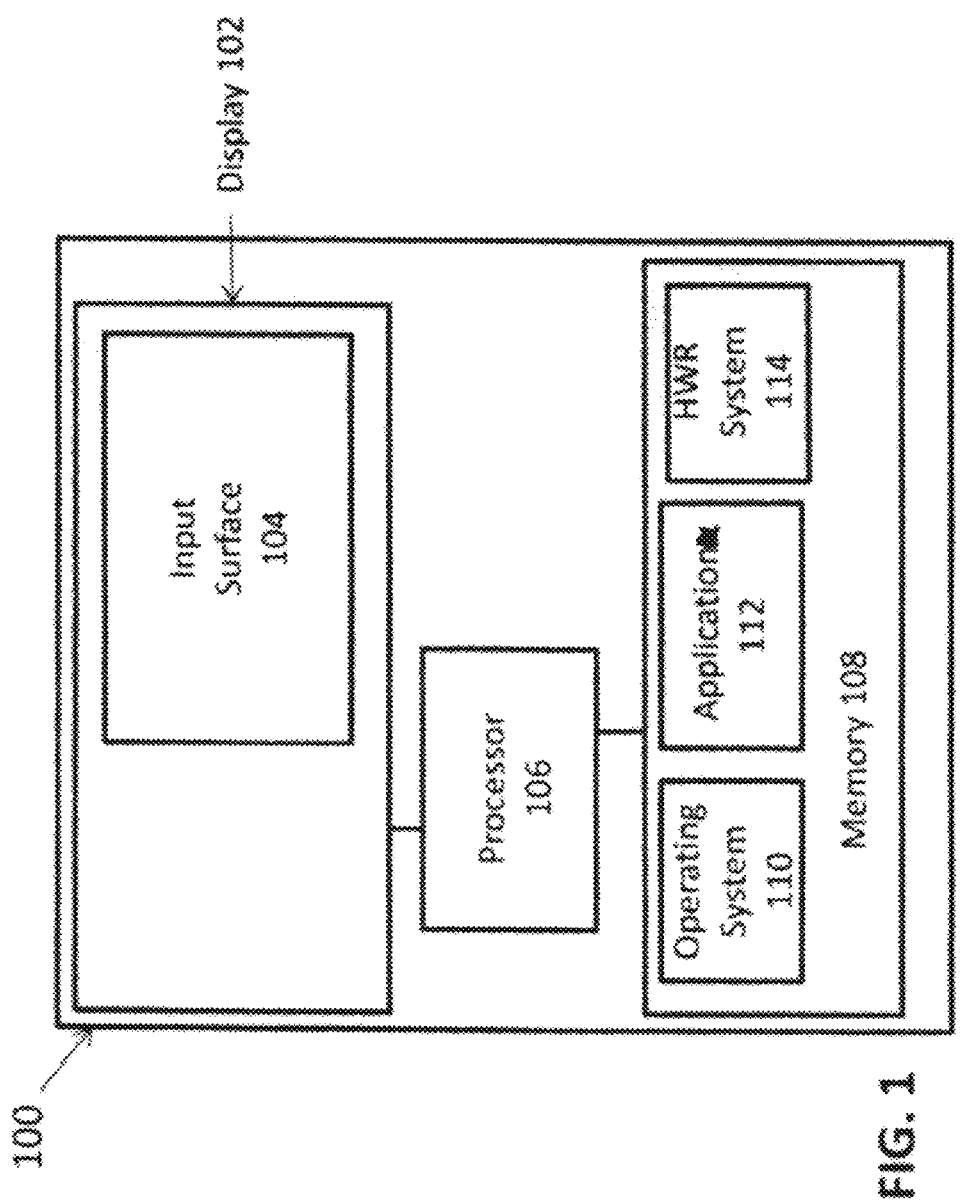
FIG. 1 shows a block diagram of a computing device in accordance with an example of the present system and method.

FIG. 1 shows a block diagram of an example computing device 100. The computing device may be a computer desktop, laptop computer, tablet computer, e-book reader, mobile phone, smartphone, wearable computer, digital watch, interactive whiteboard, global positioning system (GPS) unit, enterprise digital assistant (EDA), personal digital assistant (PDA), game console, or the like. The computing device 100 includes components of at least one processing element, some form of memory and input and/or output (I/O) devices. The components communicate with each other through inputs and outputs, such as connectors, lines, buses, cables, buffers, electromagnetic links, networks, modems, transducers, IR ports, antennas, or others known to those of ordinary skill in the art.

The computing device 100 has at least one display 102 for outputting data from the computing device such as images, text, and video. The display 102 may use LCD, plasma, LED, iOLED, CRT, or any other appropriate technology that is or is not touch sensitive as known to those of ordinary skill in the art. At least some of the display 102 is co-located with at least one input surface 104. The input surface 104 may employ technology such as resistive, surface acoustic wave, capacitive, infrared grid, infrared acrylic projection, optical imaging, dispersive signal technology, acoustic pulse recognition, or any other appropriate technology as known to those of ordinary skill in the art to receive user input. The input surface 104 may be bounded by a permanent or video-generated border that clearly identifies its boundaries.

In addition to the input surface 104, the computing device 100 may include one or more additional I/O devices (or peripherals) that are communicatively coupled via a local interface. The additional I/O devices may include input devices such as a keyboard, mouse, scanner, microphone, touchpads, bar code readers, laser readers, radio-frequency device readers, or any other appropriate technology known to those of ordinary skill in the art. Further, the I/O devices may include output devices such as a printer, bar code printers, or any other appropriate technology known to those of ordinary skill in the art. Furthermore, the I/O devices may include communications devices that communicate both inputs and outputs such as a modulator/demodulator (modem; for accessing another device, system, or network), a radio frequency (RF) or other transceiver, a telephonic interface, a bridge, a router, or any other appropriate technology known to those of ordinary skill in the art. The local interface may have additional elements to enable communications, such as controllers, buffers (caches), drivers, repeaters, and receivers, which are omitted for simplicity but known to those of skill in the art. Further, the local interface may include address, control, and/or data connections to enable appropriate communications among the other computer components.

The computing device 100 also includes a processor 106, which is a hardware device for executing software, particularly software stored in the memory 108. The processor can be any custom made or commercially available general purpose processor, a central processing unit (CPU), a semiconductor based microprocessor (in the form of a microchip or chipset), a macroprocessor, microcontroller, digital signal processor (DSP), application specific integrated circuit (ASIC), field programmable gate array (FPGA) or other programmable logic device, discrete gate or transistor logic, discrete hardware components, state machine, or any combination thereof designed for executing software instructions known to those of ordinary skill in the art. Examples of suitable commercially available microprocessors are as follows: a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc., a 68xxx series microprocessor from Motorola Corporation, DSP microprocessors, or ARM microprocessors.

The memory 108 can include any one or a combination of volatile memory elements (e.g., random access memory (RAM, such as DRAM, SRAM, or SDRAM)) and nonvolatile memory elements (e.g., ROM, EPROM, flash PROM, EEPROM, hard drive, magnetic or optical tape, memory registers, CD-ROM, WORM, DVD, redundant array of inexpensive disks (RAID), another direct access storage device (DASD)). Moreover, the memory 108 may incorporate electronic, magnetic, optical, and/or other types of storage media. The memory 108 can have a distributed architecture where various components are situated remote from one another but can also be accessed by the processor 106. Further, the memory 108 may be remote from the device, such as at a server or cloud-based system, which is remotely accessible by the computing device 100. The memory 108 is coupled to the processor 106, so the processor 106 can read information from and write information to the memory 108. In the alternative, the memory 108 may be integral to the processor 106. In another example, the processor 106 and the memory 108 may both reside in a single ASIC or other integrated circuit.

The software in the memory 108 includes an operating system 110 and an application 112. The software optionally further includes a handwriting recognition (HWR) system 114 which may each include one or more separate computer programs. Each of these has an ordered listing of executable instructions for implementing logical functions. The operating system 110 controls the execution of the application 112 (and the HWR system 114). The operating system 110 may be any proprietary operating system or a commercially available operating system, such as WEBOS, WINDOWS®, MAC and IPHONE OS®, LINUX, and ANDROID. It is understood that other operating systems may also be utilized.

The application 112 includes one or more processing elements related to detection, management and treatment of the layout of user input (discussed in detail later). The software may also include one or more other applications related to handwriting recognition, different functions, or both. Some examples of other applications include a text editor, telephone dialer, contacts directory, instant messaging facility, computer-aided design (CAD) program, email program, word processing program, web browser, and camera. The application 112, and the other applications, include program(s) provided with the computing device 100 upon manufacture and may further include programs uploaded or downloaded into the computing device 100 after manufacture.

The HWR system 114, with support and compliance capabilities, may be a source program, executable program (object code), script, application, or any other entity having a set of instructions to be performed. When a source program, the program needs to be translated via a compiler, assembler, interpreter, or the like, which may or may not be included within the memory, so as to operate properly in connection with the operating system. Furthermore, the handwriting recognition system with support and compliance capabilities can be written as (a) an object oriented programming language, which has classes of data and methods; (b) a procedure programming language, which has routines, subroutines, and/or functions, for example but not limited to C, C++, Pascal, Basic, Fortran, Cobol, Perl, Java, Objective C, Swift, and Ada; or (c) functional programming languages for example but no limited to Hope, Rex, Common Lisp, Scheme, Clojure, Racket, Erlang, OCaml, Haskell, Prolog, and F#. Alternatively, the HWR system 114 may be a method or system for communication with a handwriting recognition system remote from the device, such as server or cloud-based system, but is remotely accessible by the computing device 100 through communications links using the afore-mentioned communications I/O devices of the computing device 100. Further, the application 112 and the HWR system 114 may operate together or be combined as a single application.

Strokes entered on or via the input surface 104 are processed by the processor 106 as digital ink. A user may enter a stroke with a finger or some instrument such as a pen or stylus suitable for use with the input surface. The user may also enter a stroke by making a gesture above the input surface 104 if technology that senses motions in the vicinity of the input surface 104 is being used, or with a peripheral device of the computing device 100, such as a mouse or joystick. A stroke is characterized by at least the stroke initiation location, the stroke termination location, and the path connecting the stroke initiation and termination locations. Because different users may naturally write the same object, e.g., a letter, a shape, a symbol, with slight variations, the HWR system accommodates a variety of ways in which each object may be entered whilst being recognized as the correct or intended object.

Figure 2:
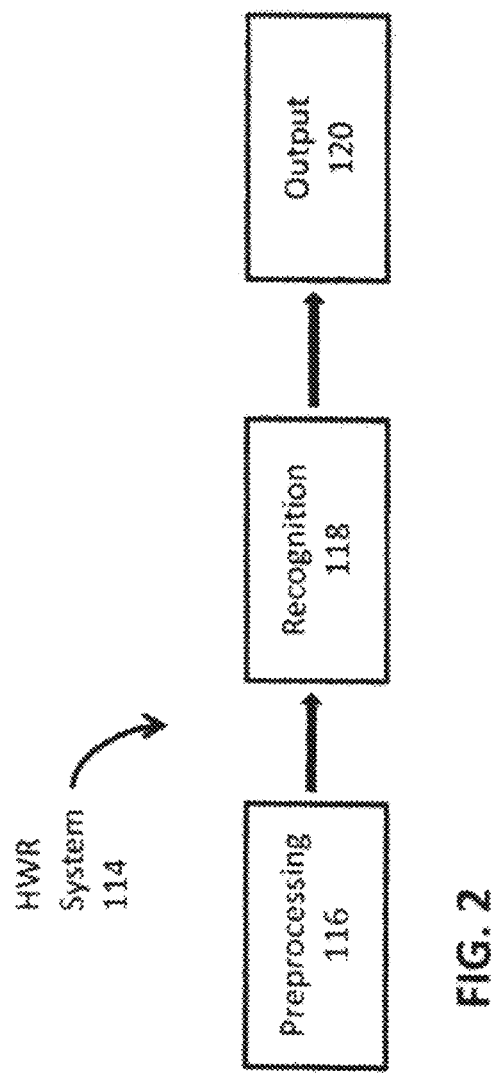
FIG. 2 shows a block diagram of a system for handwriting recognition in accordance with an example of the present system and method.

FIG. 2 is a schematic pictorial of an example of the HWR system 114, in either its local (i.e., loaded on the device 100) or remote (i.e., remotely accessible by the device 100) forms. The HWR system 114 includes stages such as pre-processing 116, recognition 118 and output 120. The pre-processing stage 116 processes the digital ink to achieve greater accuracy and reducing processing time during the recognition stage 118. This preprocessing may include normalizing of the path connecting the stroke initiation and termination locations by applying size normalization and/or methods such as B-spline approximation to smooth the input. The preprocessed strokes are then passed to the recognition stage 118 which processes the strokes to recognize the objects formed thereby. The recognized objects are then output 120 to the display 102 generally as a typesetted version of the handwritten elements/characters.

Figure 3:
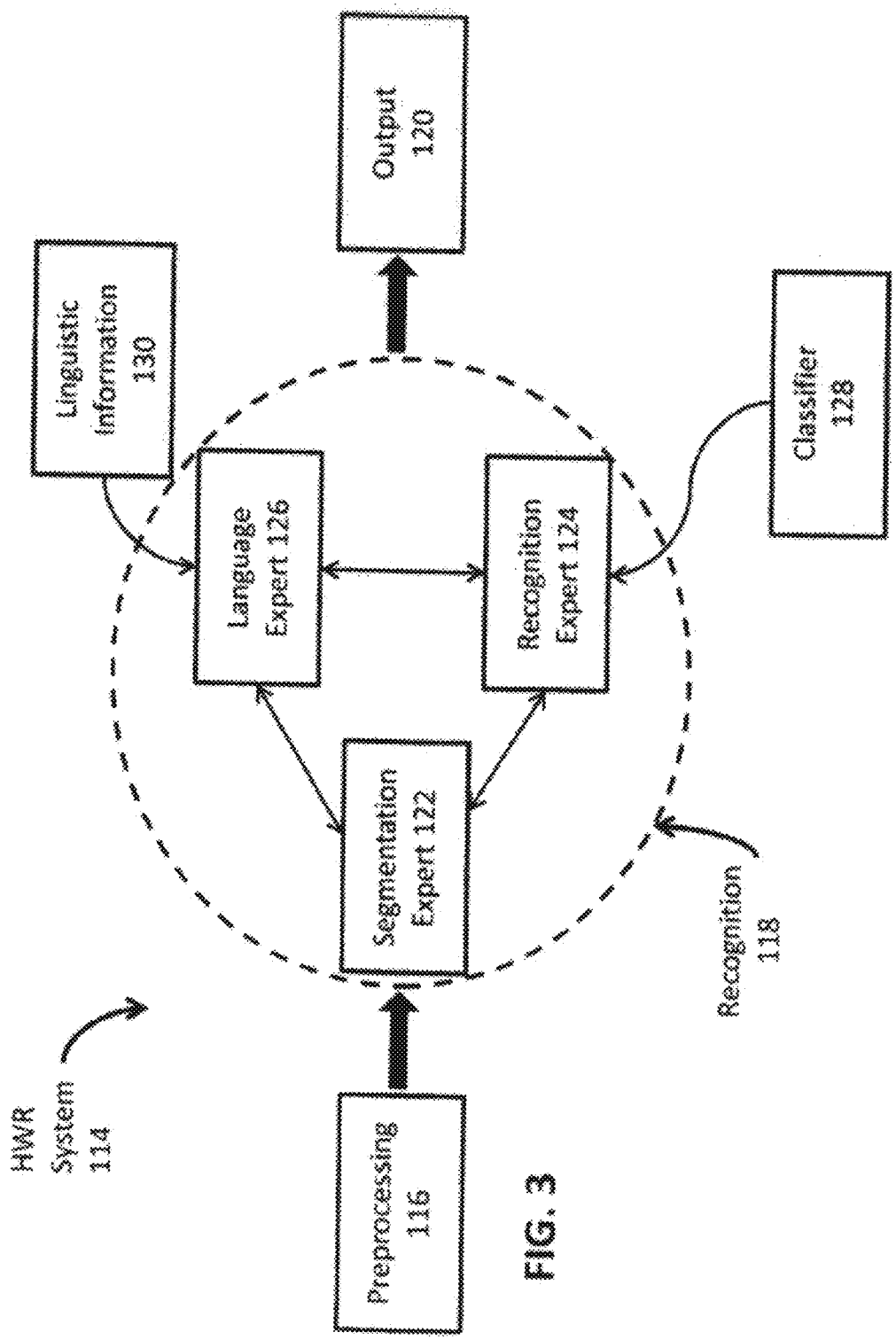
FIG. 3 shows a block diagram illustrating detail of the handwriting recognition system of FIG. 2 in accordance with an example of the present system and method.

The recognition stage 118 may include different processing elements or experts. FIG. 3 is a schematic pictorial of the example of FIG. 2 showing schematic detail of the recognition stage 118. Three experts, a segmentation expert 122, a recognition expert 124, and a language expert 126, are illustrated which collaborate through dynamic programming to generate the output 120.

The segmentation expert 122 defines the different ways to segment the input strokes into individual element hypotheses, e.g., alphanumeric characters and mathematical operators, text characters, individual shapes, or sub expression, in order to form expressions, e.g., words, mathematical equations, or groups of shapes. For example, the segmentation expert 122 may form the element hypotheses by grouping consecutive strokes of the original input to obtain a segmentation graph where each node corresponds to at least one element hypothesis and where adjacency constraints between elements are handled by the node connections. Alternatively, the segmentation expert 122 may employ separate experts for different input types, such as text, drawings, equations, and music notation.

The recognition expert 124 provides classification of the features extracted by a classifier 128 and outputs a list of element candidates with probabilities or recognition scores for each node of the segmentation graph. Many types of classifiers exist that could be used to address this recognition task, e.g., Support Vector Machines, Hidden Markov Models, or Neural Networks such as Multilayer Perceptrons, Deep, Convolutional or Recurrent Neural Networks. The choice depends on the complexity, accuracy, and speed desired for the task.

The language expert 126 generates linguistic meaning for the different paths in the segmentation graph using language models (e.g., grammar or semantics). The expert 126 checks the candidates suggested by the other experts according to linguistic information 130. The linguistic information 130 can include a lexicon, regular expressions, etc. The language expert 126 aims at finding the best recognition path. In one example, the language expert 126 does this by exploring a language model such as final state automaton (determinist FSA) representing the content of linguistic information 130. In addition to the lexicon constraint, the language expert 126 may use statistical information modeling for how frequent a given sequence of elements appears in the specified language or is used by a specific user to evaluate the linguistic likelihood of the interpretation of a given path of the segmentation graph.

The present system and method make use of the HWR system 114 in order to recognize handwritten input to the device 100. As mentioned earlier, the application 112 includes application(s) for handling the layout of the recognized user input. Such applications may be provided in an architecture with separate layers for handling different processing. One or more of these layers may be remote to the device 100 accessible via the communications channels mentioned earlier. The layers may include application wrapper(s), platform wrapper(s) and (platform specific) application user interface(s).

The application 112 provided by the present system and method allows users, such as students, academic and working professionals, to take handwritten notes, such as during lectures, meetings and brainstorming sessions, which they can transform into sharable formatted documents on their portable or non-portable computing devices. The application allows taking of 'clean' notes which can be searched and memorized properly using their computing devices. The present system and method further allow natural writing to be input since the writing is made on (ruled) lines, and paragraphs and other layout elements are respected responsive to orientation (i.e., portrait or landscape) and device display capacity. Synchronization of the captured notes between devices and auto-saving of notes are also supported. Typesetting of the handwritten notes, via the HWR system, either on-demand or on-the-fly is also supported. Searching of both the recognized typeset text and the digital ink, such as with the systems and methods described in US Patent Application Publication US 2009/0077053 assigned to the present Applicant, the entire contents of which is incorporated by reference herein, is also supported, including indexation-on-the-fly. Export options to various formats, such as a text, Latex, HTML, image, pdf, etc., is also supported. These and other aspects are now described.

The application 112 utilizes a framework for the definition and handling of documents and document elements so as to provide structured content allowing layout definition and preservation. This document model handles different types of document elements, which are best described with HTML5 reference, for example, see W3C HTML5 DOM—Kinds of content: http://www.w3.org/TR/html5/dom.html#kinds-of-content. The document model utilized by the application 112 does not reproduce HTML specifications, rather it takes inspiration from them. A subset of the elements of the document model is flow, sectioning, heading, phrasing, embedded and interactive.

Regarding flow, most elements that are used in the body of documents and applications are categorized as flow content. Content flow basically works just like an HTML DOM, being a structured tree of nodes rendered vertically into main text view. All input goes by default into content flow, cascading vertically from top of the document and left-aligned for left-to-right written languages or right-aligned for right-to-left written languages. Sectioning content is content that defines the scope of headings and footers. Heading content defines the header of a section (whether explicitly marked up using sectioning content elements, or implied by the heading content itself). Phrasing content is the text of the document, as well as elements that mark up that text at the intra-paragraph level. Runs of phrasing content form paragraphs. Embedded content is content that imports another resource into the document, or content from another vocabulary that is inserted into the document. Interactive content is content that is specifically intended for user interaction. These document elements, and others elements, are utilized in the document model with respect to the content.

An initial aspect of the document model and feature of the application 112 is the provision of an effectively infinite vertical scrolling interface for the input of handwritten notes and other content by a user. A thousand years ago, content was written on scrolls that one would unroll to read/write. The Codex (ancestor of the book) was invented based on user experience optimization as large rolls were cut into pages thereby providing random and faster access to any part of the content, instead of unrolling the scroll from start to end. This completely and permanently changed the recording of written content, and the book has been the one and only content holder for the last millennium. However, the current digital era in which writing is performed on a dynamic screen interface provides the potential for different paradigms to be adopted. Accordingly, note taking applications and associated user interfaces need not blindly mimic the page paradigm, rather solutions which offer more or enhanced features over either simple page-turn or (infinite) scroll should be evaluated.

Conventional handwritten note taking applications are based on separated and fixed-dimensions pages, imitating real world pages. This 'card' approach is convenient for users to intuitively embrace creating content using handwriting on-screen, however it does not fit with other digital document contexts which all have unlimited height, such as:
  Websites, which care freely scrollable
  ePubs, which are paginated and freely scrollable
  text editors, which use pagination with freely scrollable pages.

The Applicant has found that users of existing digital note taking applications have issues understanding how text behaves when editing, with text reflow and uncontrolled text/object position. In order to lower the learning curve for use of such applications, handwriting should be closer to what users are familiar with. That is, writing with keyboard in text editing software/web services, with the same model, behaviors and infinite scrollable pages. Any digital device user is already accustomed to scrolling (either reading or writing). Scrolling is also a natural and intuitive pattern on touch devices. A quick solution in the handwritten note taking environment would be to just change the way pages are laid out, such as:
  fixed page size (defined by device screen or viewport when creating content)
  pages stacked vertically
  allow page breaks for users who prefer paginated content
  allow free vertical scroll for users who prefer scrolling.

However, such a solution does not address all the issues discussed earlier. For example, users would still face layout issues when typesetting. Accordingly, the note taking application of the present system and method provides a typeset 100% compatible solution as it utilizes a pure vertical scroll model featuring an infinite-height single page. This model allows:
  users to write on an infinite page or 'scroll page' as in a digital document, where:
    users are not limited by fixed page size;
    scroll pages can be sliced into fragments, with one fragment being about 500 sections or more, for example;
    time to load a large scroll page of content is about 50 milliseconds;

users can scroll using gestures on or above the touch sensitive surface of the device interface, such as using two fingers users to select page mode display where:
   the infinite page is broken into sections;
   a visualization option is provided to select between displaying the sections on top of each other or displaying top and bottom margins between sections as a strong visual separator of vertical pages responsive display in which notes are displayed correctly independent of device size/orientation users to find existing content and sections easily via navigation conversion of existing notes into scroll pages flawlessly.

Using vertical scroll for digital note taking means that writing is performed in a content flow instead of absolute positioned blocks, with all text cascading vertically just like an HTML page or a word processing document. By default, vertical content order defines model structure and all layout changes have impact on all content below, pushing down or pulling up. Accordingly, these changes to the users' layout must be considered and taken account of. However, users should still be provided with the ability to write anywhere on the page, i.e., both vertically and horizontally, create two-dimensional objects, move things around and create layout on-the-fly. These abilities need to be balanced however so that a 'perfect' looking responsive document is created. This means:

all input goes into content flow writing offset from margins creates floating blocks that are anchored to content flow document model can create invisible container nodes to handle responsive layout of floating blocks document model regularly edits and moves content from node/fragment to another to reflect layout/model changes in real-time all paragraphs/blocks are aligned to a (vertical and horizontal) grid during content input (along with reflow action and typeset/beautification).

Figure 4:
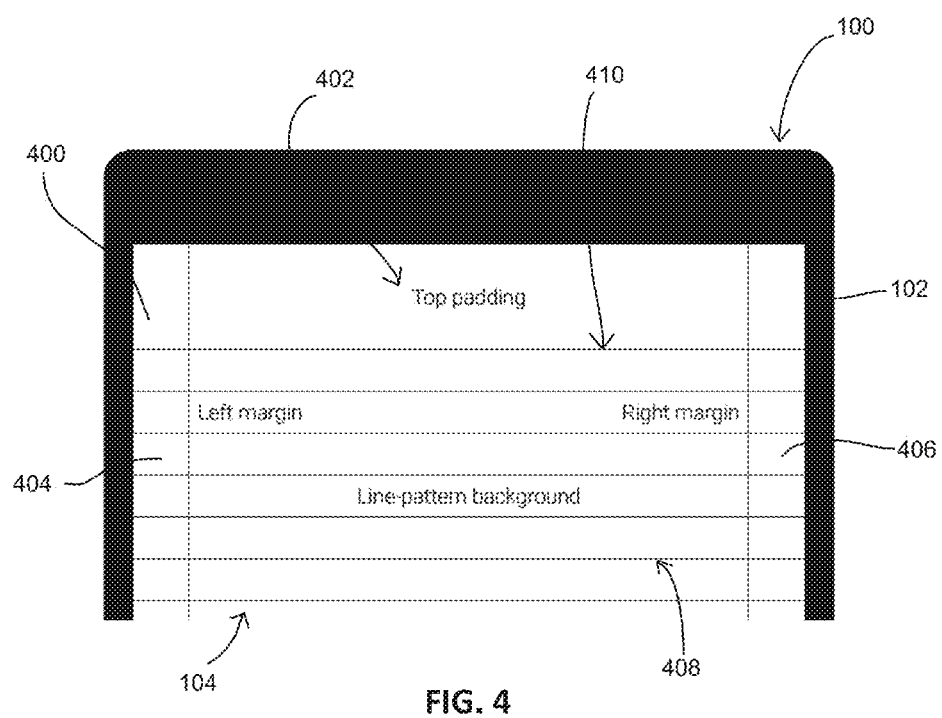
FIG. 4 shows a schematic view of an example visual rendering of a scroll page on a portion of an input surface of the computing device.

These and other features of the present system and method are now described in detail. FIG. 4 shows a schematic view of an example visual rendering of a scroll page 400 on a portion of the input surface 104 of an example computing device 100. The scroll page 400 is shown in editing view in which all content input is performed. Other views may be used for document structure editing and notebook navigation. Besides providing user interface (UI) controls (described later), the main object of the editing view is to provide a full-width page that overflows vertically from the display 102 of the device 100. The infinite scroll page 400 embodies a page of flexible height. In order to maximize writing space for users (particularly on smaller devices), an empty scroll page is defined to occupy at least the whole editing view height.

In the editing view (and other views as appropriate) several page elements are displayed including a top padding 402, a left margin 404 and a right margin 406. The padding and margins define an input area 408 which has a line pattern background 410. The line pattern 410 has horizontal lines separated by a multiple of the vertical rhythm height unit being the density independent pixel (dp). Regardless of the particular device 100, the vertical distance between the horizontal lines 410 is defined by a line pattern unit (LPU) and the vertical rhythm height unit provides a graduated measure of the LPU on a particular device. For example, the LPU may be set at about one centimeter for any device being a certain multiple of the vertical rhythm height unit or users may be allowed to customize the line pattern unit to a different multiple of the vertical rhythm height unit according to their writing style. Alternatively, the vertical rhythm may be based on typeset text size (e.g., the minimum text size) and the LPU is provided as a multiple of this typeset text size. All lines 410 are displayed with the same very light and subtle color, e.g., grey, that is just between visible and faded. In this way the line pattern is noticeable but unobtrusive so as to guide the handwriting input without distracting from the note taking itself. The line pattern background 410 is displayed in handwritten text context and serves multiple purposes:

forces users to write onto it so that handwriting recognition is optimized helps users adopt regular vertical rhythm writing leading to same writing size and better block dimensions and positions (described later)

gives users a hint about expected content, for example, dedicated backgrounds can be displayed for other contexts, such as drawings and equations helps users control line skipping to define paragraphs (described later).

The top padding 402 is displayed on any new page or section and does not contain the line pattern background. This helps users write with proper vertical spacing, i.e., not too close from the interface 104 border and leaves room for other elements, such as section titling and tagging. The top padding 402 is defined by multiples of the LPU, e.g., in the example of FIG. 4 the top padding is two times the LPU.

The left and right margins 404 and 406 are displayed with vertical lines. In the example of FIG. 4 these lines are similar to the line pattern 410 in color and definition, however these lines may be more boldly displayed if desired. The vertical line margins are positioned from the corresponding left and right 'page' edges with a multiplying factor of the vertical rhythm unit. This multiplying factor changes according to the particular device 100, defining different margin width calculations. Example multiplying factors are detailed in Table 1.

TABLE 1

| Device | Screen size | Multiplier | Margin width |
|---|---|---|---|
| Smartphone | less than about 17 cm (<7") | 2/3 | 32 dp |
| Phablet | about 17 to about 25 cm (7" < 10") | 3/3 | 48 dp |
| Tablet | about 25 to about 32 cm (10" < 13") | 4/3 | 64 dp |
| Laptop computer | about 32 cm to about 37 cm (13" < 15") | 5/3 | 80 dp |
| Desktop computer | about 37 cm to about 50 cm (15" < 21") | 6/3 | 96 dp |
| Television | greater than about 50 cm (>21") | 8/3 | 128 dp |

The margins 404, 406 are displayed in handwritten text context, and serve multiple purposes:

help users write with proper alignment for direction of written language, and not too close from interface border allow secure single-point scrolling within right and/or left margin (described later)

offer dedicated zone in left and/or right margin for content tagging offer dedicated zone in left and/or right margin for slice gesture to define sections of the content input on the scroll page.

In the example of FIG. 4, the margins 404, 406 are not displayed in the top padding 402 and start from the first line pattern 410 horizontal line. However, the margins may extend into the top padding if desired. Further, the line pattern 410 is not displayed in the margin elements in order to discourage writing in these areas. However, it may be desired to allow writing in the margins for annotations and the like. Alternatively, the margins may only be displayed on hover-over or contact interaction with the horizontal extents of the page 400 or totally omitted, thereby, for example, relying on natural handwriting behaviors of users to not write too close to the screen/in edges.

Figure 5B:
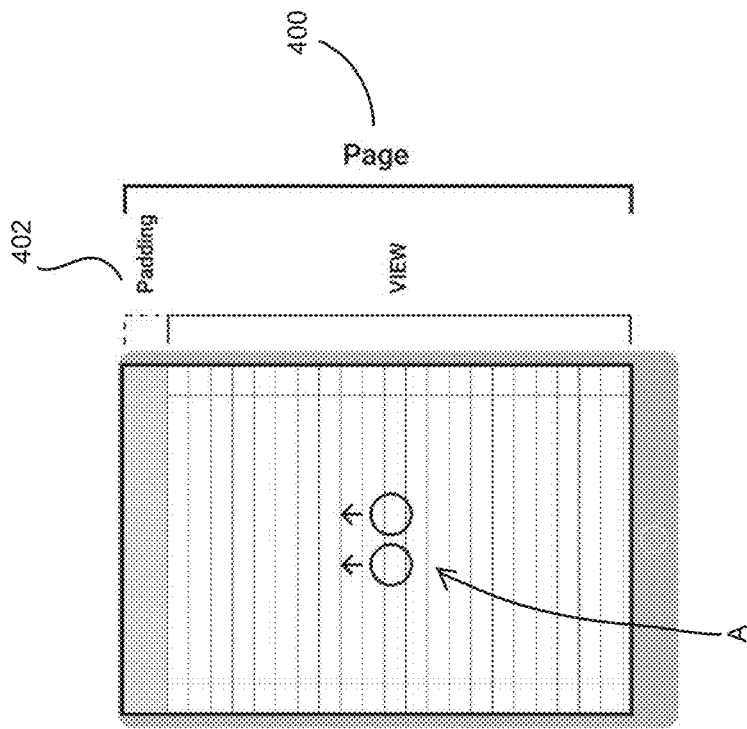
FIGS. 5A and 5B show schematic views of the scroll page with and without input content in different scrolled positions.
Figure 5A:
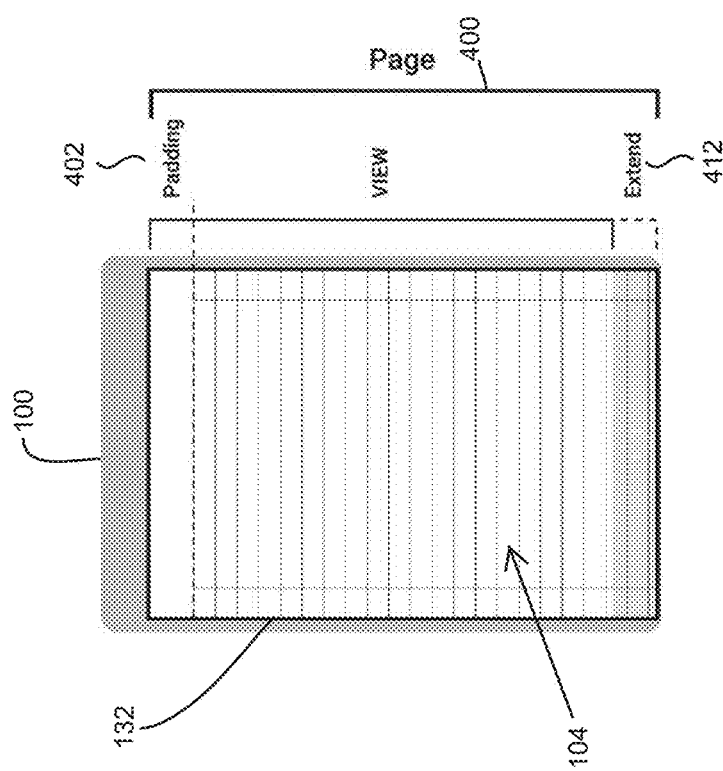

FIGS. 5A to 7B show schematic views of the example visual rendering of the scroll page 400 with and without input content in various scrolled positions in relation to the interface 104 of the device 100. In the present example, the default height of an empty scroll page is slightly larger than the height of the interface 104 so as to compensate for the top padding 402 and to allow discoverability of the scrolling feature of the application 112 by users. The empty page height is defined by the editing view height plus the top padding height, such that the editing view extends below a viewable area 132 of the interface 104. That is, as shown in FIG. 5A, the empty scroll page has the padding 402 within the viewable area 132 and an extend area 412 outside of the viewable area. In FIG. 5B, the empty scroll page has been scrolled upwards, using a multi-point scroll gesture A (described later), such that the padding 402 is outside of the viewable area 132 and the extend area is now part of the viewed scroll page 400. This empty page height is adapted when the scroll page is rendered on other devices with different screen sizes.

Any time content input occurs, the page height extends accordingly and remains scrollable to offer an uninterrupted way of writing by removing paper size limitations. That is, as shown in FIG. 6A, the height of input content B defines a content area 414 and a further extend area 416 is defined at the bottom of the scroll page 400 having the same dimensions. In this way, whatever content is entered, users are able to push it upwards outside of view to "clear" writing space without needing to create a new section (as shown in FIG. 6B), and even without writing any content the page is scrollable so that users understand the navigable aspects of the scroll page 400.

Any content input updates page properties in real-time (or as soon as possible), allowing users to scroll and push content outside of view. Page height extension equals content input height (starting from top of the first line to bottom of the last line=number of lines+1). This gives on a tablet for instance:

1 line of content: (1+1)×vertical rhythm unit=2×48=96 dp
2 lines of content: (2+1)×vertical rhythm unit=3×48=144 dp
4 lines of content: (4+1)×vertical rhythm unit=5×48=240 dp
and so on . . .

Content input may occur at any position on the page 400, with offset from the topmost position, or may be moved after input to any position on the page. That is, as shown in FIG. 7A, the height of an offset C of the input content B from the top padding 402 defines an offset area 418 and a further extend area 420 is defined at the bottom of the scroll page 400 having the same dimensions. In this way, whatever content is entered, users are able to push it upwards outside of view to "clear" writing space without needing to create a new section (as shown in FIG. 7B). Accordingly, the page height extension integrates a content offset, giving on a tablet for instance:

1 line of content with 1 line offset: ((1+1)+(1))×vertical rhythm unit=3×48=144 dp
2 lines of content with 3 lines offset: ((2+1)+(3))×vertical rhythm unit=6×48=288 dp
4 lines of content with 2 lines offset: ((4+1)+(2))×vertical rhythm unit=7×48=336 dp
and so on . . .

Vertical scroll may be handled differently depending on the ability of the computing device 100 to differentiate a users' finger from a stylus or pen (by which the device defines passive and active styli) or the ability of a stylus to indicate or communicate to the device that it is being used for handwriting or the ability of users to provide such an indication. By default, and in devices which do not differentiate, any single-point touch or hover event within the input area 408 is to be considered as content input. Thus, in order for a user to scroll the page 400 without inputting new content a multi-point interaction can be used anywhere on the input area, such as the multi-point vertical scroll gesture A using two fingers touching or hovering over the interface 104 at about the same time shown in FIG. 8.

Figure 8:
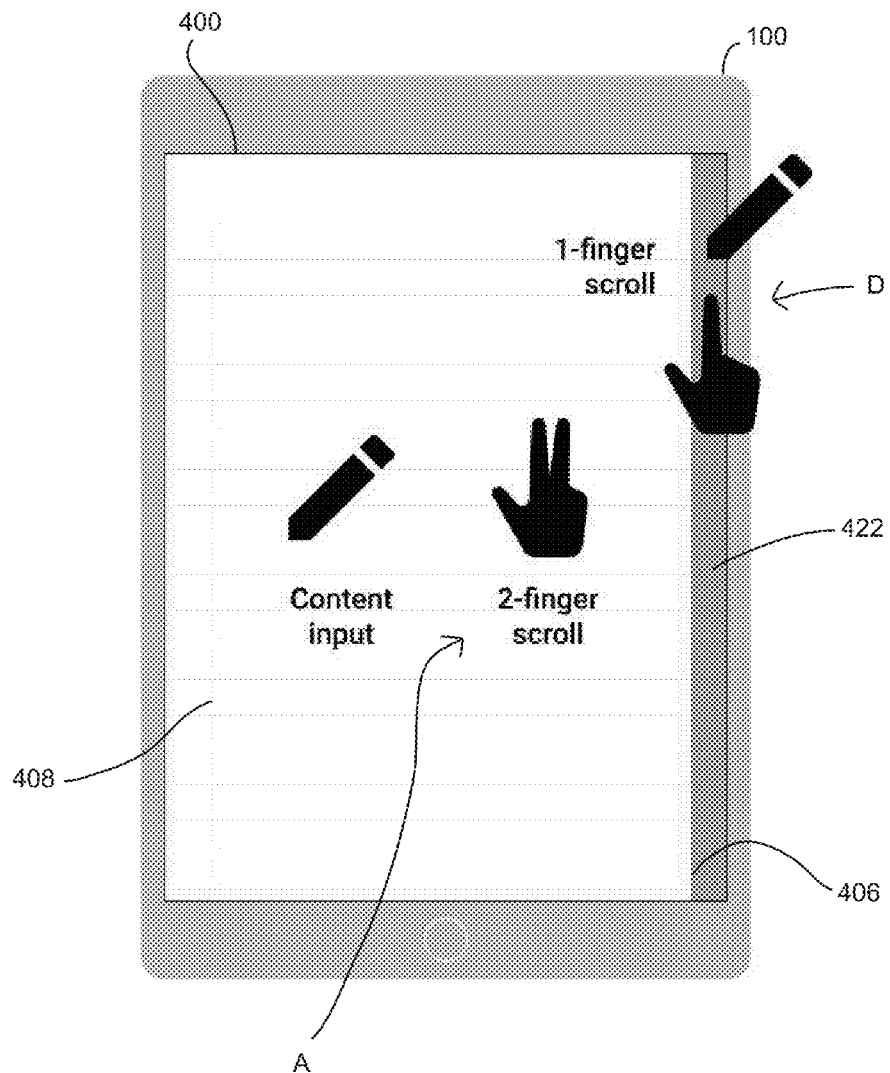
FIG. 8 shows a schematic view of an example visual rendering of the scroll page on the device input surface.

However, in order to allow scrolling without forcing multi-point interaction, a dedicated area may be defined in one or more of the margins, e.g., in FIG. 8 the right margin 406 is defined with a scroll zone 422. A single-point gesture D (shown as a one-finger or stylus gesture touching or hovering over the interface 104 in FIG. 8) which starts in this zone and has subsequent movement that (wholly or partly) occurs within this zone is not considered as content input but as a scroll gesture. The width of the scrolling area may be defined by the margin width or independent therefrom. For example, the scroll zone may be defined by touch target dimensions of users' fingers and stylus tips (about 48 dp) so that the scrolling area remains the same even with responsive resizing of the margins (e.g., wider with bigger devices).

Once a scroll sequence is launched (either with multi-point anywhere or single-point in the margin area) and until the page stops moving, scrolling may be continued using just a one-point gesture anywhere. When using a device that is able to differentiate finger from stylus, or a stylus which indicates its use to the device, or the user provides this indication, thus defining an active stylus for content input for example, multi-point interaction is not necessary and scrolling is available with a one-finger vertical scroll gesture anywhere on the interface surface 104.

Figure 9:
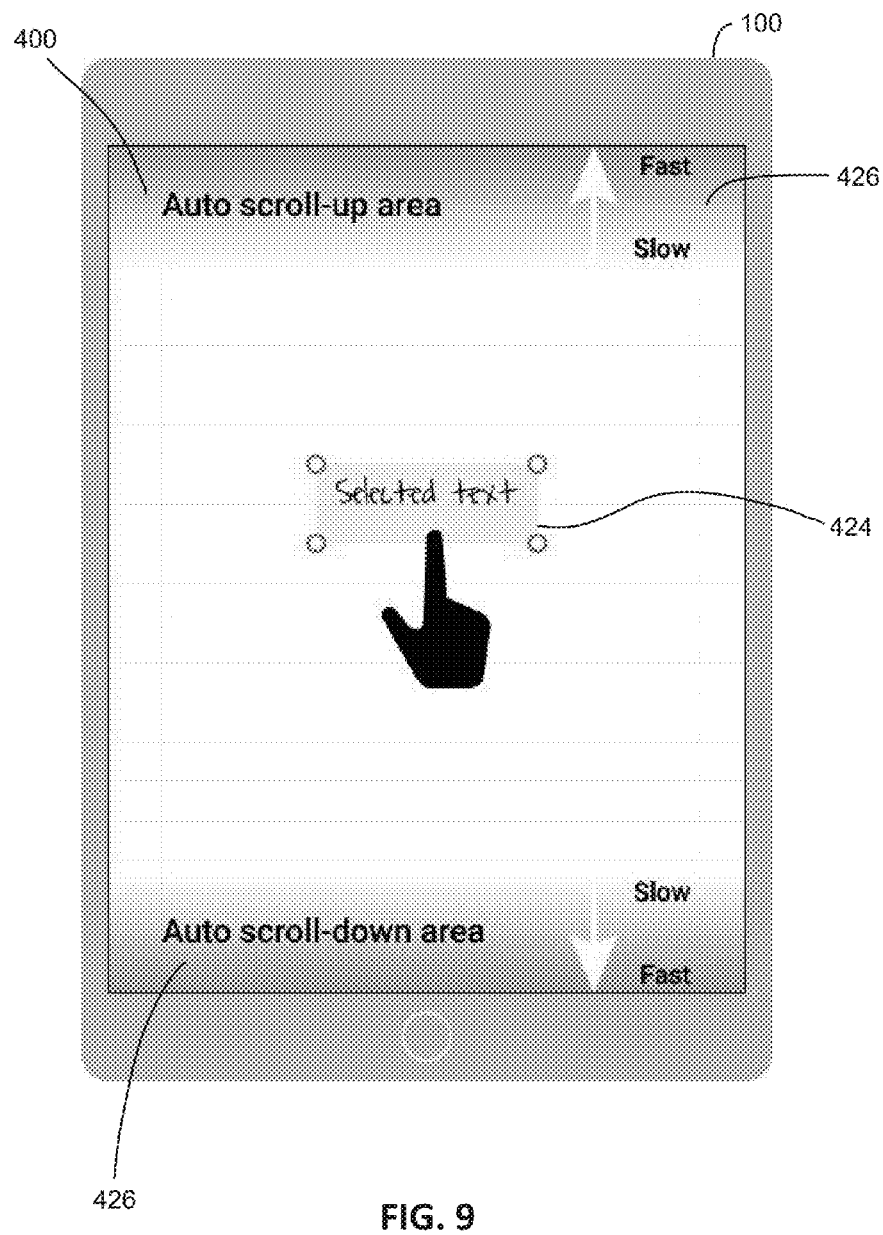
FIG. 9 shows a schematic view of an example visual rendering of the scroll page on the device input surface.

The scroll page 400 is not automatically scrolled during writing input. This allows users to have control of page position. However, automatic scrolling does occur when a user drags selected content near the top or bottom edges of the viewable area so as to allow dropping anywhere on the infinite page. That is, when selecting any type of content (text or objects), users may want to reposition that content anywhere else on the page including above or below the visible part of the page. In the example shown in FIG. 9, content 424 is selected (in a manner described later) and then dragged or pushed (with sequence display of the dragging) to move the selected content into automatic scroll areas 426 temporarily defined during selection and/or dragging/pushing close to the top or bottom edges of the viewable area 132. Once the content is dragged/pushed into the scroll areas 426, the scroll page 400 is scrolled with the scrolling speed bound to the drag position, i.e., the closer to the edge of the page 400 the faster the page scrolls. As long as content is not dropped, both top/bottom automatic scrolling areas are active to allow users to scroll in the opposite direction if scrolling went too far, for example. When content is dropped and the drag/push sequence ends, top/bottom automatic scrolling areas are disabled so that content input is re-enabled on the full viewable page.

The scroll page can be provided as either a constraint-free canvas that allows users to create object blocks (blocks of text, drawings, etc.) anywhere without worrying about sizing or alignment. However, in order to provide professionally formatted documents containing structured content, an alignment pattern may be defined onto which all content is to be aligned/defined (either at input or along user interaction). In one example of the present system and method, the alignment pattern is defined as responsive to the device size/orientation and is not itself displayed but used by the application 112 to define alignment of content elements. Various elements of an example alignment pattern 1000 are now described with reference to FIGS. 10 to 14.

The alignment pattern 1000 has left and right padding areas 1002 that prevent content from being input too close to the edges of the interface 104 of the device 100. The size of the padding areas 1002 is based on the text size related to the root element font size (rem), e.g., the font size of the <html> element. As with CSS styling (see, for example, https://developer.mozilla.org/en/docs/Web/CSS/length), the rem unit represents the default font size of the root element (e.g., one rem=16 pixels (px) for web browsers). The rem unit is considered as a responsive unit with text size being built on a modular scale for the responsive vertical rhythm unit (dp). The rem unit principle is that when the default font size for the root element is changed, all other properties inherit from this single change and all elements are adapted accordingly. However, as some browser applications may not support the rem unit, such layout can be achieved using the "em" unit instead. This definition of unit size is related with mobile device operating system (OS) Dynamic Type which implements the same behavior with other wording and variables (see, for example, https://developer.apple.com/library/ios/documentation/StringsTextFonts/Conceptual/TextAndWebiPhoneOS/CustomTextProcessing/CustomTextProcessing.html#//apple_ref/doc/uid/TP40009542-CH4-SW65).

Figure 10:
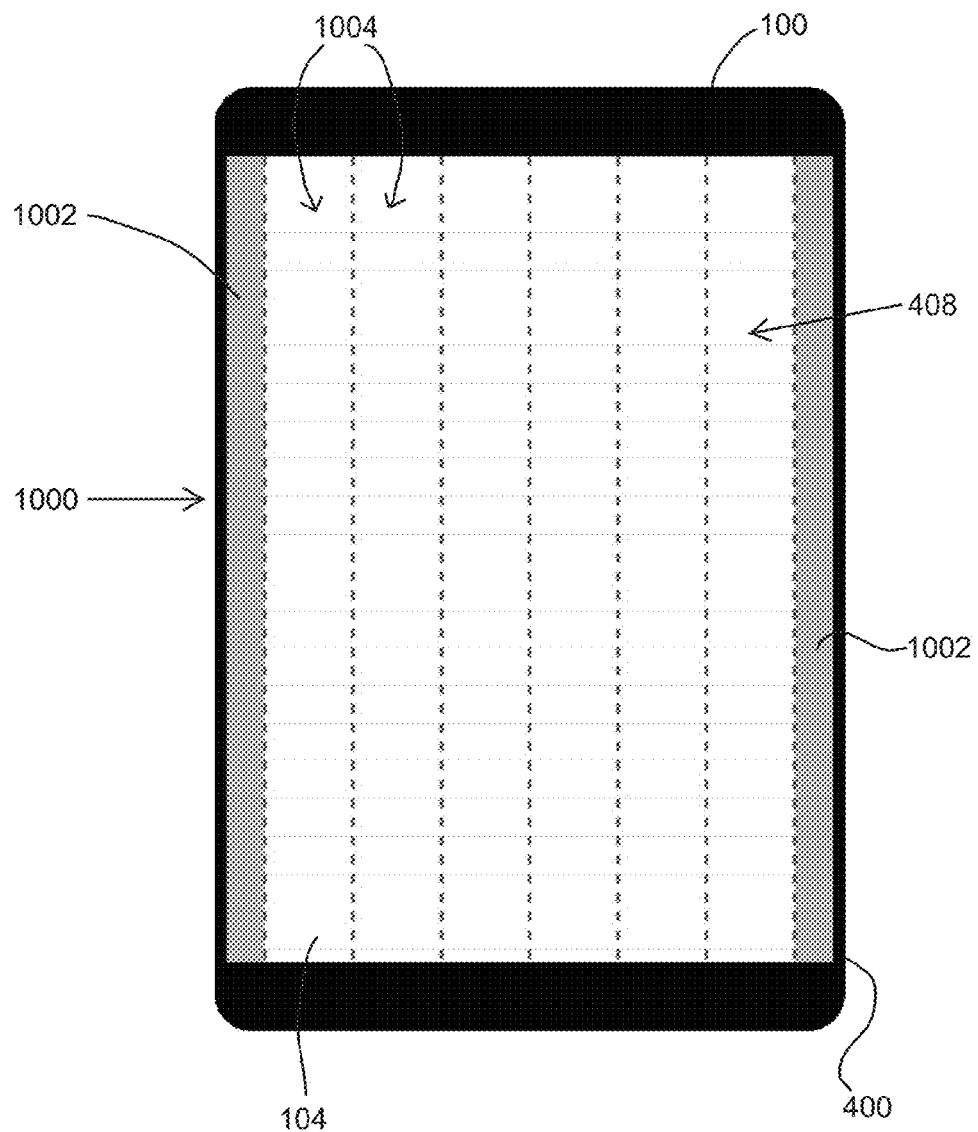
FIG. 10 shows a schematic view of an example of alignment elements of the scroll page.

The area between the padding areas 1002 defines the available horizontal space as the input area 408. The alignment pattern 1000 defines a variable number of columns 1004, which are all the same width and flexible to fill up the whole available horizontal space between the padding 1002 (shown divided with dashed lines). Accordingly, the input area 408 is equally divided into the columns 1004 as shown in FIG. 10. The columns define breakpoints as minimum application width values in dp, e.g., the screen width when the application 112 is provided in full-screen or just window width when reduced, such as on desktop/laptop, or split-screen on tablet.

Figure 11:
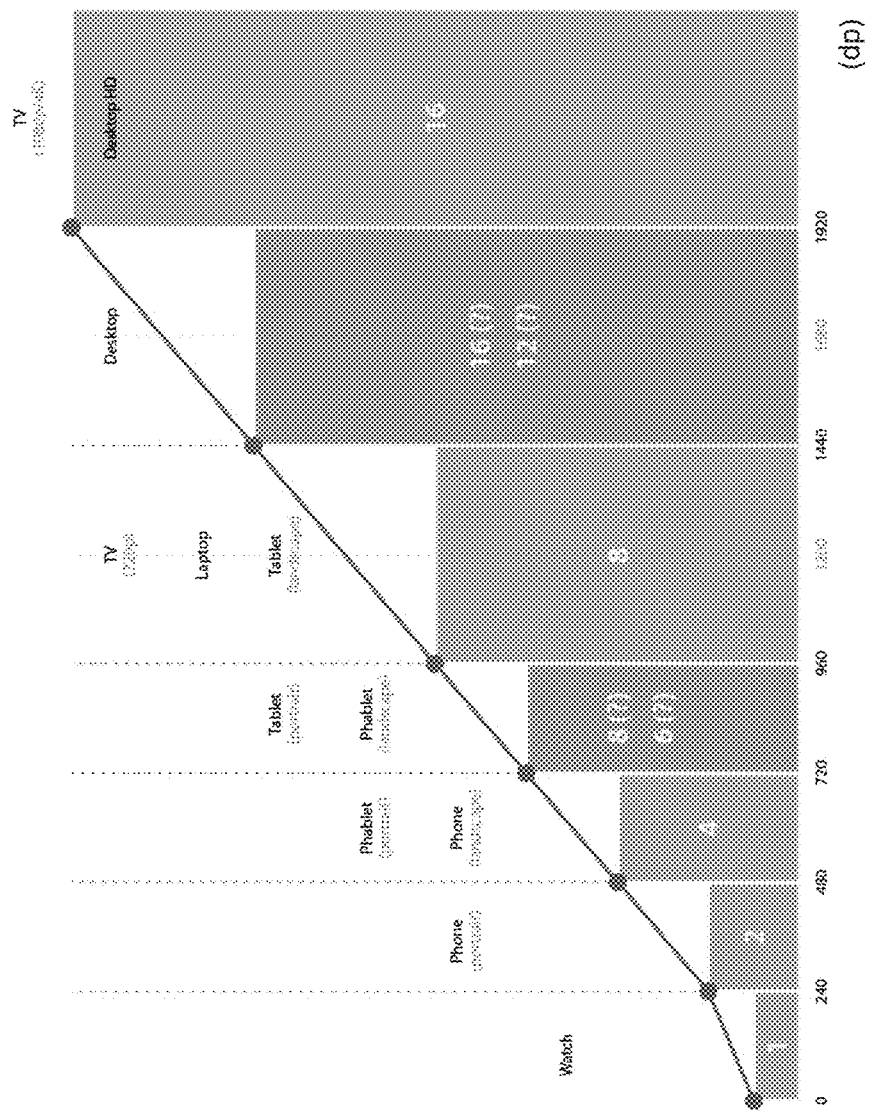
FIG. 11 shows a graph of different column counts of the alignment elements with respect to input surface size of different devices.
Figure 13:
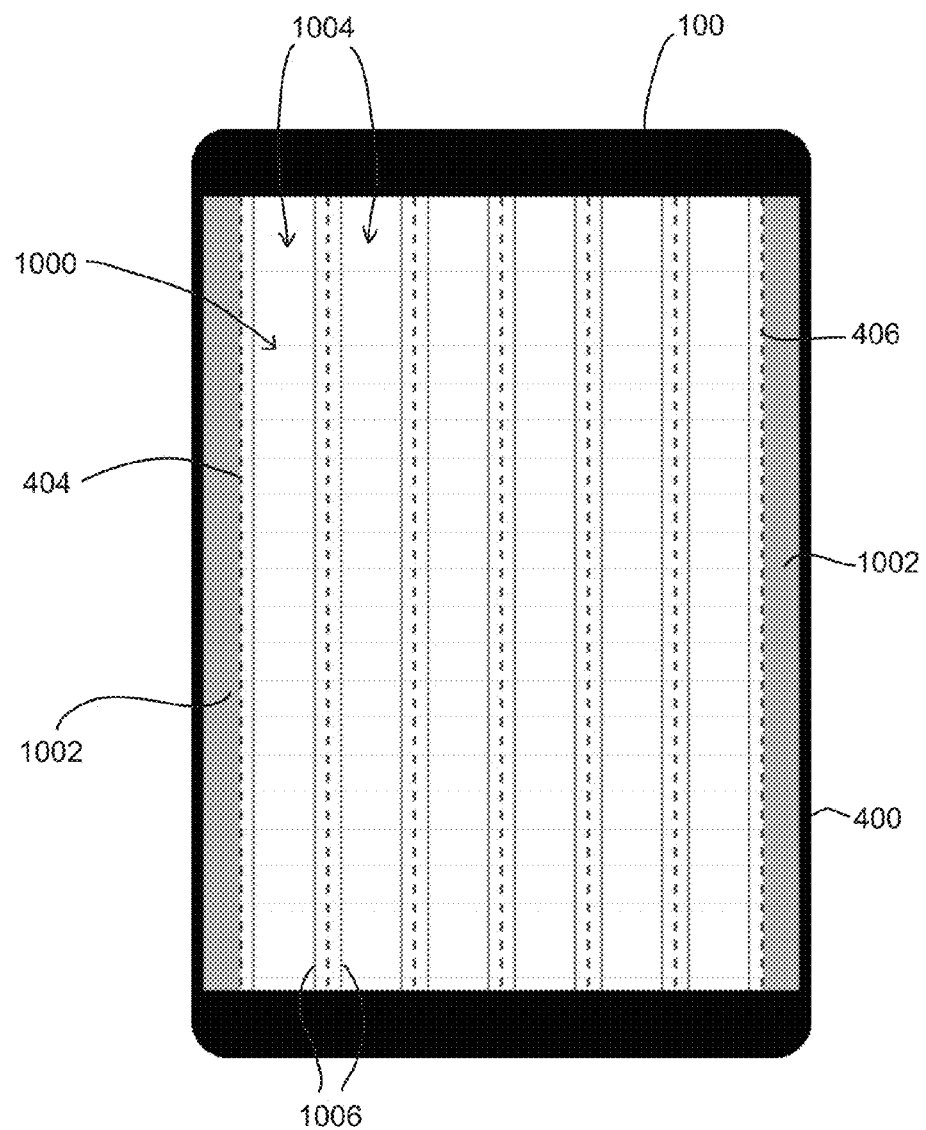
FIG. 13 shows a schematic view of an example of alignment elements of the scroll page.
Figure 14:
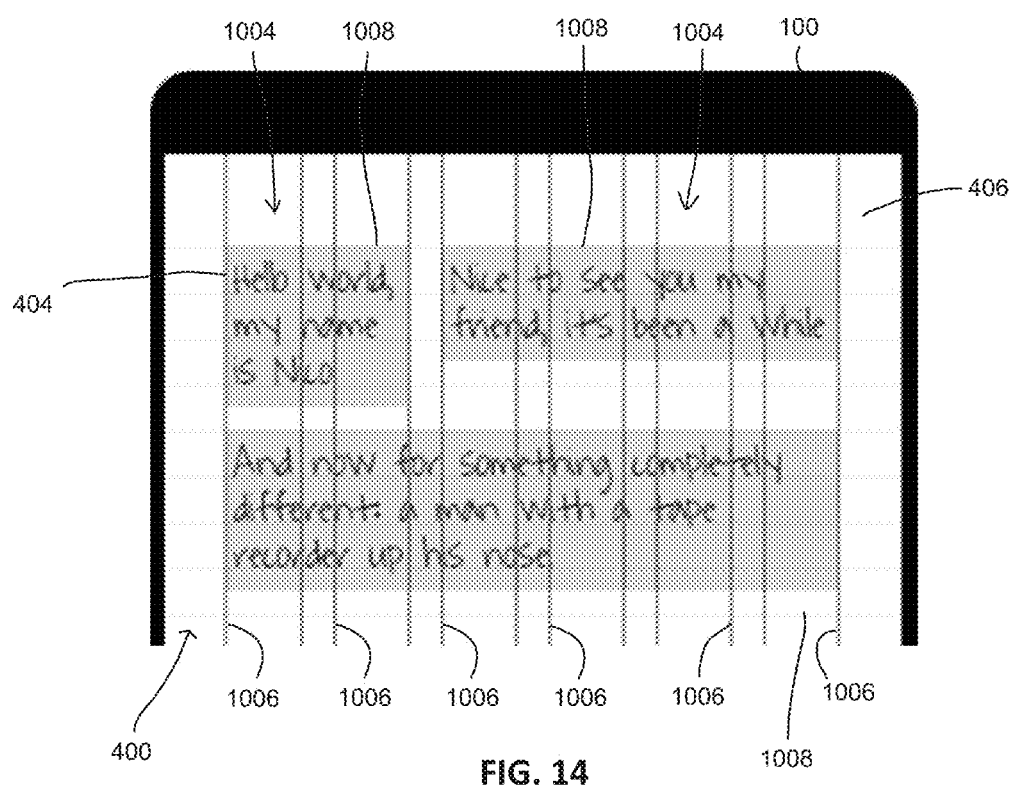
FIG. 14 shows a schematic view of an example visual rendering of the scroll page on a portion of the device input surface with the alignment elements.

Column sizing depends on the column count, so column width is defined by the percentage of the whole available horizontal space, that is the input area 408 (e.g., four columns =25%). The column count is provided so as to provide minimum content display within each column so that meaningful layout can be provided. FIG. 11 shows a graph of different column counts depending on the screen size of different devices. Certain device examples in accordance with this graph are (in full screen context):

| | | |
|---|---|---|
| iPhone ® 6 (portrait) = | 375 dp = | 2 columns |
| Nexus 6 (landscape) = | 730 dp = | 6 (or 8) columns |
| iPad Air ® (portrait) = | 768 dp = | 6 (or 8) columns |
| Surface ® Pro 3 (landscape) = | 960 dp = | 8 columns |
| HP ® Chromebook 14" = | 1366 dp = | 8 columns |
| Dell ® Inspiron ® 23" = | 1920 dp = | 16 columns |

The devices and column counts shown in FIG. 11 are merely illustrative of the concept of using columns to provide responsive layout display. The actual values may be different, such that more or less columns are used for any given device. For example, for large screen devices, such as big-screen televisions, electronic/interactive whiteboards, and large-screen touch monitors, the propensity of users to handwrite using larger character sizes may be accommodated by using a lower column count than illustrated in FIG. 11, and for small screen devices, such as smartphones, the ability of users to handwrite using small character sizes due to precise stylus use may be accommodated by using a higher column count than illustrated in FIG. 11. When changing window size or rotating the device, the alignment pattern adds or retrieves columns along which content has to adapt and align/snap to new columns (described later). Various column-wide blocks are adapted using the rules detailed in FIGS. 12A and 12B.

The alignment pattern 1000 further has a gutter space 1006 (shown in FIG. 13) defined about vertical boundaries of each column 1004 on both the left and right edges so as to prevent object blocks from being positioned too close to each other. Like the other elements of the alignment pattern, the gutters 1006 are defined relative to the rem unit and define actual guides onto which layout of object blocks 1008 is performed (see FIG. 14). This means that all object blocks are aligned/snapped onto the gutter edges and not column edges themselves and the UI page margins 404, 406 are positioned onto the leftmost and rightmost column gutters (see FIGS. 13 and 14). In this way, the alignment pattern elements are all defined using a text-related unit since the layout spacing depends on text size. The gutters could be omitted if desired and absolute column boundaries used instead.

As explained previously, the metrics used are based on both the input area 408 width and the rem unit for responsive sizing. These different metrics are related as shown in Table 2.

TABLE 2

| Minimum width (dp) | No. of columns | Column width (% of input area width) | Margin width (rem) | Gutter width (rem) |
|---|---|---|---|---|
| 0 | 1 | 100 | 0 | 0.75 |
| 240 | 2 | 50 | 1.5 | 0.75 |
| 480 | 4 | 25 | 1.5 | 0.75 |
| 720 | 6 | 16.66666667 | 2.25 | 0.75 |
| 960 | 8 | 12.5 | 2.25 | 0.75 |
| 1440 | 12 | 8.33333333 | 3.0 | 1.0 |
| 1920 | 16 | 6.25 | 4.0 | 1.0 |

As mentioned earlier, snap-to-pattern behavior is used for object block alignment. Vertical snap is handled through reference to the line pattern 410 in two ways, either by making sure that all object block heights are integer multiples of the LPU or at least the top boundary of each block is aligned with the next available line of the line pattern background 410. In the former case, whatever the user interaction (e.g., new, edited, moved, resized), all object blocks are always LPU-rounded and positioned according to vertical LPU (e.g., top and bottom boundaries are aligned with the line pattern background 410). Either way a LPU portion of a snap-to-grid mechanism is provided. For horizontal snap, whatever the user interaction (e.g., new, edited, moved, resized), left and right boundaries of all object blocks stay aligned with the columns 1004 (or gutters 1006) in any case. This provides a layout portion of the snap-to-grid mechanism. Accordingly, the vertical and horizontal snap operations provide vertical alignment and horizontal alignment to the LPU (vertical) and layout (horizontal) grid.

Alternatively, in order to provide fluid interaction and let users feel that they are in control of the layout, any move/resize of an object block may be updated in real-time and aligned with current touch or hover position during the interaction (i.e., not aligned or snapped with the LPU and layout grid). For instance, during block resize (detailed later) object block boundaries are updated with exact touch or hover position even though it might be in the middle of a column/line.

Besides updating other surrounding elements in real-time to preview the overall result, users should have a visual feedback indicating what layout will become once an object is snapped onto the LPU and layout grid. One possible feedback would be to display a darkened/colored snapped-to-grid overlay beneath the interacted block during interaction. Once a user stops interacting with an object block, all block boundaries are snapped to the LPU and layout grid with a swift animation. When writing, text appears substantially where the finger or stylus is in relation to the device interface so as to preserve the free writing experience for the user. However, paragraph boundaries are aligned with the LPU and layout grid no matter what (discussed in more detail later). For example, the left boundary of the paragraph is aligned with closest left gutter 1006 and the right boundary of the paragraph is aligned with closest right gutter 1006. Further, in order to assist users' perception of appropriate spacing display of the line pattern background within the gutters of at least a current input column may be omitted during input. For example, during input in the second column of a four column grid, the line pattern background is omitted/masked in the left and right gutters of the second column, and may further be omitted/masked in the right gutter of the first column and the left column of the third column. Internal paragraph features, such as indentations (e.g., text horizontally offset from paragraph left origin for left-to-right written languages) may either be aligned with the columns or stored as a property, for example in the memory 108, for each line of the paragraph unrelated with LPU and layout grid sizing.

Certain example operations involving object block creation and management are now described with reference to FIGS. 15 to 24. The examples shown in these drawings are in a left-to-right written language context, and therefore any reference to positions can be adapted for written languages having different directional formats. In each of FIGS. 15 to 24 part of the scroll page 400 is shown in schematic form as depicted in the viewable area of the device interface. The scroll page 400 is shown with the LPU and layout grid 1500 configured from the line pattern background 410, as horizontal lines 1502 of the grid 1500, and the alignment pattern 1000, defined by vertical lines 1504 of the grid 1500 which divide the page 400 into a number of columns 1004, e.g., six columns in all the drawings (except FIGS. 22B and 24 in which three columns are depicted). The top padding and margins of the scroll page, and the padding areas and column gutters of the alignment pattern are omitted in the drawings (except in FIG. 22) for ease of description. Accordingly, except in FIG. 22, the layout elements described are shown aligned to the vertical lines 1504 of the grid 1500 rather than the column gutters. As described earlier, the alignment grid itself is not displayed to users and acts as an invisible guide for the management of the layout of object blocks for the application 112, however the line pattern background 410 may be displayed to users to provide guidance on writing size and placement.

The layout management employed by the present system and method handles the way object blocks are defined and can be manipulated by users generally through use of simple gestures. This is done in a way that lets users feel they are in control of the layout, such that there are limited automatic behaviors and some flexibility is provided for users to position the content as desired. As the digital note taking application 112 is primarily for the handwritten capture of notes, the main object block can be considered to be a paragraph of text or a text block, with sub-elements being line breaks and alinea (i.e., subsets of paragraphs between two line breaks). The management of paragraphs includes the ability for users to create multiple paragraphs, split paragraphs, merge paragraphs, remove content in a paragraph, move paragraphs and resize paragraphs. Other object blocks that can be created and need to be managed, particularly in relation to the text blocks, include content such as images, drawings and equations.

The layout management provides the ability to create the different object blocks in a desired layout and perform operations on the separate object blocks, such as:
 block insertion or drag/push & drop (where there is empty room) to right or left of a block/paragraph
 block insertion or drag/push & drop (where there is empty room) below or above a block/paragraph
 insertion inside a paragraph (inline)
 insertion in between paragraphs.

Figure 15:
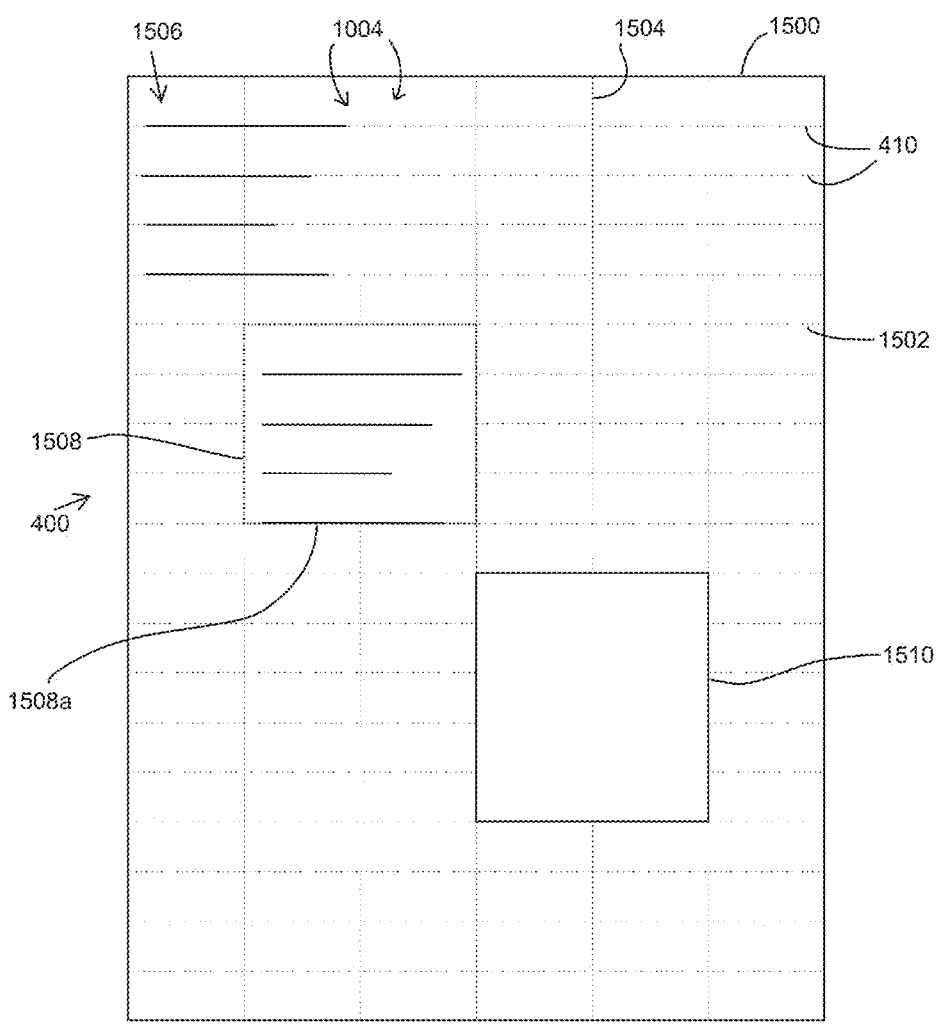
FIG. 15 shows a schematic view of part of the scroll page with example input content object blocks.

In FIG. 15 a first paragraph is shown as a margin-aligned paragraph 1506, which is aligned to the left-most or first vertical line 1504 of the grid 1500 and spans four of the horizontal lines 1502 of the grid 1500, or four LPUs. The paragraph contains handwritten text depicted as solid horizontal lines. A second paragraph is shown as a floating text block 1508, which is aligned to the second vertical line 1504 of the grid 1500 and spans four LPUs. The snapped-to-grid extent of the floating text block 1508 is shown by the dashed boundary 1508a, inside of which the grid pattern is suppressed for clarity. The concepts of 'margin-aligned' and 'floating' in the context of the present example scroll page 400 are provided to distinguish those blocks which are aligned to a margin of the page, such as paragraphs of text that are left- or right-aligned on a page of a document editor application, and those blocks which are freely (with constraint to the grid) positioned relative to the margins. As shown the text of the paragraphs 1506, 1508 itself is not snapped to the grid so that the user does not gain the feeling that their control is lost. The actual input position of the text within the paragraph is provided by defining and storing, for example in the memory 108, the text indentation which is a property of each line of a paragraph corresponding to the distance between the start of the content and the closest column on the left of the paragraph.

Another floating block 1510 is shown which is aligned to the fourth vertical line 1504 of the grid 1500 and spans five LPUs. The floating block 1510 may contain text or a drawing, image, diagram, equation, etc. Both aligned and floating blocks are anchored to a part or section of the scroll page, with the margin-aligned blocks being further anchored to the margin, and move vertically with it as the page is scrolled. If the block is moved (i.e., selected to be dropped somewhere else), it is associated to the new part or section of the scroll page to which it is moved (described in detail later). It is noted that the boundaries of the illustrated blocks are those used by the present system and method to determine the extent of the input elements in relation to the alignment pattern and as such are not typically displayed by the application 112 to users. However, during editing operations, such as movement of blocks, etc., the boundaries may be displayed to assist users in proper placement of the elements relative to other elements of a layout.

Figure 16A:
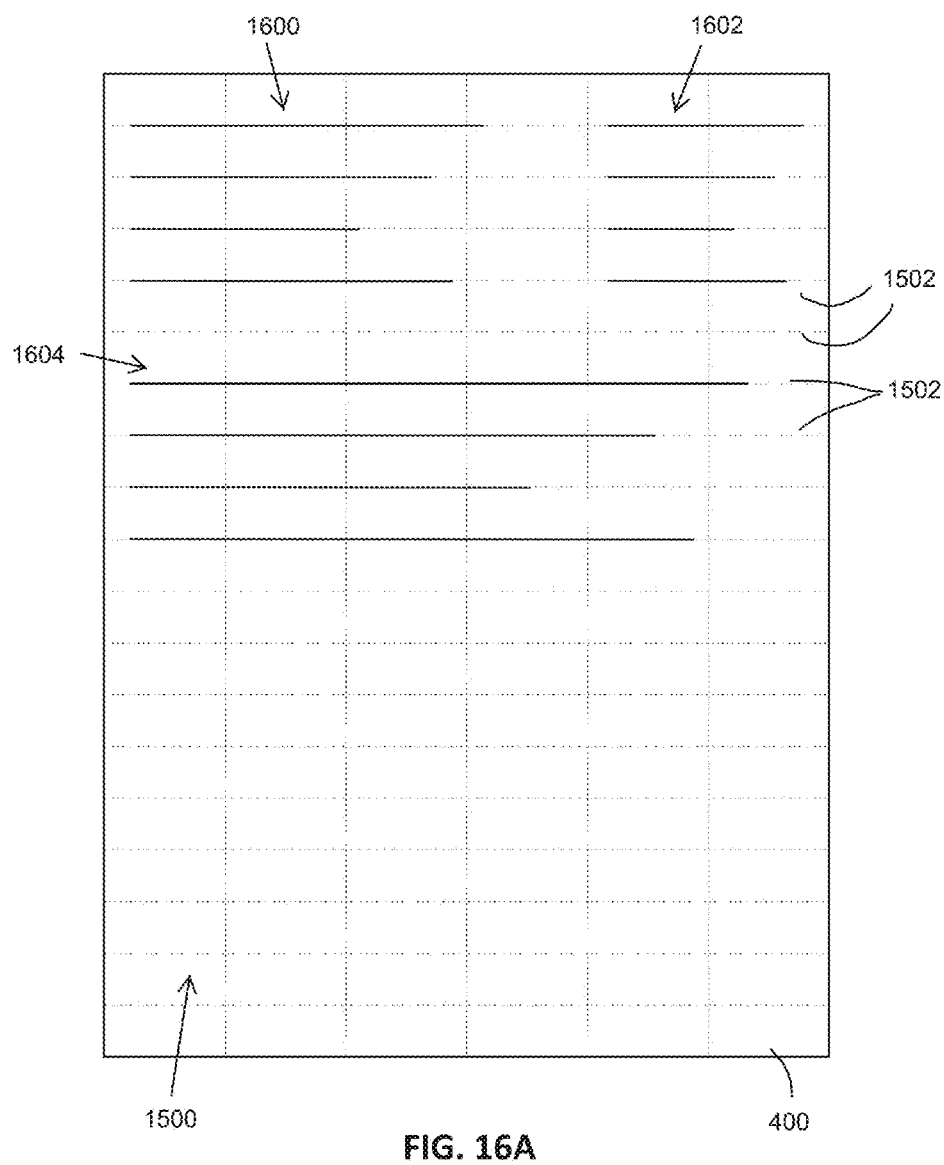
FIGS. 16A and 16B shows a schematic view of part of the scroll page with object blocks and example operations thereon.
Figure 16B:
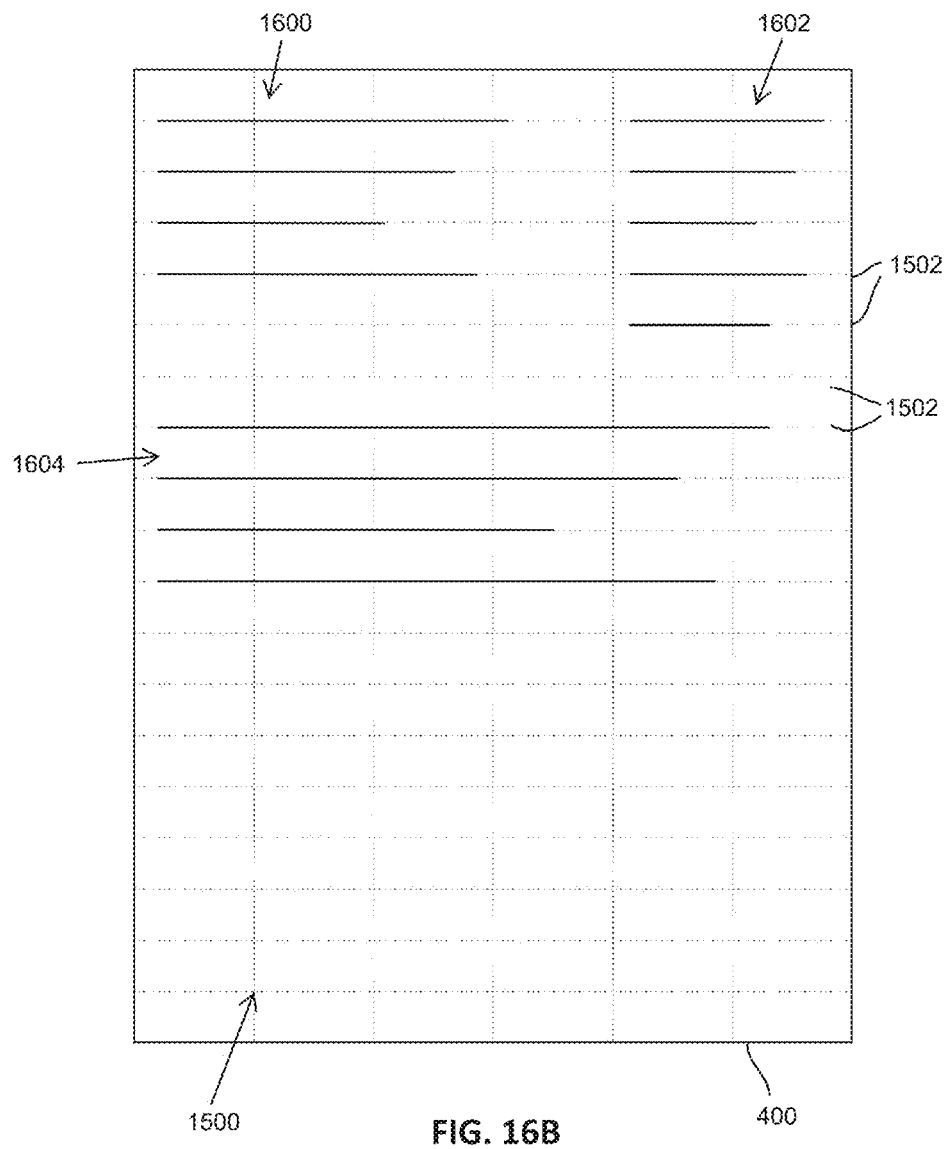

FIG. 16A shows several paragraphs residing in margin-aligned and floating blocks. In particular, a first paragraph 1600 has been created spanning four columns, followed by a second paragraph 1602 horizontally adjacent the first paragraph 1600 and spanning two columns, and a third paragraph 1604 vertically below both the paragraphs 1600 and 1602 and spanning all six columns. The use of blocks and the alignment grid allow content within blocks to be edited while retaining the relative layout of the blocks. For example, in FIG. 16B the user has added further text to the second paragraph 1602 on the next horizontal line 1502 of the alignment grid 1500, however since the paragraph 1604 is below the paragraph 1602 in the vertical flow of the scroll page 400, the lower paragraph 1604 is consequentially moved down to the next horizontal line 1502 of the alignment grid 1500 so as to retain the spacing of two LPUs between the paragraphs 1602 and 1604. Indeed, any content below is shifted down by the same amount so that relative layout is retained, since the user has not specifically changed those layouts. Accordingly, text written upstream in a block moves below content down if there is not enough space to expand the text block. This mechanism is the same as that of the extension of the scroll page 400 by the height of input content described earlier with reference to FIG. 6A, such that the content moved below is moved out of the viewable area 132 of the interface 104.

Figure 17A:
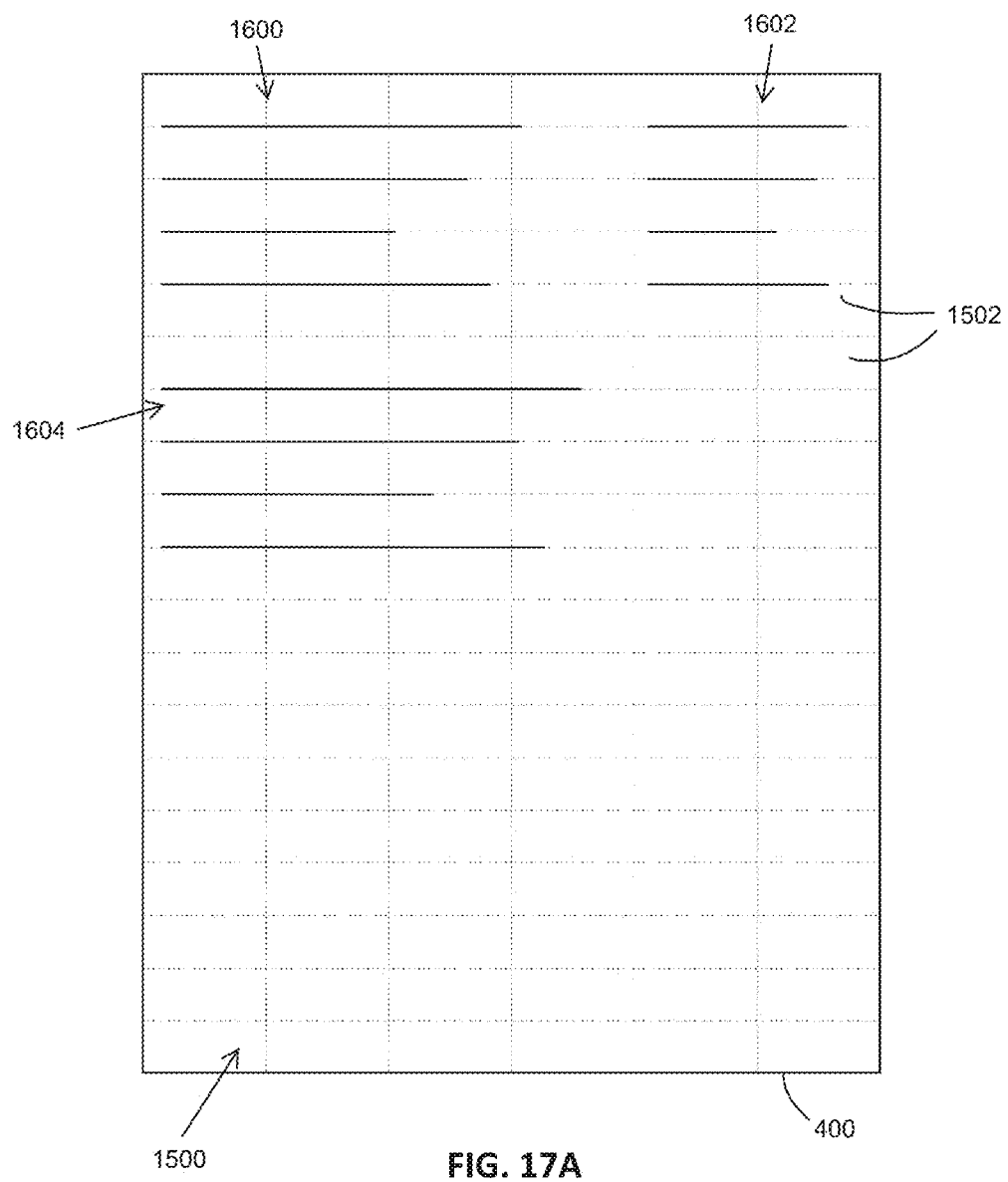
FIGS. 17A and 17B shows a schematic view of part of the scroll page with object blocks and example operations thereon.
Figure 17B:
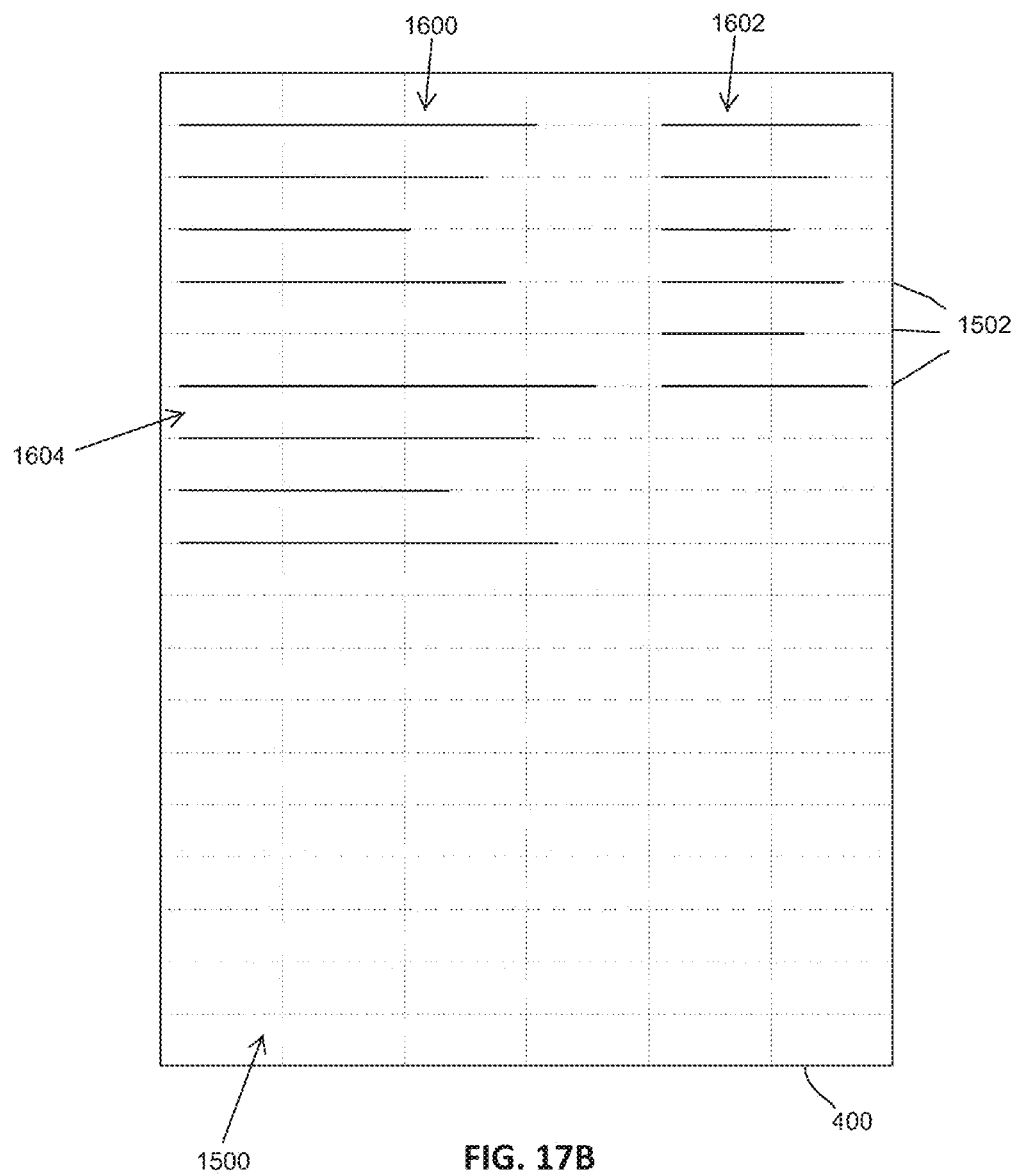

Alternatively, if there is enough space, then the text block will be expanded without movement of lower blocks. For example, FIG. 17A shows the paragraphs 1600, 1602 and 1604 but with the third paragraph 1604 only being vertically below the first paragraph 1600 and spanning only four columns. As such, as shown in FIG. 17B, when the user adds further text to the second paragraph 1602 on the next horizontal lines 1502 of the alignment grid 1500 the text block bounding the second paragraph 1602 can freely expand adjacent the lower paragraph 1604.

The operation of writing text upstream causing movement of the whole below content downwards if there is not sufficient layout space for that text is applicable to whatever content is below, i.e., text or non-text blocks. For example, in FIG. 18A a paragraph 1800 has been created and an object block 1802 (either text or non-text) has been created (or dropped) vertically below the paragraph 1800. In FIG. 18B the user has added further text to the paragraph 1800 on the last text line carrying onto the next horizontal line 1502 of the alignment grid 1500. However, since the block 1802 is below the paragraph 1800 in the vertical flow of the scroll page 400, the block 1802 is consequentially moved down to the next horizontal line 1502 of the alignment grid 1500 so as to retain the spacing of three LPUs between the objects 1800 and 1802.

In the example of FIGS. 16 to 18, the text added to the existing paragraph (or being added during creation of the paragraph) is a continuation of the text of the paragraph onto the next line of the line pattern background 410, where either it is written directly on the next line or added to the existing last line of text and continued onto the next line. In either case, it is considered that the added text belongs to the existing paragraph since it is added to the immediate next line 410 in the vertical flow. Determination of the added text actually being part of a new paragraph could be made using the recognition stage 118 of the HWR system 114, particularly with reference to the offset of the text of the adjacent lines and their relationship to the left margin or aligned edge of the (existing) paragraph. However, the result of such recognition is not known by the user. That is, without some specific indication (such as, display of a paragraphing symbol or automatic shifting of the existing and/or new paragraph blocks, which may be too intrusive on the note taking process and therefore distracting for the user) misrecognition of separate paragraphs would not been known until some manipulation of the layout occurs (such as display of the note on a different device or in a different orientation) by which time context of the original input may be forgotten.

Accordingly, a simple constraint is placed on the input of separate paragraphs (and object blocks) in the vertical flow, in a manner which is easily understood and applied by users. This constraint is that there is always to be an empty line 410 between object blocks, e.g., a spacing of two LPUs, which overlap horizontally, e.g., overlap in at least one column 1004. This rule provides a way of cleanly maintaining relative layout between object blocks in the vertical flow of the scroll page 400 which can be applied to directly input content and dragged & dropped or pushed & dropped blocks.

Figure 18A:
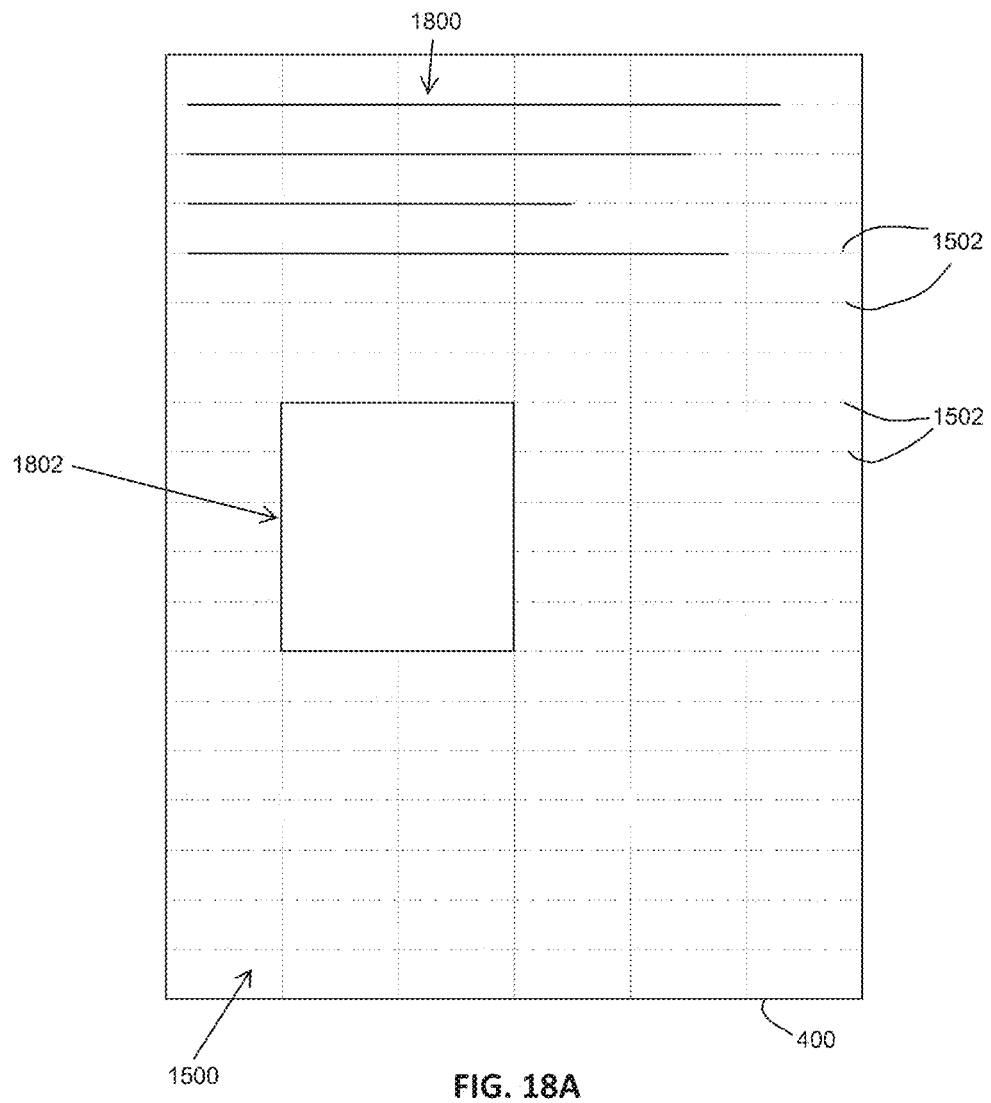
FIGS. 18A to 18E shows a schematic view of part of the scroll page with object blocks and example operations thereon.
Figure 18B:
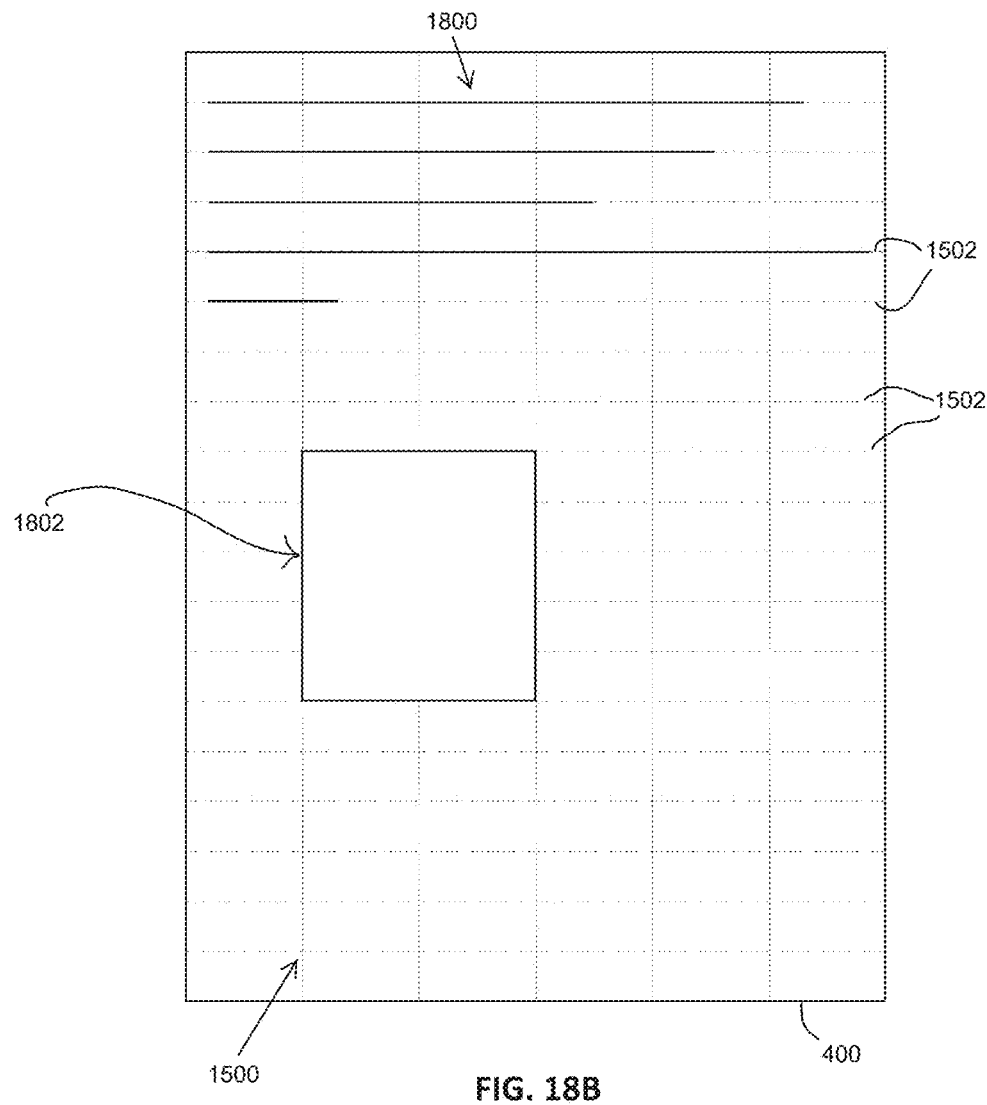
Figure 18C:
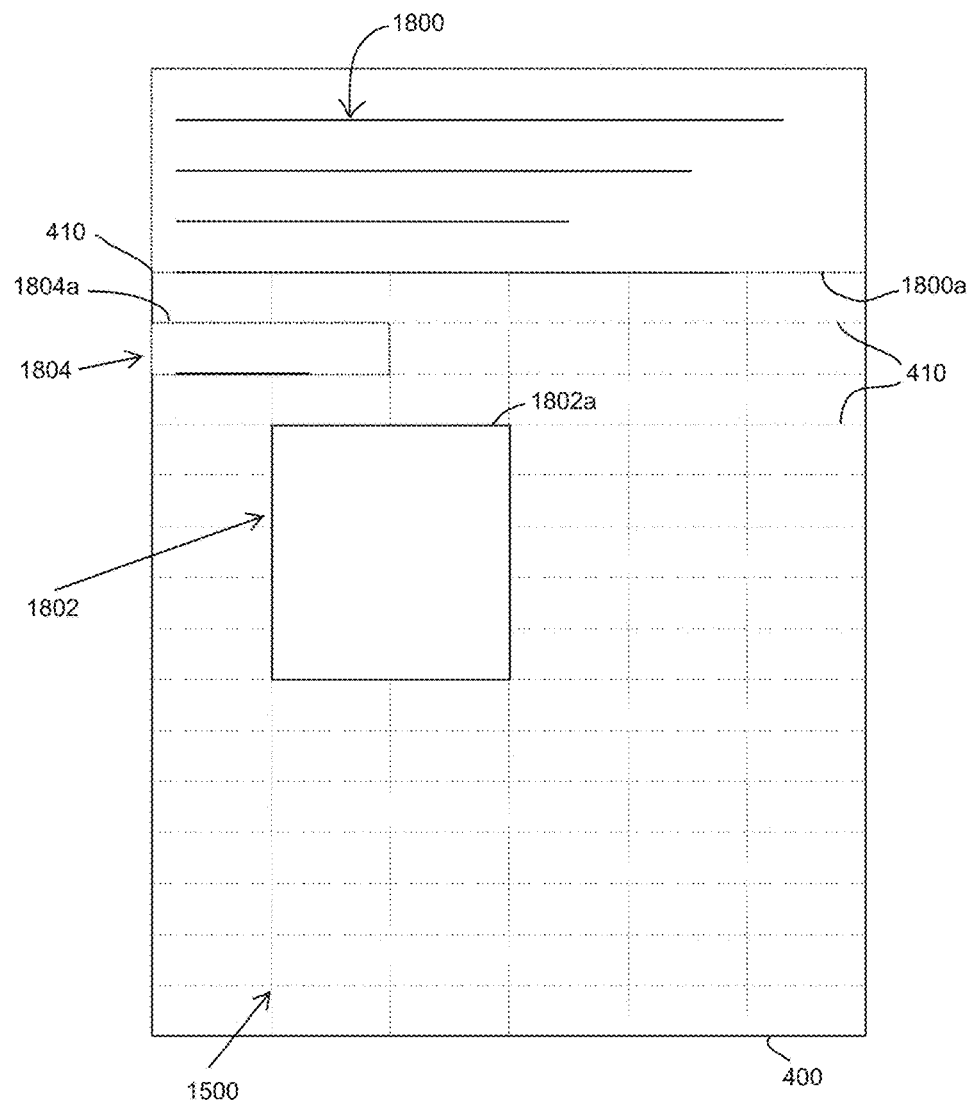

For example, in the operation described in relation to FIGS. 18A and 18B, the three LPU spacing between the paragraph 1800 and the block 1802 was maintained when vertical content was added to the paragraph 1800. Alternatively, because the spacing after addition of the extra content to the paragraph 1800 remains equal to or more than two LPUs, the block 1802 (and any other lower object blocks) need not be consequently moved. Accordingly, if space between new and existing content is larger than one line, nothing is moved downward in the vertical stream, letting the new content fill up available space. This is shown in the example of FIG. 18C where a paragraph 1806 is input two lines 410 below the last line 410 of the paragraph 1800 (e.g., the lower side of boundary 1800a of the block 1800 is spaced one LPU from the upper side of boundary 1804a of the block 1804, such that the text lines are two LPUs apart) and since there remains an empty line 410 between the new paragraph 1804 and the block 1802, the block 1802 is not moved (e.g., the lower side of the boundary 1804a of the block 1804 is spaced one LPU from the upper side of boundary 1802a of the block 1802, such that if the block 1802 is a text block the text lines are two LPUs apart). As such, this rule is more correctly defined as the text lines of text blocks must be spaced apart by two LPUs, meaning that vertically adjacent block boundaries can be spaced one LPU apart.

Figure 18D:
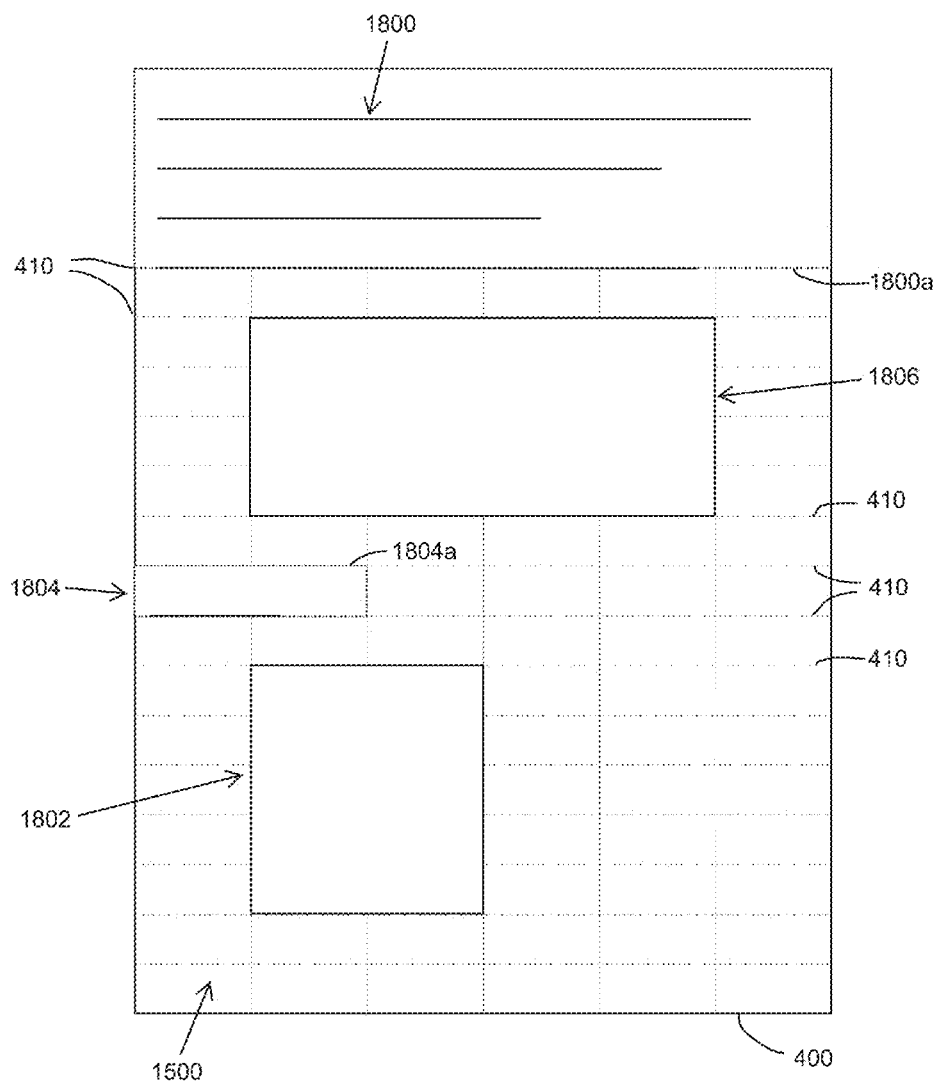
Figure 18E:
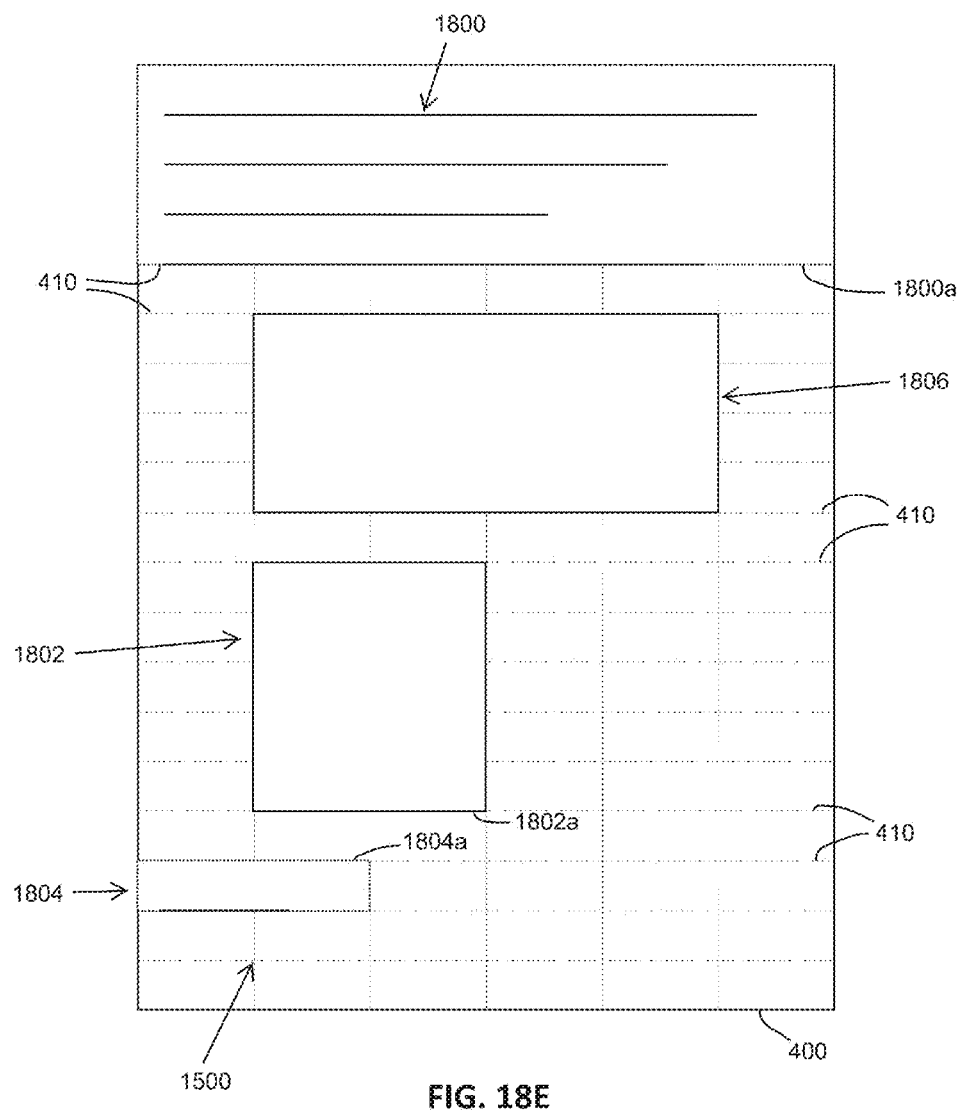

Whenever new content reaches existing content (leaving less than one empty line therebetween), the whole content below is moved one line down to reintroduce the one empty line spacing. Similarly, each time new content is written on an empty line between object blocks, the content below is moved one line down. Similarly, each time a block is added upstream on a new line the content below is moved down and there should always be a line above and below the block. An example of this is shown in FIG. 18D, in which an object block 1806 is dropped onto the line 410 below the paragraph 1800 (such that there is a spacing of one LPU therebetween) and the paragraph 1804 and the block 1802 are consequently moved down so that there is a spacing of one LPU between the new block 1806 and the paragraph 1804, with no relative layout change between the blocks 1802 and 1804. This example is further extended in FIG. 18E where the block 1802 is moved above the paragraph 1804 and dropped one LPU spacing below the block 1806 with consequential downward movement of the paragraph 1804 so that one LPU spacing remains between the lower side of the boundary 1802*a* of the block 1802 and the upper side of the boundary 1804*a* of the block 1804.

Figure 19A:
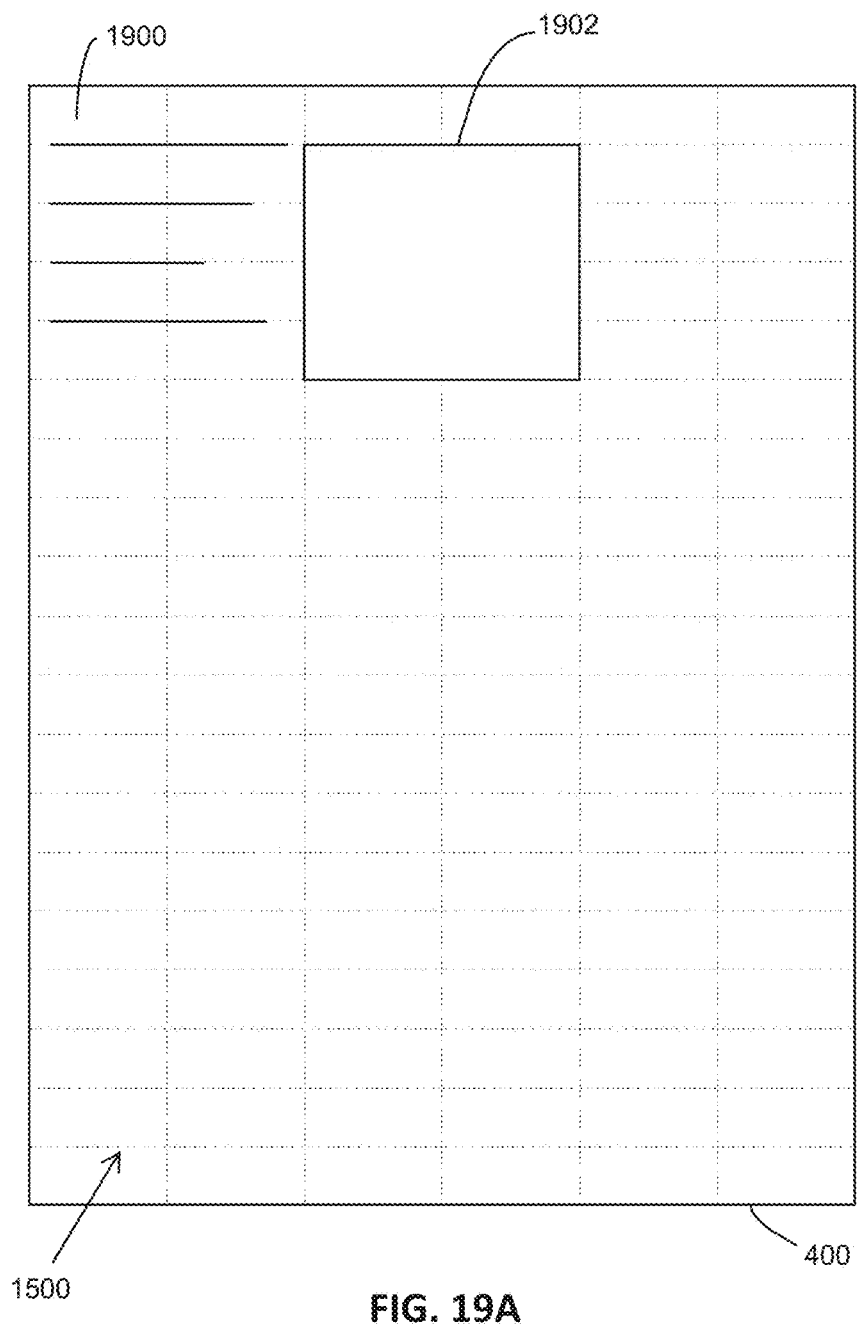
FIGS. 19A to 19C shows a schematic view of part of the scroll page with object blocks and example operations thereon.
Figure 19B:
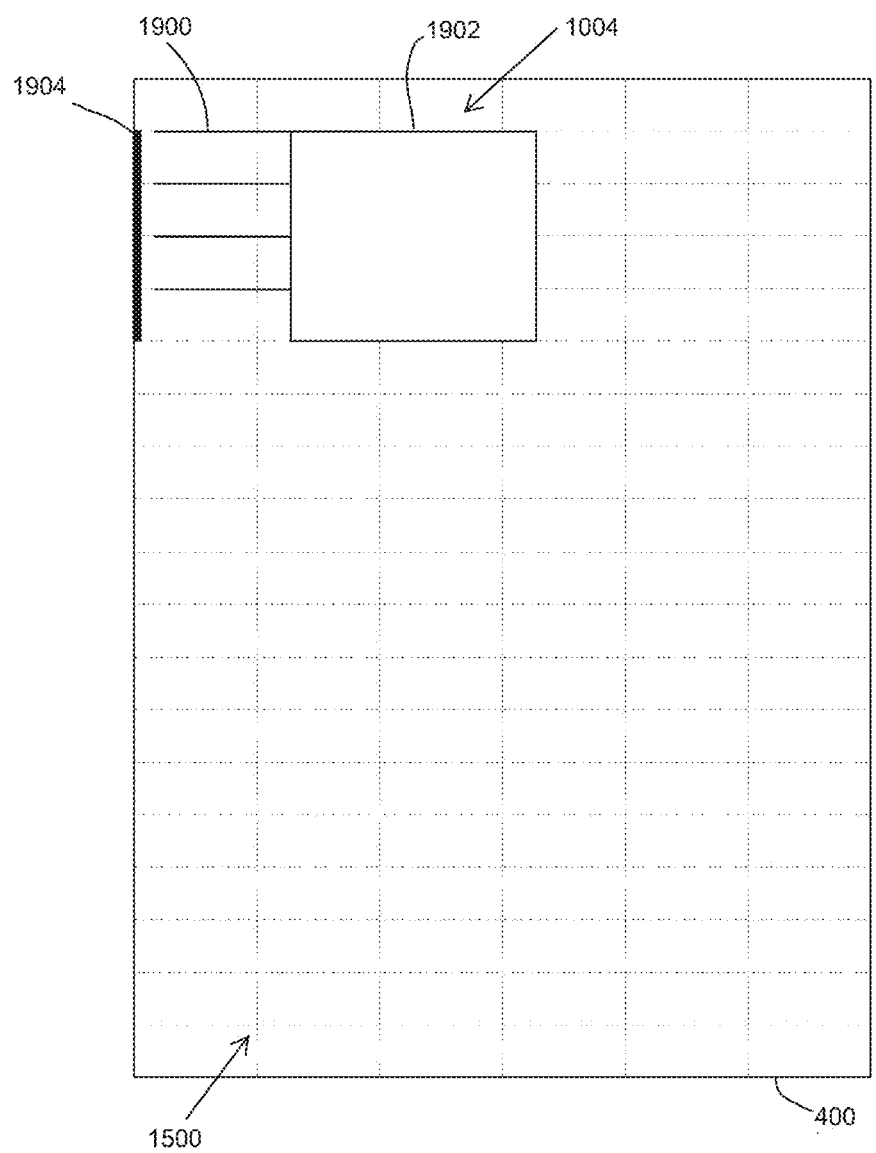
Figure 19C:
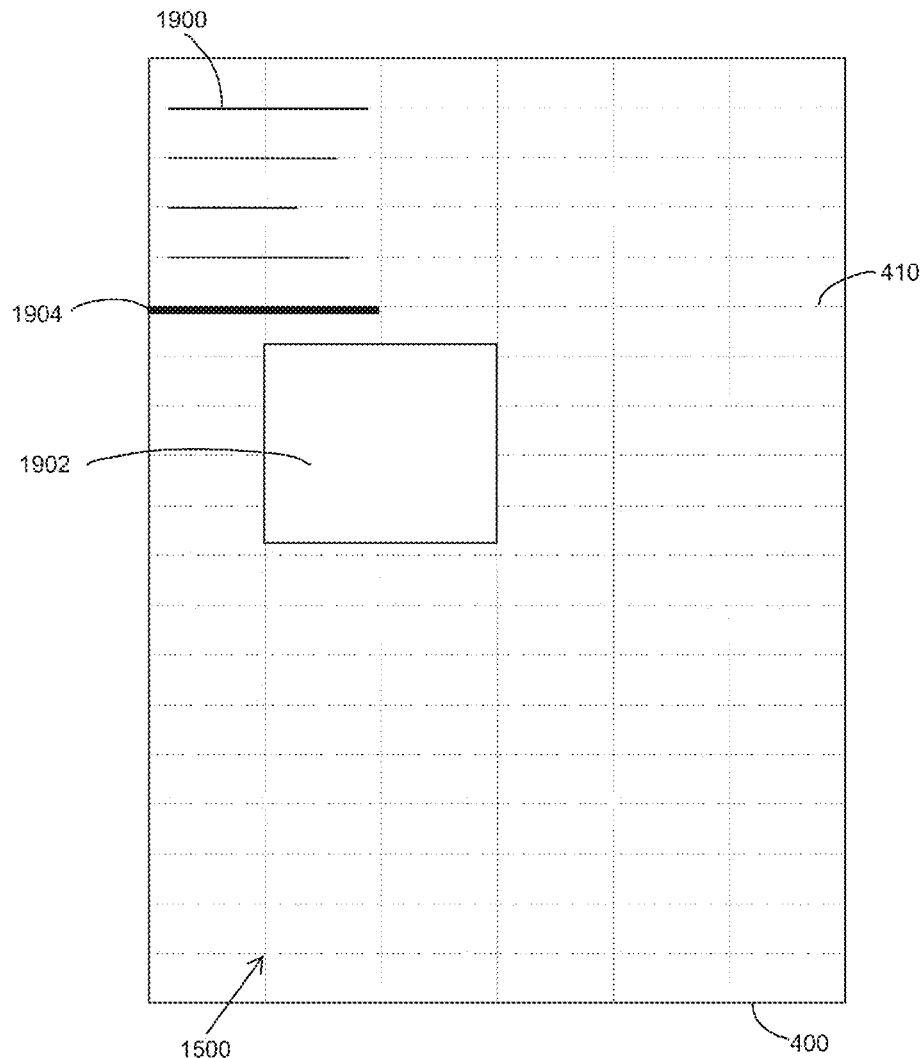

As described earlier, blocks can be dragged & dropped or pushed & dropped from their current position in the scroll page 400 to a new position, or resized, perhaps with consequential movement of other blocks and with guiding mechanism for users. For example, FIGS. 19A to 19C show an operation in which a paragraph 1900 and a non-text block 1902 (e.g., containing an image) are laid out and the non-text block 1902 is moved. The initial position of the block 1902 shown in FIG. 19A is horizontally adjacent the paragraph 1900. If the block 1902 is moved horizontally as shown in FIG. 19B from its initial position, during this movement a caret 1904 is displayed showing the next available horizontal position in which the block 1902 can be dropped, e.g., in the example shown the block 1092 has been moved over the paragraph 1900 and therefore the next available drop position is on the left margin where the caret 1904 is displayed. Dropping the block 1902 in this suggested position will cause consequential horizontal movement of the paragraph 1900 snapped to the next available column of the alignment grid 1500, e.g., the third column 1004. Similarly, if the block 1902 is moved vertically as shown in FIG. 19C from its initial position, during this movement the caret 1904 is displayed showing the next available vertical position in which the block 1902 can be dropped, e.g., in the example shown the block has been moved below the paragraph 1900 and therefore the next available drop position is on the line 410 below the paragraph 1900. Similar mechanisms can be used when resizing object blocks. By guiding users in this way, alignment of objects to other objects or to the alignment grid itself is provided as much as possible. Besides blocks, text selected in a paragraph can itself be inserted inside another paragraph by drag & drop (or other editing mechanisms such as push, copy, cut, paste) or if dropped in or pushed to empty space, a new text block is created with that text.

When moving existing content, the operations described earlier can be used with the corresponding consequential behavior of the layout. When creating new text content, such as a new paragraph, users simply need to handwrite on the next available line of the line pattern background, following the empty line between rule described earlier. When creating new non-text content, such as a drawing or equation, if users were to simply begin inputting the non-text content on the next available line for example, the HWR system 114 would be required to detect the input of the non-text content so that the handwriting recognition is not carried out on the new content. Alternatively, users can be provided with a mechanism to indicate that non-text content is to be input. Conventionally this has been done through menu selections or the use of specialized styli, such as a drawing pen versus a writing pen. The present system and method simplifies this indication by leveraging existing touch interface actions known to users.

That is, in order to input non-text content users merely double tap on empty space upon which the application automatically creates a block area or canvas in which the user can insert an image, drawing, diagram, equation, etc. In this way, a double tap on empty space is interpreted as the user desiring to create a block object which has a different context than just text. The application 112 can then use other recognition mechanisms to determine and recognize the actual content input, if handwritten, such as the systems and methods described in US Patent Application Publication US 2015/0228259, US Patent Application Publication No. 2016/0154998 filed Dec. 2, 2014 entitled "System and Method for Recognizing Geometric Shapes", and European Application No. 15290183.1 filed Jul. 10, 2015 and U.S. application Ser. No. 14/870,735 filed Sep. 30, 2015 both entitled "System for Recognizing Multiple Object Input and Method and Product for Same", all assigned to the present Applicant and the entire contents of which are incorporated by reference herein.

Like the block management so far described herein, the generation of the non-text input canvas is performed in accordance with the alignment grid/pattern. That is, when the page 400 in the viewable area 132 of the interface 104 is empty, the generated canvas takes all the available space in the viewable area 132. Alternatively, when the canvas is to be generated horizontally next to an object block, the generated canvas takes the available width to the corresponding margin/padding area and aligns to the height of the existing object block. Further, if there is content above the to-be-generated canvas, the generated canvas takes the available space below the existing block and an empty line is left between the existing block and the canvas (e.g., a spacing of one LPU) so that it is not included in the content above. Further still, if there is content above and below the to-be-generated canvas, the generated canvas takes the available full width of the scroll page and the available height between the existing blocks with an empty line left above and below the canvas relative to the existing blocks (e.g., a spacing of one LPU top and bottom) so that it is not included in the existing content. FIGS. 20 and 21 show examples of two of these operations.

Figure 20A:
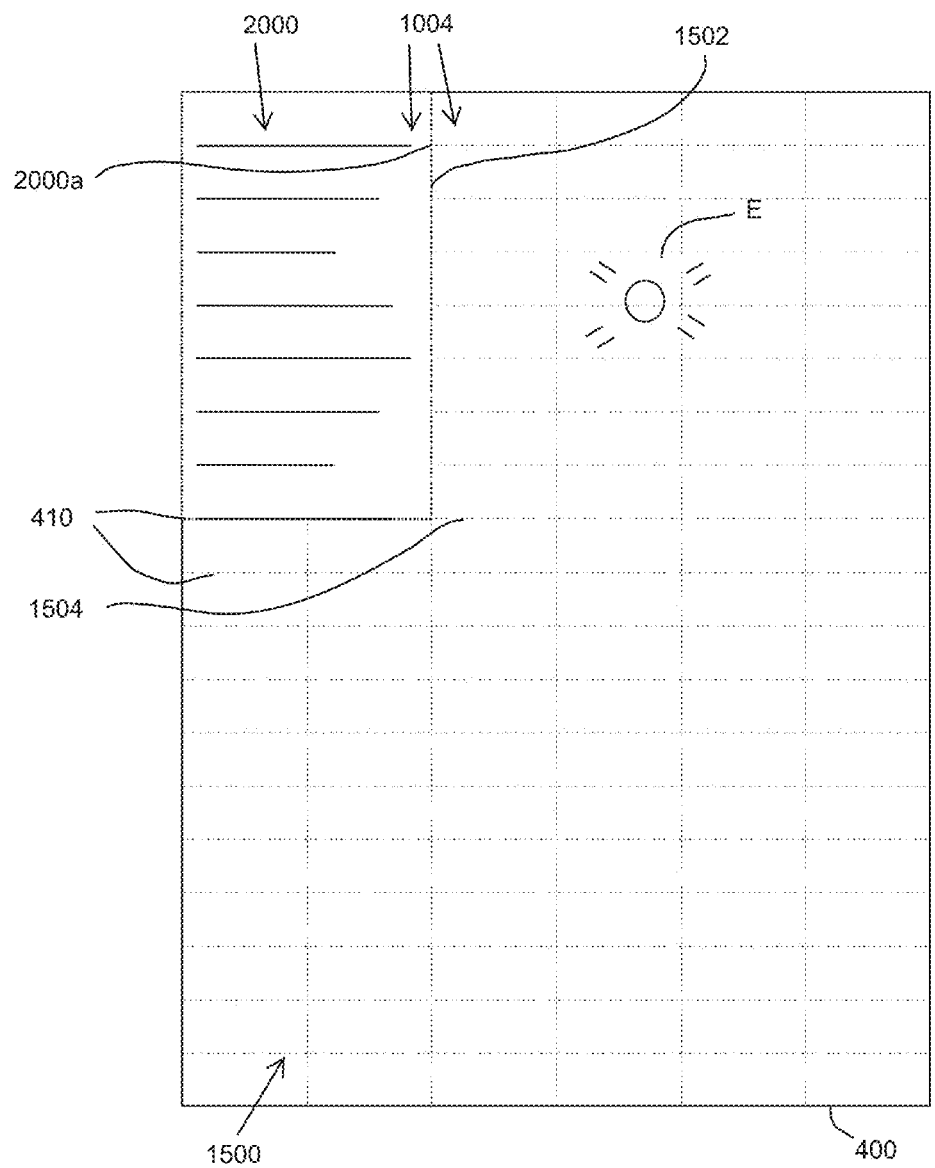
FIGS. 20A and 20B shows a schematic view of part of the scroll page with object blocks and example operations thereon.
Figure 20B:
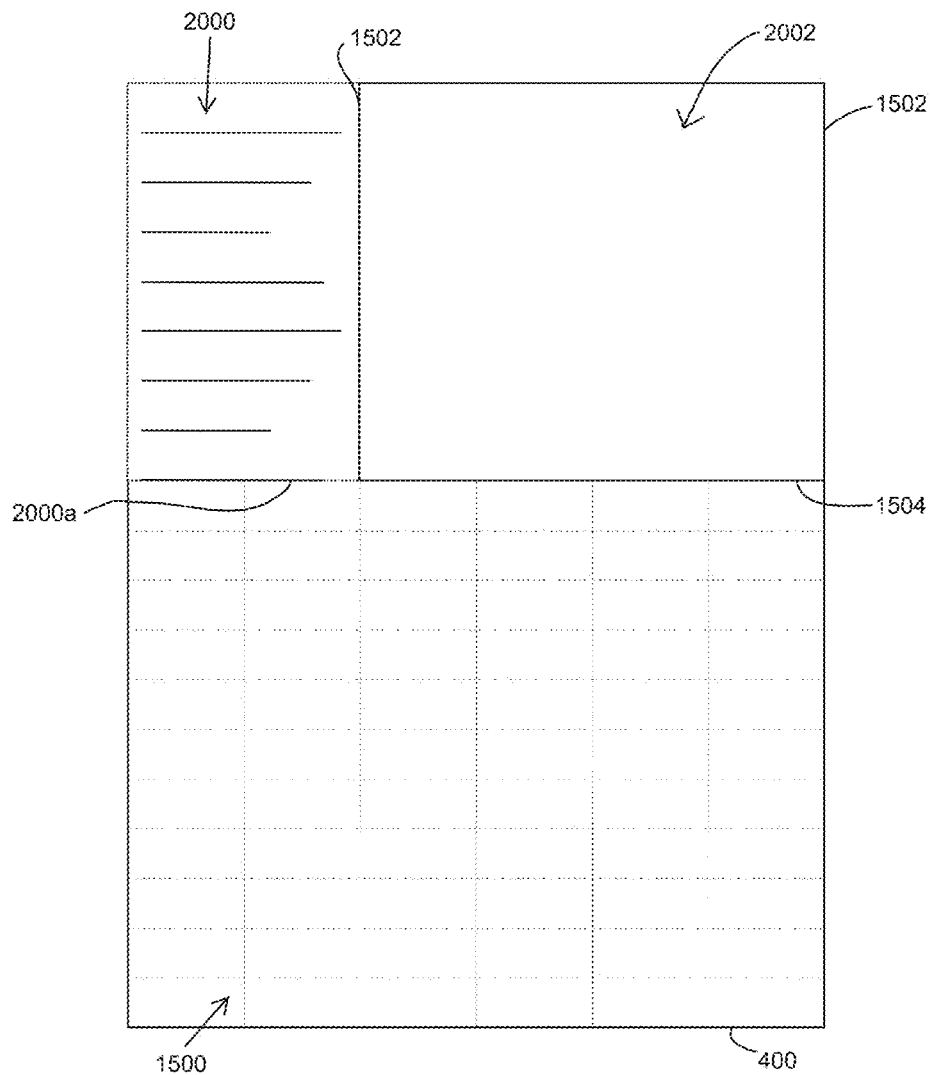

In FIG. 20A a paragraph 2000 is shown as a margin-aligned block spanning two columns 1004 and eight lines 410, such that the boundary 2000*a* of the block 2000 is aligned on the second vertical line 1502 and the eighth horizontal line 1504 of the alignment pattern 1500. In response to receiving a double tap gesture E to the right of the paragraph 2000 a block 2002 is created from the second vertical line 1502 to the last vertical line 1502 of the alignment pattern 1500 and with the same vertical extent as the paragraph 2000 (e.g., to the eighth horizontal line 1504) as shown in FIG. 20B. Non-text input within the block 2002 can then be performed.

Figure 21A:
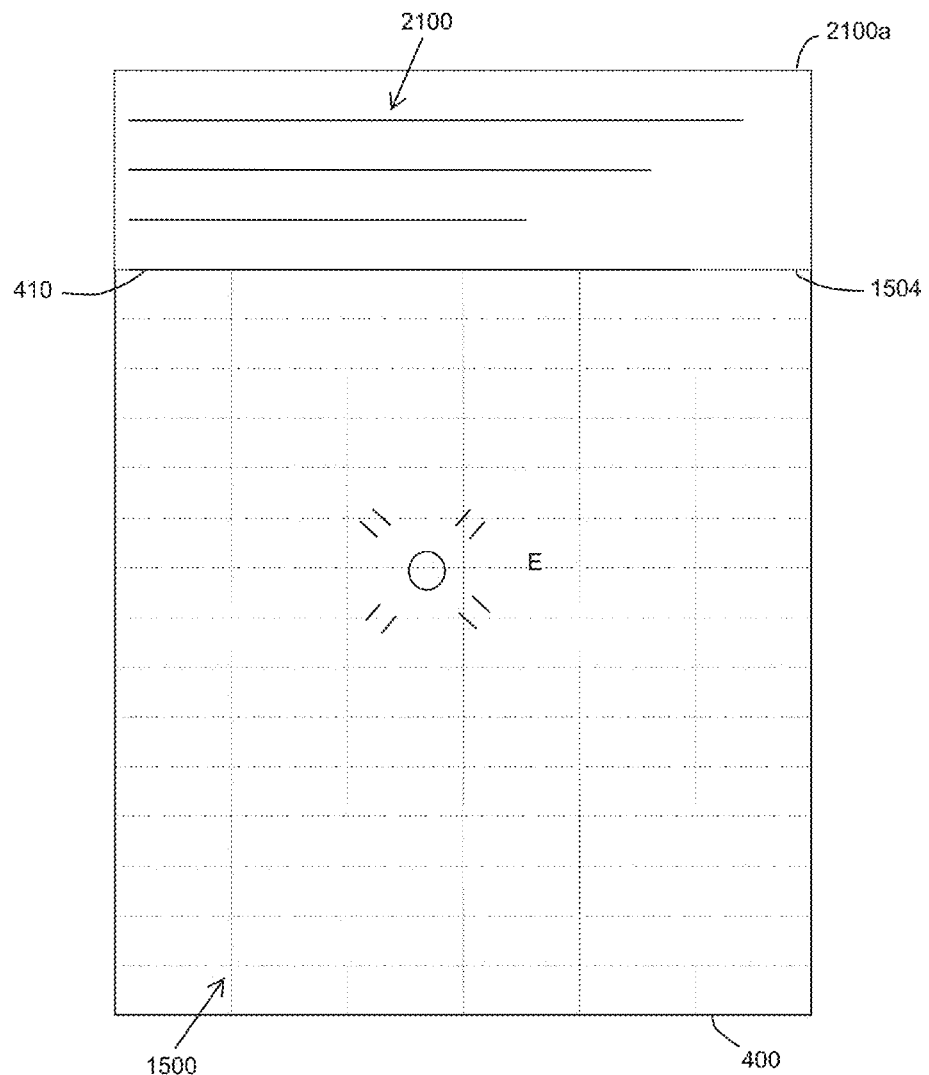
FIGS. 21A and 21B shows a schematic view of part of the scroll page with object blocks and example operations thereon.
Figure 21B:
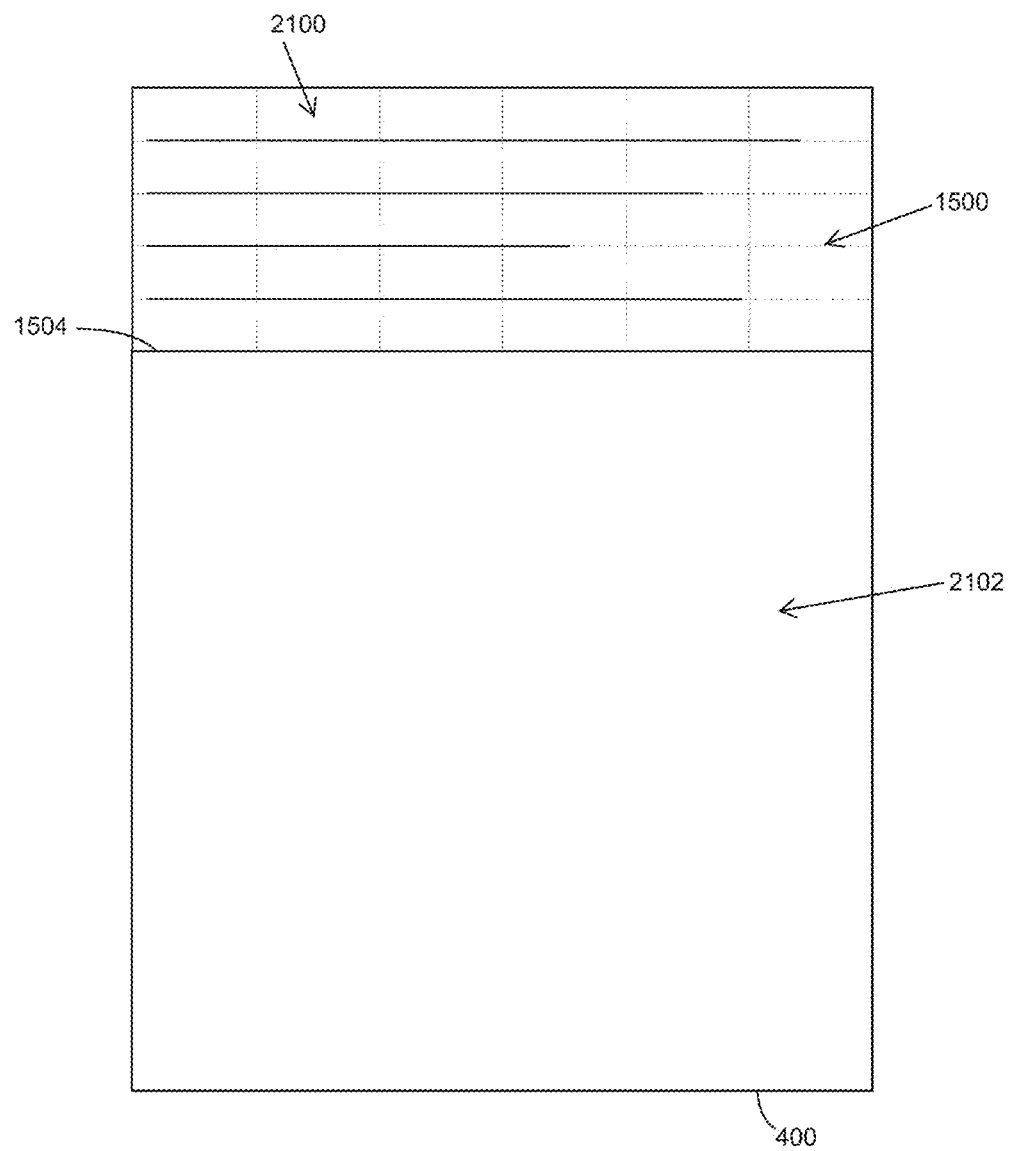

In FIG. 21A, a paragraph 2100 is shown as a full page width (two margin-aligned) block spanning all six columns 1004 and four lines 410, such that the boundary 2100*a* of the block 2000 is aligned on the fourth horizontal line 1504 of the alignment pattern 1500. In response to receiving a double tap gesture E below the paragraph 2100 a block 2102 is created from the fifth horizontal line 1504 of the alignment pattern 1500 to the vertical extent of the page 400 as shown in FIG. 21B. Non-text input within the block 2102 can then be performed. In a further example, if the canvas to be generated is too near the edge of the input area 408 of the scroll page 400 to provide meaningful content input, the scroll page could be automatically scrolled. With respect to the top and bottom extents of the input area 408, by setting a minimum canvas width and height (e.g., say, two columns and two LPUs), automatic scrolling could be achieved similar to that described earlier in relation to FIG. 9, since when a canvas is to be generated such that part of the minimum canvas overlaps the automatic scroll areas upon generation the scroll page will be automatically scrolled. Such a minimum canvas size also provides a way to ensure vertical overflow of a canvas below horizontally adjacent objects (e.g., to the left of the canvas) or of the horizontally adjacent objects (e.g., to the right of the canvas) when the canvas is to be created too close to the margin extents of the scroll page or between objects that are not sufficiently spaced apart.

Users may subsequently determine that the generated canvas is either too small or large for the purposes intended. As such, resizing of the created non-text block can be subsequently performed before or after content input. Resizing of all object blocks is possible under given conditions and with certain consequential actions on the layout. For example, resized objects snap to the alignment grid, resized content is always fully visible in the note (e.g., not cropped), except for images if necessary. With respect to image resizing, images imported into or as non-text blocks in the scroll page 400 are embedded within a bounding box that serves as a layout container. Image positioning within its bounding box is handled as following without user interaction:

- image is scaled up/down so that it always covers the whole bounding box area (overflowing parts being cropped)
- image always keeps its aspect ratio in any case (e.g., no stretching)
- image is centered within its bounding box.

Resizing of images, and of other object blocks, is performed using handles (see FIG. 9) displayed around a selected image and bound with the bounding box, not the inner image itself. Access to the handles, with corresponding display of the block boundaries, is provided by the present system and method in a natural and well understood manner to users, such as by the user simply performing a single tap on the content to be resized/edited. As is understood by those skilled in the art, once displayed users touch or hover over the handles and drag/push the selected handle across the interface so as to provide different behaviors with dragging/pushing of corner handles causing scaling of the bounding box (moves two sides, thus keeping the bounding box aspect ratio) and dragging/pushing of side handles causing stretching of the bounding box (move single side, thus changing bounding box aspect ratio). Changing the bounding box aspect ratio has no impact on the inner image aspect ratio, rather the image is automatically scaled/centered.

Other types of non-text blocks and text blocks can be explicitly resized in the same manner. However, when a paragraph is resized the font size of the text content is not changed (i.e., scaled) only the paragraph's dimensions (see detail discussion later for exceptions). With respect to the layout, if a block is made smaller content below is moved upward and if a block is made larger content below is moved downward, in accordance with afore-described rules.

As previously described, automatic resizing of blocks also occurs due to user input of content within blocks. For example, when users write in a text block (e.g., adding to or continuing a paragraph), the block extends automatically as the users write, with alineas and font size being maintained (and with any consequential movement of lower content). Automatic resizing can also occur due to display of a note created on one device being subsequently displayed on a different device having a screen of a different size or a change in orientation of the device display, e.g., landscape to portrait. As described earlier, the users' created layout of note taking object blocks is respected as much as possible by the present system and method during such transitions, as is the content within the blocks themselves. As such, operations such as automatic resizing are kept to a minimum and only performed where necessary or where the users' original input is not adversely effected. Upon translation, if users desire resizing or scaling of content, they are able to perform such operations manually, for example, in the manner explained above.

As mentioned, the computing device 100 on which the application 112 is utilized may have an interface 104 which responds to a change in the orientation of the device from portrait to landscape and vice-versa. Accordingly, the layout and characteristics of content elements included in a note of a scroll page of the digital note taking application must also be responsive whilst following the same principles of minimal undesired effect on layout. The same applies to displaying a particular scroll page, or note book, on devices having different display sizes. The alignment grid, and in particular the layout pattern, of the present system and method provides an effective way of providing responsiveness to such transitions. An example transition is now described with reference to FIGS. 22A and 22B.

Figure 22A:
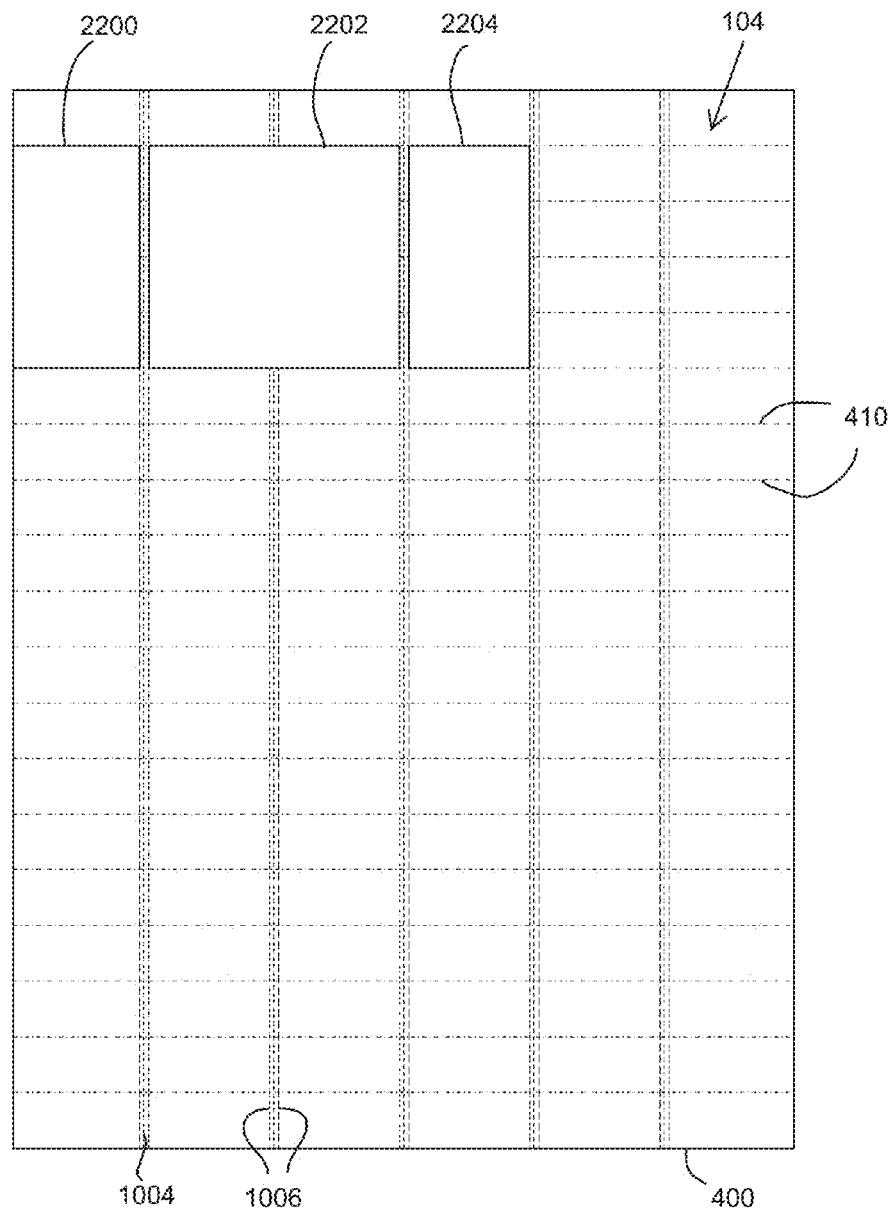
FIG. 22A shows a schematic view of a first alignment rendering of part of the scroll page with object blocks and FIG. 22B shows a schematic view of a second alignment rendering of part of the scroll page with the object blocks.

FIG. 22A shows an example of the scroll page 400 on a device interface 104 on which six columns 1004 of the layout pattern 1000 can be meaningfully provided. The column gutters 1006 of the columns 1004 are also shown. A first object block 2200 spans the first column 1004, a second object block 2202 spans the second and third columns 1004 and a third object block 2204 spans the fourth column 1004, where the blocks 2200, 2202 and 2204 are horizontally adjacent and the vertical boundaries of each block are aligned with the corresponding column gutters 1006, as previously described.

Figure 22B:
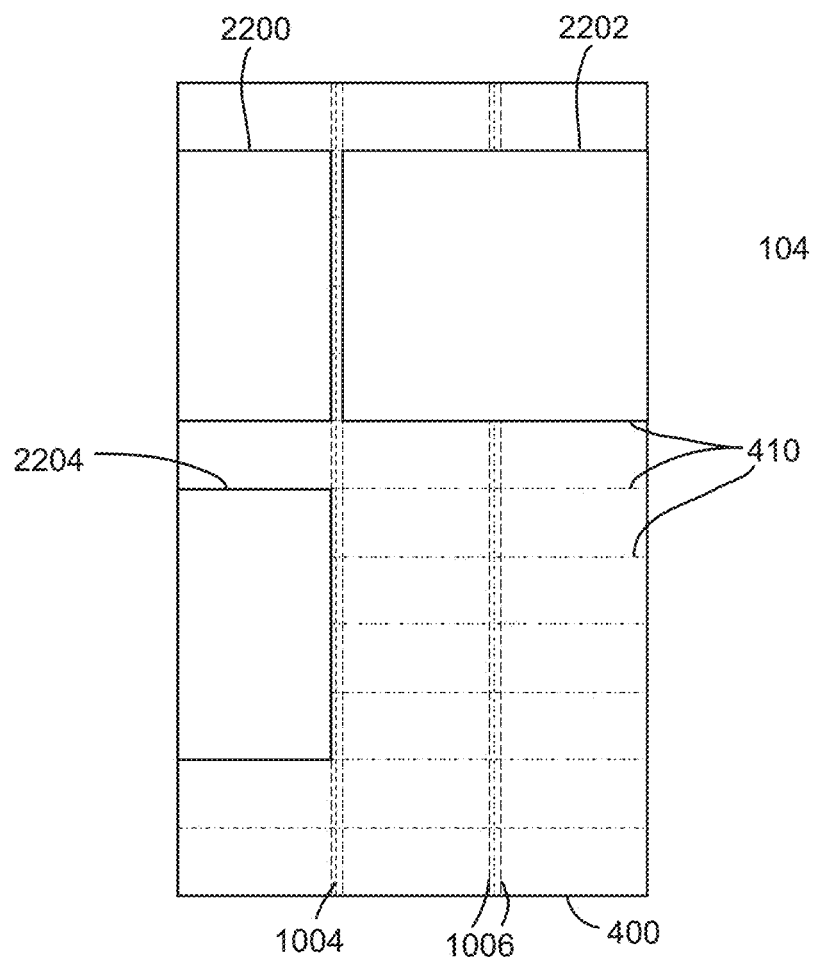

FIG. 22B shows the scroll page 400 translated to a different device interface 104 or the device interface 104 in a different orientation in which only three columns 1004 of the layout pattern 1000 can be meaningfully provided. Accordingly, while the first and second object blocks 2200, 2202 fit within the three columns 1004 of the translated scroll page 400, the third object block 2204 which spanned four of the columns 1004 in the scroll page 400 of FIG. 22A does not. Accordingly, the third block 2204 is moved vertically to the next available line 410 of the line pattern background (e.g., leaving a one LPU spacing between it and the closest block above) and is margin-aligned so as to now span the first column 1004 aligned with the corresponding column gutters 1006. Any content below is also moved downward as previously described. In this way, the original layout is maintained as much as possible whilst providing meaningful and well-sized display of the layout content in different views of the scroll page 400. For example, the margin-alignment of the vertically moved, previously floating, block is done so that it is clear that the block initially cam directly after the previously left-adjacent horizontal block.

By this responsive layout process, the present system and method is able to maintain layout in situations where a note is created/displayed by an initial device in an initial orientation and then sequentially displayed on smaller/larger devices in same/different orientations, where the display in the original (first) format is maintained when the note is displayed in that format again. In order to achieve this, the relative positioning of the object blocks in the layout relative to the alignment pattern needs to be known. The application 112 handles this by determining the relative block positions and creating sections or divisions of the scroll page to manage retention of block proximity when translating the scroll page view. When there is a horizontal/vertical overlay of more than one element/block in the vertical/horizontal direction a division is created. The elemental content of a division is not changed when the elements of the division are moved within the division either through direct action of users or due to translation of the scroll page in line with the viewable area of the device interface. The elemental content of a division is changed when elements are removed from the division or editing actions on the content are performed.

FIGS. 23A to 23F illustrate an example division scheme of the present system and method. In determining whether to divide the layout or not, the present system and method first determine in the vertical direction whether there are elements which horizontally overlap one another by checking the horizontal direction for each vertically displaced element, and whenever overlap is found the direction of the search changes from vertical to horizontal to vertical and so on.

Figure 23A:
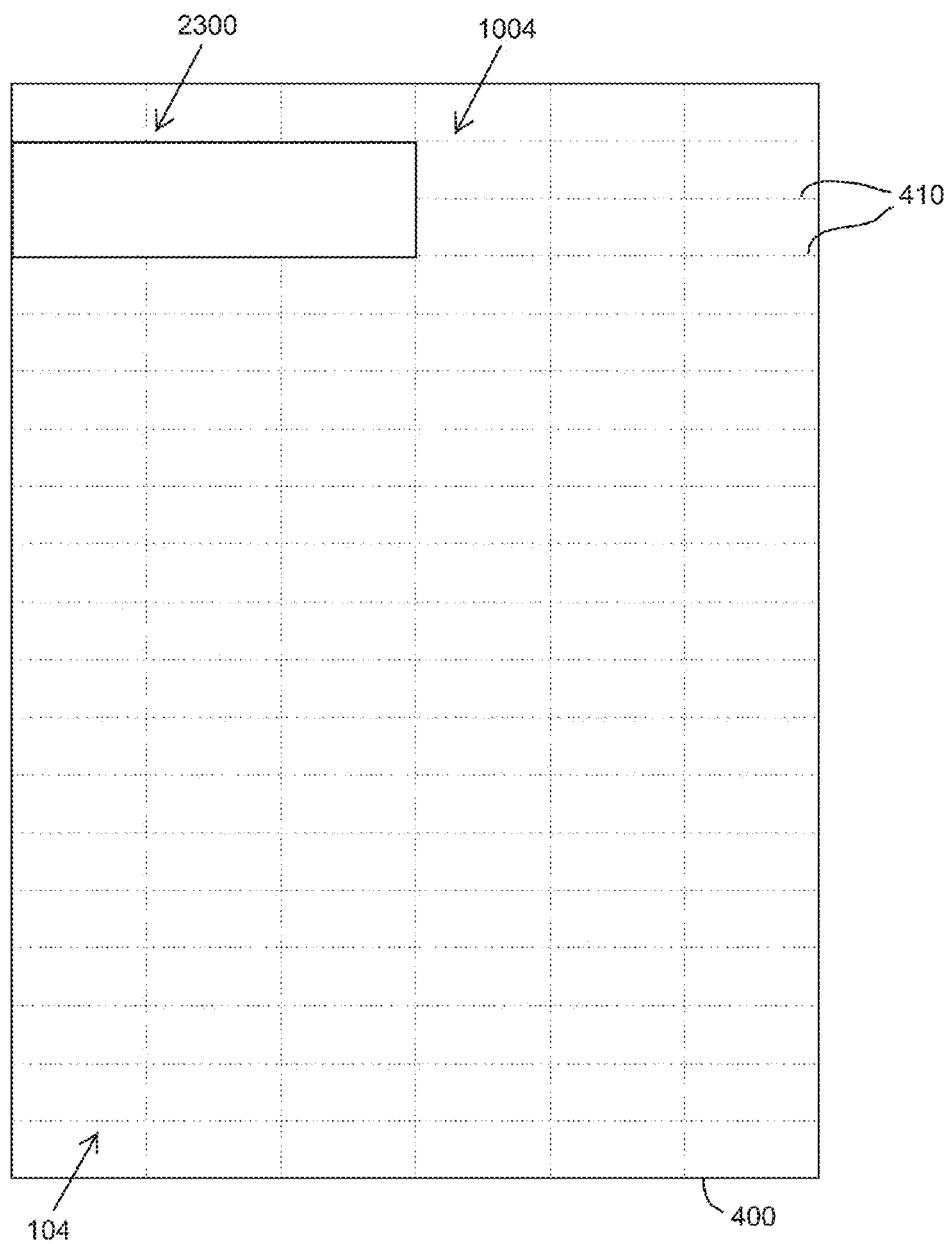
FIGS. 23A to 23F show a schematic view of a first alignment rendering of part of the scroll page with successive input of object blocks.

FIG. 23A shows an example of the scroll page 400 with one object block 2300 input in the interface 104. The block spans three columns 1004 and two LPUs 410. In determining whether to divide the layout or not, the present system and method first determine the presence of multiple vertical elements and then determine in the vertical direction whether there are elements which horizontally overlap by checking the horizontal direction for each vertically displaced element. Whenever overlap is found the direction of the search changes from vertical to horizontal to vertical and so on. Thus, in the example of FIG. 23 the following occurs:

A1. Processing begins at the block 2300 (being the first element in the vertical direction) and with a search of the vertical direction below (e.g., within the four column span of the block 2300) it is determined that there are no vertically overlapping blocks. Accordingly, a division is not created.

A2. Processing continues at the block 2300 and with a search of the horizontal direction to the left and right (e.g., within the two LPU span of the block 2300) it is determined that there are no horizontally adjacent blocks. Accordingly, a division is not created.

A3. Division processing ends, as there are no further blocks of content in either direction.

Figure 23B:
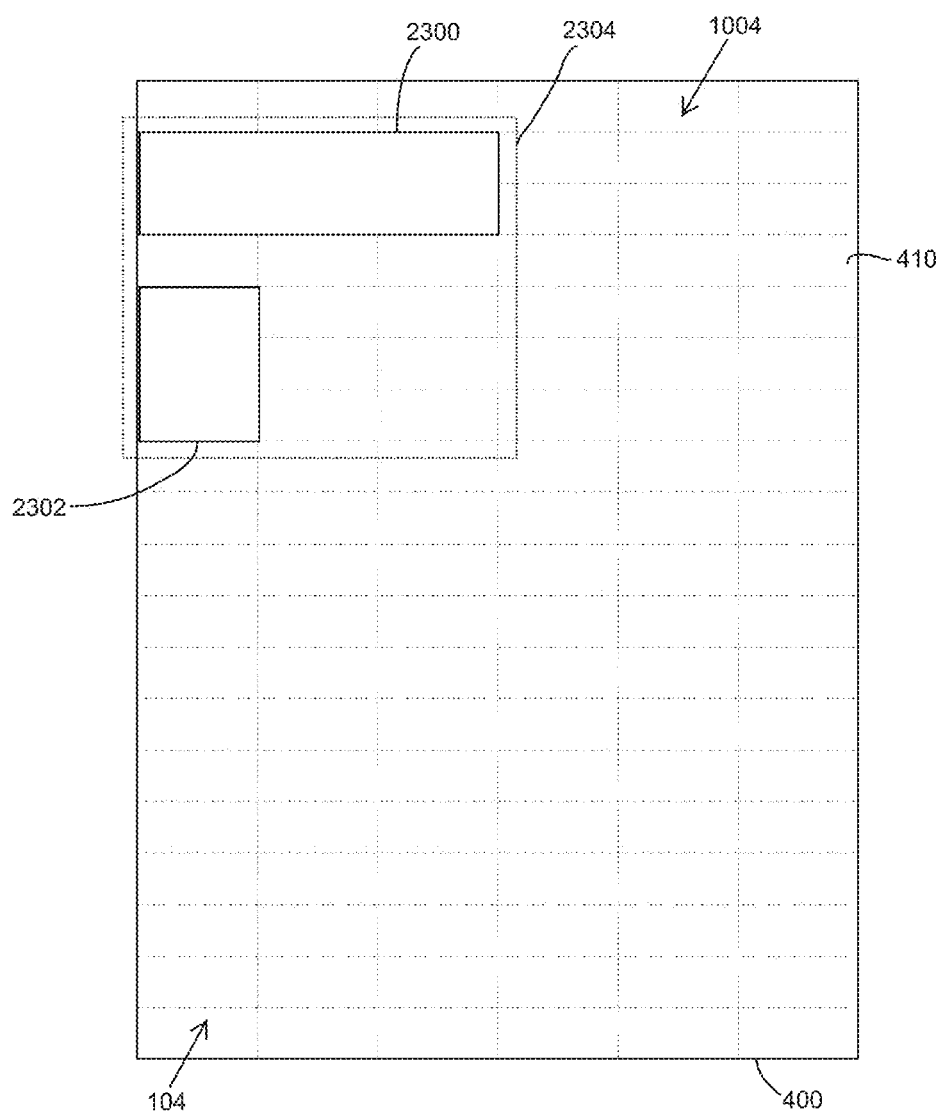

FIG. 23B shows the scroll page 400 with a second object block 2302 input below the first block 2300. The second block 2302 spans one column 1004 and three LPUs 410. As a further block has been input the following occurs:

B1. Step A1 is repeated but this time it is determined that the block 2302 is vertically overlapped with the block 2300. Accordingly, a division 2304 containing the blocks 2300 and 2302 is created.

B2. With the creation of the division 2304, it is determined whether any sub-divisions should be created at the block 2300 by repeating step A2 which achieves the same result in the present example.

B3. Processing continues at the block 2302 (being the next element in the vertical direction) and with a search of the vertical direction below (e.g., within the single column span of the block 2302) it is determined that there are no vertically overlapping blocks. Accordingly, the division 2304 is maintained (e.g., there is no need to extend the division to contain another block).

B4. With the confirmation of the division 2308, it is determined whether any sub-divisions should be created by processing continuing at the block 2302 and with a search of the horizontal direction to the left and right (e.g., within the three LPU span of the block 2302) it is determined that there are no horizontally adjacent blocks. Accordingly, a sub-division is not created.

B5. Division processing ends, as there are no further blocks of content in either direction.

Figure 23C:
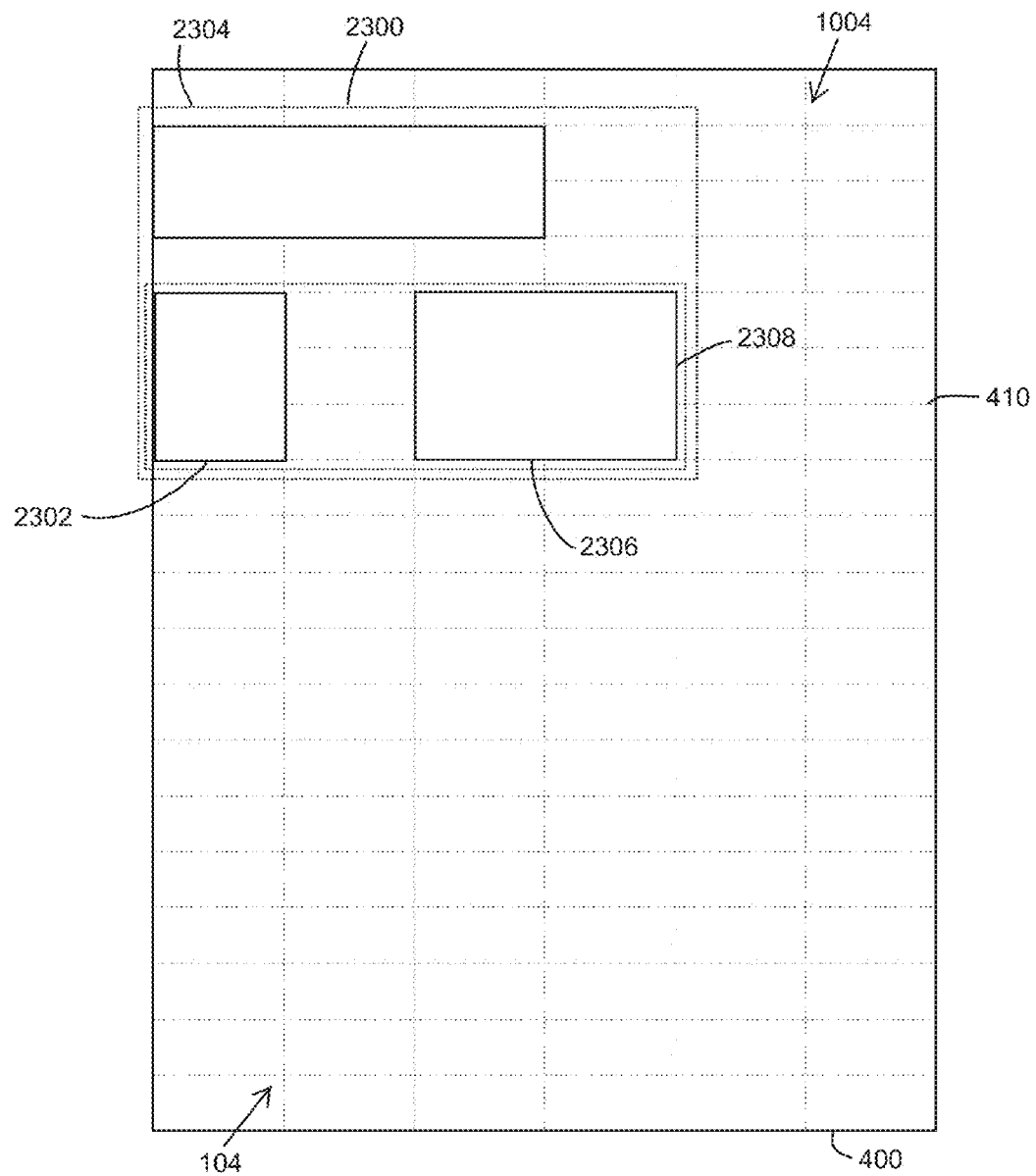

FIG. 23C shows the scroll page 400 with a third object block 2306 input horizontally adjacent the second block 2302. The third block 2306 spans three columns 1004 and three LPUs 410. As a further block has been input the following occurs:

C1. Steps B1 to B3 are repeated with resulting maintenance of the division 2304.

C2. Step B4 is repeated but this time it is determined that the block 2306 is horizontally adjacent on the right. Accordingly, the division 2304 is updated so as to contain all three blocks 2300, 2302 and 2306 and a sub-division 2308 containing the blocks 2302 and 2306 is created.

C3. With the creation of the sub-division 2308, it is determined whether any further elements are within the sub-division 2308 by processing continuing at the block 2306 (being the next element in the horizontal direction within the sub-division 2308) and with a search of the horizontal direction to the left and right (e.g., within the three LPU span of the block 2306) it is determined that only the block 2302 is horizontally adjacent on the left, which is already known. Accordingly, the sub-division 2308 is maintained (e.g., there is no need to extend the division to contain another block).

C4. With the creation and confirmation of the sub-division 2308, it is determined whether any further sub-divisions within the sub-division 2308 should be created by processing continuing at the block 2306 and with a search of the vertical direction below within the sub-division 2308 (e.g., within the three column span of the block 2306) it is determined that there are no vertically adjacent blocks within the sub-division 2308. Accordingly, a sub-division is not created.

C5. Division processing ends, as there are no further blocks of content in either direction.

Figure 23D:
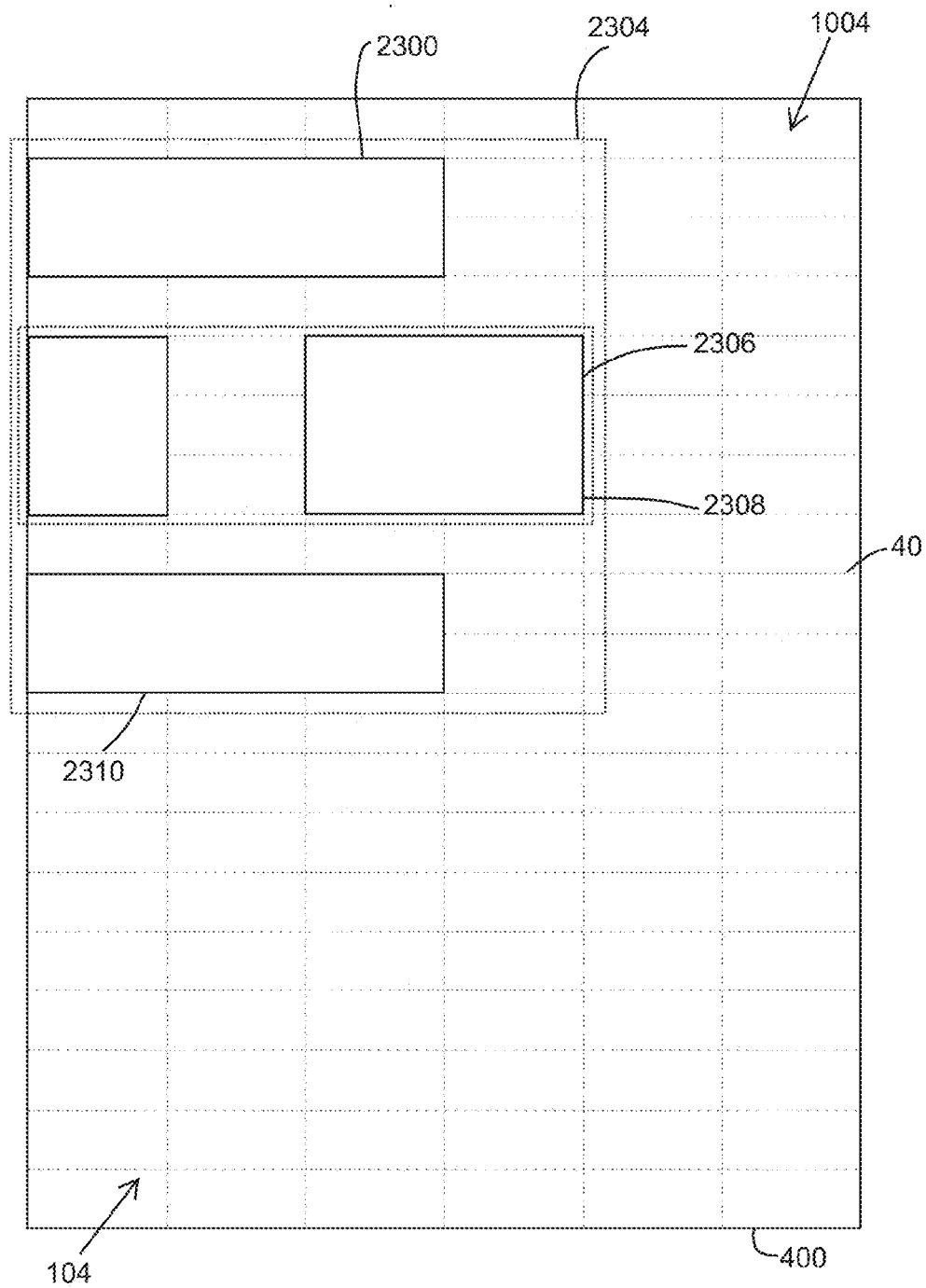

FIG. 23D shows the scroll page 400 with a fourth object block 2310 input below the existing blocks. The further block 2310 spans three columns 1004 and two LPUs 410. As a further block has been input the following occurs:

D1. Steps B1 and B2 are repeated with resulting maintenance of the division 2304.

D2. Step B3 is repeated but this time it is determined that the block 2310 is vertically overlapped with the block 2302. Accordingly, the division 2304 is updated to contain the blocks 2300, 2302, 2306 and 2310.

D3. Steps C2 to C4 are repeated with resulting maintenance of the updated division 2304 and the sub-division 2308.

D4. Division processing ends, as there are no further blocks of content in either direction.

Figure 23E:
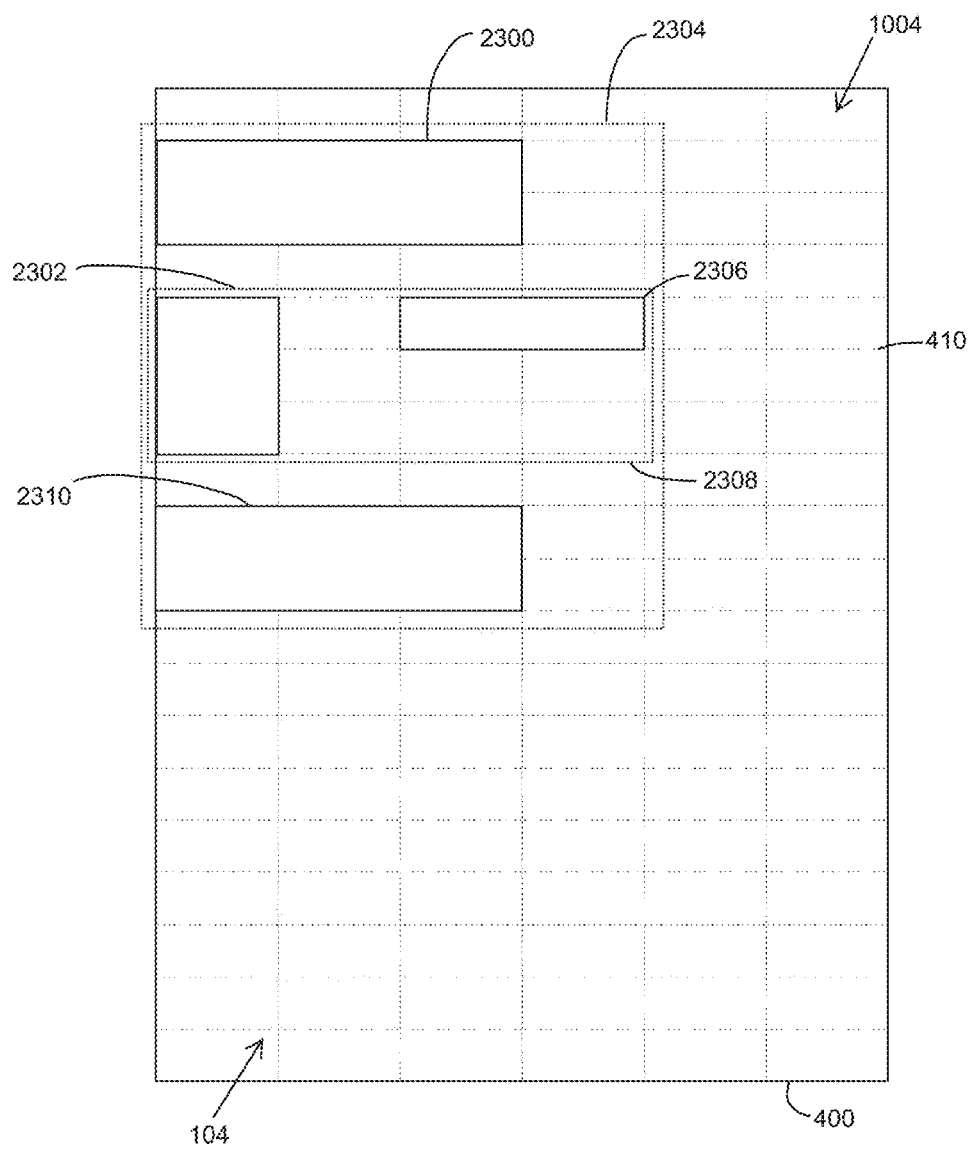

FIG. 23E shows the scroll page 400 with the third object block 2306 having been resized to still span three columns 1004 but now span one LPU 410 rather than three. As an editing operation on the layout has occurred, the division processing is performed but with the result that the existing divisions are maintained as they are since the relative layout of the blocks has not been changed.

Figure 23F:
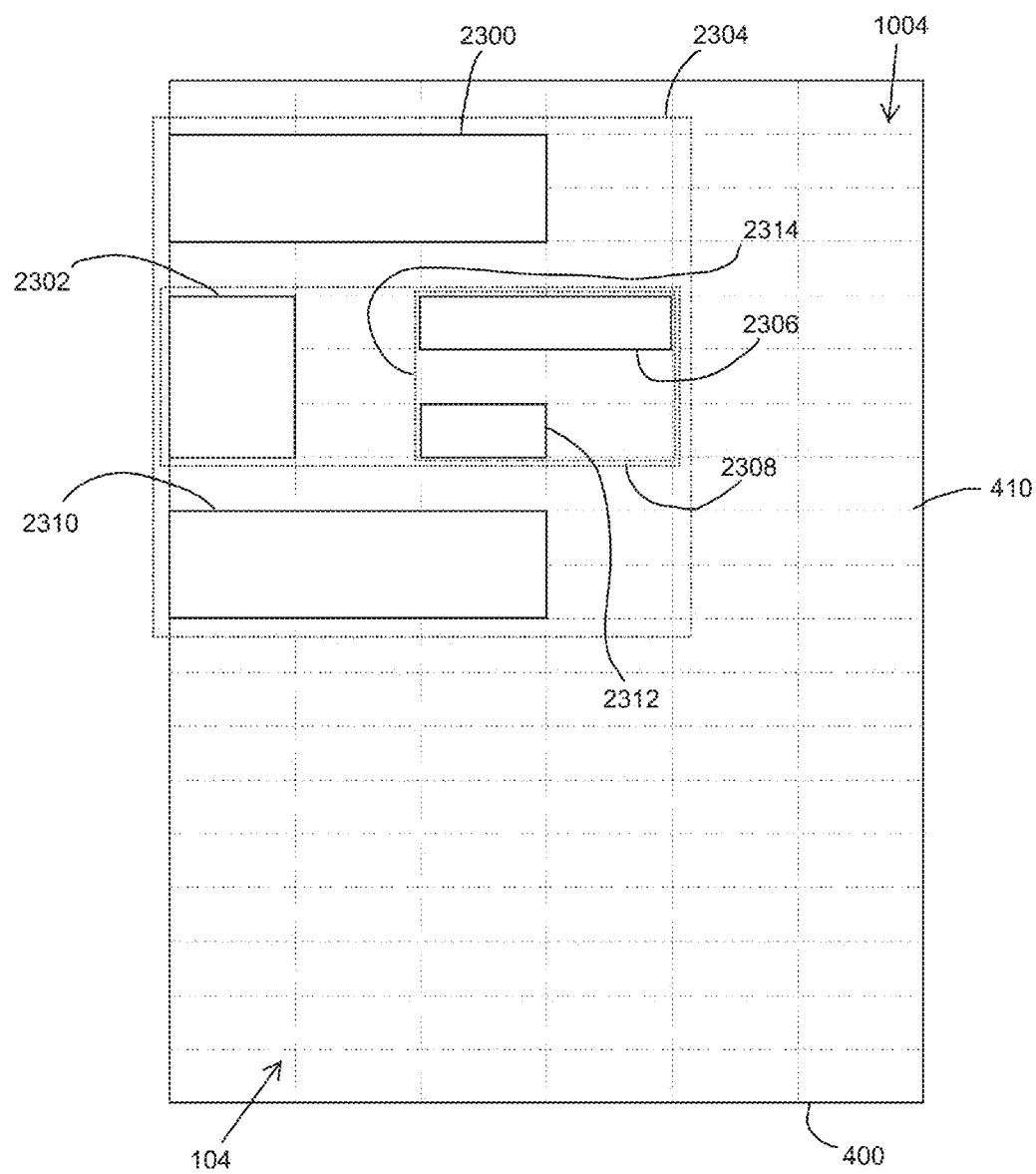

FIG. 23F shows the scroll page 400 with a fifth object block 2312 input below the (resized) third object block 2306. The further block 2312 spans one column 1004 and one LPU 410. As a further block has been input the following occurs:

F1. Steps D1 and D2 are repeated with resulting maintenance of the division 2304.

F2. Steps C2 and C3 are repeated with resulting maintenance of the division 2304 and the sub-division 2308.

F3. Step C4 is repeated but this time it is determined that the block 2312 is vertically overlapped with the block 2306. Accordingly, a further sub-division 2314 containing the blocks 2306 and 2312 is created.

F4. With the creation of the sub-division 2314, it is determined whether any further elements are within the sub-division 2314 by processing continuing at the block 2312 (being the next element in the vertical direction within the sub-division 2314) and with a search of the vertical direction below within the sub-division 2314 (e.g., within the three column span of the block 2312) it is determined that there are no vertically adjacent blocks within the sub-division 2314. Accordingly, the sub-division 2314 is maintained (e.g., there is no need to extend the division to contain another block).

F5. With the creation and confirmation of the sub-division 2314, it is determined whether any further sub-divisions within the sub-division 2314 should be created by processing continuing at the block 2302 and with a search of the horizontal direction to the left and right (e.g., within the single LPU span of the block 2312) it is determined that only the block 2302 is horizontally adjacent on the left, which is already known. Accordingly, a sub-division is not created.

F6. Division processing ends, as there are no further blocks of content in either direction.

The example layout of FIG. 23 is therefore divided into three divisions or sections. With the first or root division containing all content blocks, the second division containing three blocks and the third division containing two blocks. In the example of FIG. 23 the divisions are created, updated and processed incrementally as input is made to the application 112. These divisions are therefore stored in the memory 108, for example, by the application 112 as they are created and updated so that the order of the blocks is maintained through movement of individual blocks within or between the divisions either through user interaction or display/orientation changes (described in relation to a specific example later). The division processing is also applicable to an already created layout of blocks (e.g., when an existing note is loaded on the application 112). Whilst the root division and first level sub-division (e.g., the sub-division 2304) are shown in FIG. 23 as surrounding the blocks contained therein, it is understood that these higher level divisions basically divide the width of the scroll page 400 into sections.

Figure 24:
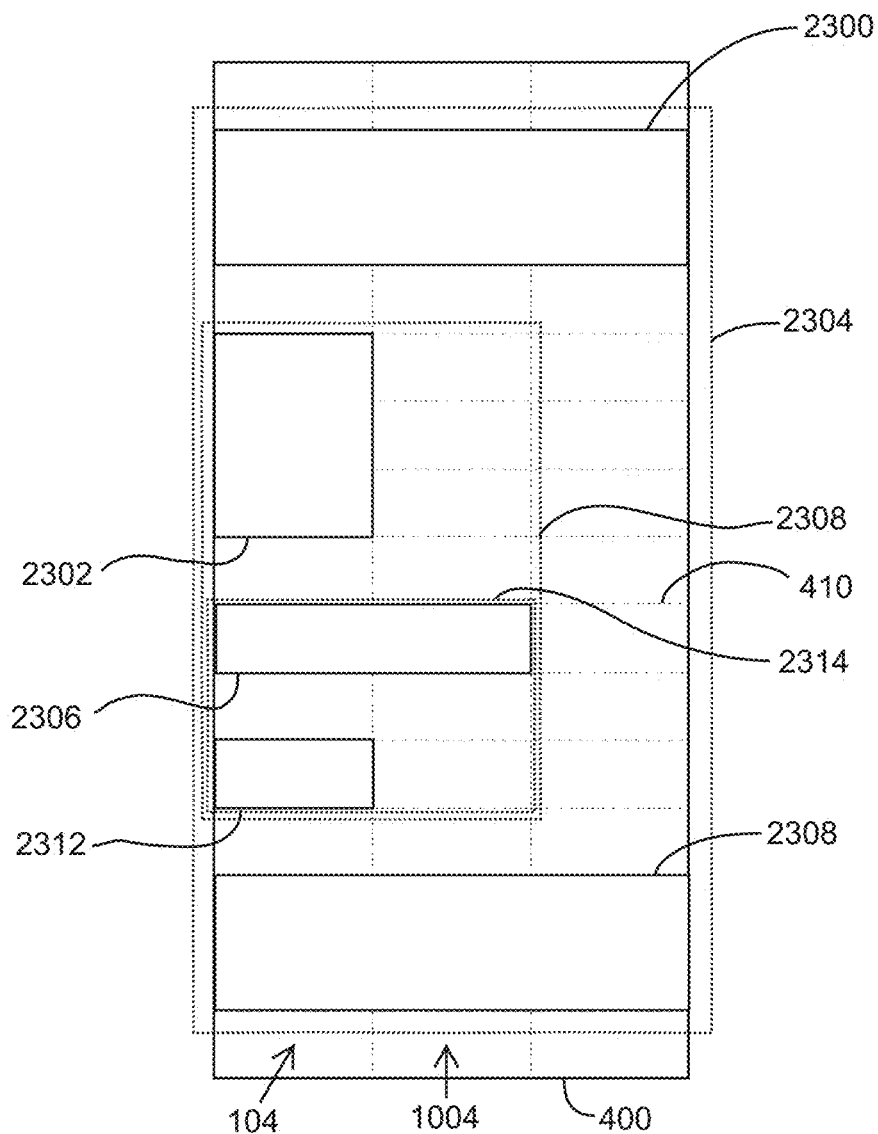
FIG. 24 shows a schematic view of a second alignment rendering of the part of the scroll page of FIG. 23 with the object blocks.

FIG. 24 shows the scroll page 400 of FIG. 23 translated to a different device interface 104 and/or device interface 104 in a different orientation. In response to the translation, the application 112 has rendered the scroll page 400 with three columns 1004 of the layout pattern 1000. Accordingly, while the blocks 2300 and 2310 of the root division 2304 fit within the three columns 1004 of the translated scroll page 400, the combined blocks 2302, 2306 and 2312 of the sub-division 2308 which spanned four of the columns 1004 in the scroll page 400 of FIG. 23 do not. However, unlike the situation depicted in FIG. 22A, since the blocks 2306 and 2312 are further contained in the sub-division 2314, then the sub-division 2314 as a whole is moved vertically to the next available line 410 of the line pattern background with consequential movement of the content block 2312 (e.g., leaving a one LPU spacing between the upper and lower blocks of the sub-division 2314 and the closest blocks above and below) with the left-most block (i.e., the block 2306) being margin-aligned. In this way, the original layout is maintained as much as possible, both in the main vertical flow of elements and in the horizontal order of elements across the width of the scroll page, whilst providing meaningful and well-sized display of the layout content in different views of the scroll page 400. Since the vertical and horizontal orders are maintained, the display of FIG. 24 is properly translated back to the display of FIG. 23F (e.g., the layout to that original input) when the original device orientation or size is restored.

In the example of FIG. 23, there was sufficient horizontal space (e.g., columns) in the divisions for the content added to those divisions. On the other hand, if added content or objects do not fit into the available width of the scroll page 410 within a division, all objects of the division may be automatically resized (as described earlier) depending on where the added object is input or dropped within the division and the objects to the right and below consequently moved down. Resizing of digital ink paragraphs or text blocks also involves reflow of the digital ink onto the more or less lines of the line pattern background. This reflow is handled so that the meaning and integrity of the paragraph is maintained. Accordingly, a particular paragraph of digital ink (and typeset text—see later) may be reflowed differently to another paragraph, and in any case, the minimum width of a paragraph is governed by the minimum word width (with or without hyphenation) of the text within the paragraph.

Automatic resizing may also be performed with a change of orientation or format so that the position of a block or paragraph in the layout and its percentage of the vertical occupation in the width of the scroll page is respected. For example, for handwritten text in a paragraph that has a certain relative vertical position and occupies a certain percentage of the viewable area width, say 75%, the same relative position and percentage is applied when changing the device orientation or size by reflowing the text so that more words can fit into the paragraph or the height of the paragraph is changed or the size of the text characters is adjusted accordingly. Text size is particularly relevant to the typesetting of the digital ink.

The manner of converting the input digital ink to typeset text has an impact on the layout as well. This is because, characters handwritten on either paper or on-screen are typically much larger than typeset text, which is generally rendered using standard OS settings (e.g., 16 px font size and 24 px line height) and are generally of varying size and alignment (the line pattern background assists in reducing the extent of these variations however). Accordingly, when a paragraph of digital ink is typeset the resulting typeset text paragraph is much smaller. An example of the relative sizes of a paragraph before and after typesetting is shown in FIG. 25 in which a simple multiline paragraph of digital ink 2500 having a span of six lines 410 (e.g., six LPUs) shrinks down to a multiline paragraph 2502 of only three lines (e.g., no longer a measure of LPUs) of typeset text when typeset. This is not such an issue for vertically laid out paragraphs which are typeset one-by-one or all together after writing is completed since the relative layout of the paragraphs remains the same. However, for horizontally laid out paragraphs and non-text blocks adjacent the paragraphs which are typeset drastic changes in the layout may occur if automatic movement of the surrounding object blocks is performed.

Alternatively, the adjacent blocks can be left as is, such as by not resizing the block (boundaries) of the paragraph which has been typeset. However, since users are unaware of the existence of the blocks, since the block boundaries are only displayed during movement and editing for example, the size of the resultant typeset paragraph may seem odd with respect to the surrounding elements causing users to attempt moving those blocks closer to the typeset paragraph which may not be allowed due to the size of the enlarged block surrounding the typeset paragraph.

Figure 26:
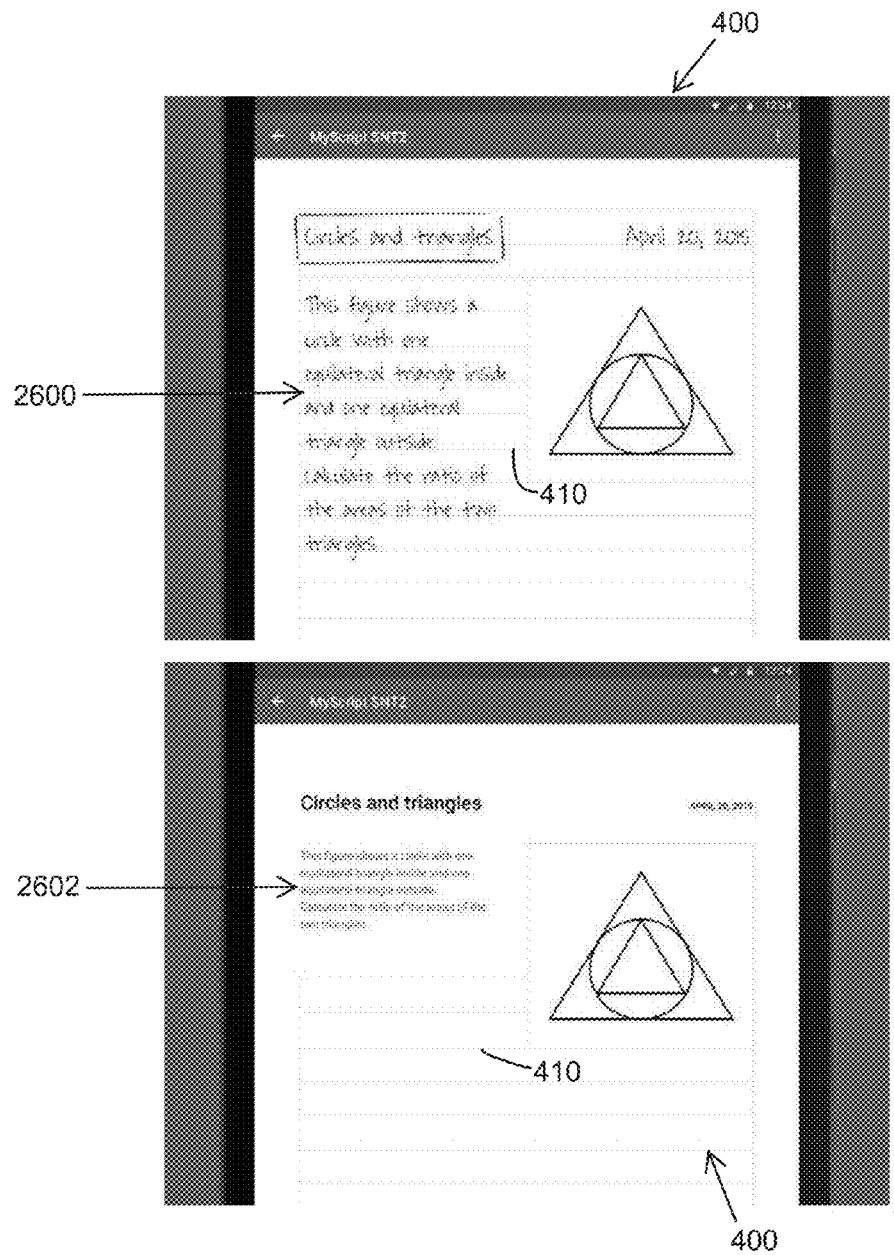
FIG. 26 shows schematic views of an example visual rendering of the scroll page on a portion of the device input surface showing a typesetting operation on digital ink.

It is clear that handwriting requires a larger space than typeset for content to be input correctly (e.g., a larger line height) and the line pattern background is generally needed to assist the recognition process. Accordingly, since the line height of the digital ink is larger than that of the typeset ink, the present and system method removes display of the line pattern background from typeset paragraphs thereby making the content much clearer and readable, and ready to be shared. An example of this is shown in FIG. 26 in which a digital ink paragraph 2600 having the line pattern background 410 displayed is converted into a typeset paragraph 2602 with display of the line pattern background suppressed in the text block 2602 containing the typeset paragraph.

Figure 27:
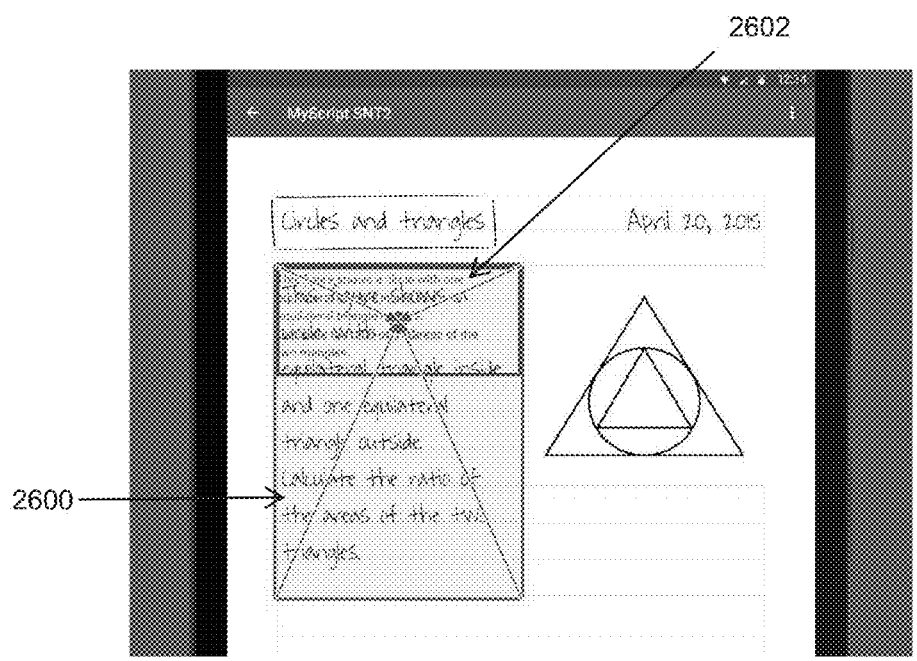
FIG. 27 shows a schematic view of the scroll page of FIG. 26 showing an animation of the typesetting operation.

Transitioning from handwriting to typeset needs to be quick to prevent distracting users from content input. Accordingly, in the present system and method a simple, natural and well-understood mechanism to manually typeset paragraphs is provided and animation of the transformation is used with a simple mix of transparency (0% to 100%) and scaling (0% to 100%). In one example, when a user desires to typeset a paragraph, they simply double tap on the paragraph and in the resultant animation the origin of the transformation is aligned with the absolute middle of the smallest state (being typeset). An example of such transform animation is shown in FIG. 27 in which the transformation from the digital ink paragraph 2600 to the typeset paragraph 2602 is shown. If the user is unhappy with the size of the typeset paragraph in relation to the other elements they can resize the paragraph block, for example, through performing a single tap on the content to select the content, as described earlier. Further, reversal of the transformation may be provided by re-performing a double tap on typeset content. Alternatively, users could see the animation and resultant typeset paragraph, which either temporarily replaces or overlays the digital ink paragraph (as shown in FIG. 27) by performing other natural and well understood operations, such as a long press or hover over the digital ink paragraph, before committing to the transformation.

Once a paragraph is typeset users may desire to change or add content to the typeset content by handwriting. The present system and method supports this in a manner which adheres to the afore-described rules for producing good quality and shareable digital notes. This is done by requiring the typeset paragraph to be displayed in a larger format. In this larger format, the line pattern background is displayed in the typeset paragraph block with the font size of the typeset text enlarged so as reside on the lines of the line pattern background. In this way, any handwritten text or editing gestures supported by the HWR system 114, such as strike-through, scratch-out, overwrite, insertion, etc., are made in relation to the LPU thereby supporting proper recognition. The temporary transformation to the larger typeset size can be achieved, for example, by the user performing a simple and well understood operation, such as a single- or multi-point gesture like a pinch-out. In this situation the new handwritten text remains in this format, e.g., the paragraph is a mix of typeset and digital ink, until the user performs conversion (e.g., in the manner described earlier) at which the enlarged typeset text reverts to the usual sizing at the same time as the added digital ink being typeset to the same size. In this way, it is unnecessary for the HWR system 114 to perform re-recognition of all the paragraph content and the layout is maintained.

Additional to typesetting, simple and well understood gestures may be performed by users to interact with, edit and create new content within the notes. For example, when inserting a non-text canvas as described with reference to FIGS. 20 and 21, full screen mode of that canvas may be entered, for example, by users performing a double tap on the inserted canvas area. Further, within a digital ink or typeset paragraph, interaction with specific text, e.g., words, phrases, sentences, may be done, for example, by users performing a long-press or hover over the text to be selected with or without resultant selection handles for changes to the selection (as described earlier). Further, in the spaces of the input area 408 outside of the defined object blocks, editing gestures supported by the HWR system 114, such as strike-through, scratch-out, insertion, etc., could be performed by users to add or suppress space about existing elements (with consequential downstream movement of any object blocks below) without movement or resizing of the elements themselves.

The present system and method provide an application which allows users, such as students, academic and working professionals, to take handwritten notes, such as during lectures, meetings and brainstorming sessions, on their computing devices in a meaningful and shareable format akin to word processed documents. The present system and method further allow natural writing to be input since the writing is made on (ruled) lines, and paragraphs and other layout elements are respected responsive to orientation (i.e., portrait or landscape) and device display capacity.

Further interaction with the handwritten or typeset text, or non-text content, created in a note, such as editing the content, manipulating the layout of the notes, or converting or adding the notes into a document, can be performed directly within the application itself without the need to import the note into a separate document processing application. As such, the original layout of the handwritten notes is maintained, as is the actual input handwriting itself, the digital ink. Accordingly, annotations, decorations, special layout, etc. is maintained for easy comprehension of the notes taken.

While the foregoing has described what is considered to be the best mode and/or other examples, it is understood that various modifications may be made therein and that the subject matter disclosed herein may be implemented in various forms and examples, and that they may be applied in numerous other applications, combinations, and environments, only some of which have been described herein. Those of ordinary skill in that art will recognize that the disclosed aspects may be altered or amended without departing from the true spirit and scope of the subject matter. Therefore, the subject matter is not limited to the specific details, exhibits, and illustrated examples in this description. It is intended to protect any and all modifications and variations that fall within the true scope of the advantageous concepts disclosed herein.

We claim:

1. A system for digital note taking on computing devices, each computing device comprising a processor and at least one non-transitory computer readable medium for recognizing handwriting note taking input under control of the processor, the at least one non-transitory computer readable medium configured to:

cause display of, on a display interface of a computing device, digital ink in a block layout in accordance with a layout of geometric blocks of the handwriting input and a configuration of the computing device display interface, said configuration of the computing device being defined by horizontal and vertical dimensions of the display interface, and wherein the at least one non-transitory computer readable medium is configured to: when the computing device display interface changes from a configuration whereby the geometric blocks of digital ink fit in horizontal adjacency within the horizontal dimension of the display interface to another configuration of reduced horizontal dimension, the reduced horizontal dimension being less than a cumulative horizontal geometric block dimension of the geometric blocks, cause moving of said one or more geometric blocks relatively to said others of geometric blocks while otherwise maintaining the layout of the said others of geometric blocks.

2. The system of claim 1, wherein each geometric block of digital ink is configured to be interactive, the at least one non-transitory computer readable medium configured to cause change in the layout display in response to receiving interaction with the geometric blocks.

3. The system of claim 1, wherein the configuration of the computing device display interface includes a first aspect view at a first orientation computing device and a second aspect view at a second orientation of the computing device, the at least one non-transitory computer readable medium configured to cause change in the layout display in response to aspect view changes of the display interface.

4. The system of claim 3, wherein the first aspect view is portrait and the second aspect view is landscape.

5. The system of claim 1, wherein the configuration of each computing device display interface is defined by horizontal and vertical dimensions of that display interface, the at least one non-transitory computer readable medium configured to cause change in the layout display in response to display on computing devices having display interfaces of different horizontal and/or vertical dimensions.

6. The system of claim 1, wherein the display interface is scrollable.

7. A method for digital note taking on computing devices, each computing device comprising a processor and at least one non-transitory computer readable medium for recognizing handwriting note taking input under control of the processor, the method comprising:
  causing, with the at least one non-transitory computer readable medium, display of, on a display interface of a computing device, digital ink in a block layout in accordance with a layout of geometric blocks of the handwriting input and a configuration of the computing device display interface, said configuration of the computing device being defined by horizontal and vertical dimensions of the display interface, and wherein the at least one non-transitory computer readable medium is configured to: when the computing device display interface changes from a configuration whereby the geometric blocks of digital ink fit in horizontal adjacency within the horizontal dimension of the display interface to another configuration of reduced horizontal dimension, the reduced horizontal dimension being less than a cumulative horizontal geometric block dimension of the geometric blocks, cause moving of said one or more geometric blocks relatively to said others of geometric blocks while otherwise maintaining the layout of the said others of geometric blocks.

8. The method of claim 7, wherein each geometric block of digital ink is configured to be interactive, the at least one non-transitory computer readable medium configured to cause change in the layout display in response to receiving interaction with the geometric blocks.

9. The method of claim 7, wherein the configuration of the computing device display interface includes a first aspect view at a first orientation computing device and a second aspect view at a second orientation of the computing device, the method causing, with the at least one non-transitory computer readable medium, change in the layout display in response to aspect view changes of the display interface.

10. The method of claim 9, wherein the first aspect view is portrait and the second aspect view is landscape.

11. The method of claim 7, wherein the configuration of each computing device display interface is defined by horizontal and vertical dimensions of that display interface, the method causing, with the at least one non-transitory computer readable medium, change in the layout display in response to display on computing devices having display interfaces of different horizontal and/or vertical dimensions.

12. The method of claim 7, wherein the display interface is scrollable.

13. A non-transitory computer readable medium having a computer readable program code embodied therein, said computer readable program code adapted to be executed to implement a method for recognizing input of handwriting note taking to a computing device, the computing device comprising a processor and at least one system non-transitory computer readable medium for recognizing the input under control of the processor, the method comprising:
  causing, with the at least one system non-transitory computer readable medium, display of, on a display interface of a computing device, digital ink in a block layout in accordance with a layout of geometric blocks of the handwriting input and a configuration of the computing device display interface, said configuration of the computing device being defined by horizontal and vertical dimensions of the display interface, and wherein the at least one non-transitory computer readable medium is configured to: when the computing device display interface changes from a configuration whereby the geometric blocks of digital ink fit in horizontal adjacency within the horizontal dimension of the display interface to another configuration of reduced horizontal dimension, the reduced horizontal dimension being less than a cumulative horizontal geometric block dimension of the geometric blocks, cause moving of said one or more geometric blocks relatively to said others of geometric blocks while otherwise maintaining the layout of the said others of geometric blocks.

14. The non-transitory computer readable medium of claim 13, wherein each geometric block of digital ink is configured to be interactive, the at least one non-transitory computer readable medium configured to cause change in the layout display in response to receiving interaction with the geometric blocks.

15. The non-transitory computer readable medium of claim 13, wherein the configuration of the computing device display interface includes a first aspect view at a first orientation computing device and a second aspect view at a second orientation of the computing device, the method causing, with the at least one system non-transitory computer readable medium, change in the layout display in response to aspect view changes of the display interface.

16. The non-transitory computer readable medium of claim 15, wherein the first aspect view is portrait and the second aspect view is landscape.

17. The non-transitory computer readable medium of claim 13, wherein the configuration of each computing device display interface is defined by horizontal and vertical dimensions of that display interface, the method causing, with the at least one system non-transitory computer readable medium, change in the layout display in response to display on computing devices having display interfaces of different horizontal and/or vertical dimensions.

18. The non-transitory computer readable medium of claim 13, wherein the display interface is scrollable.

* * * * *